US008756001B2

(12) United States Patent
Georgy et al.

(10) Patent No.: US 8,756,001 B2
(45) Date of Patent: Jun. 17, 2014

(54) METHOD AND APPARATUS FOR IMPROVED NAVIGATION OF A MOVING PLATFORM

(75) Inventors: Jacques Georgy, Alberta (CA); Aboelmagd Noureldin, Calgary (CA)

(73) Assignee: Trusted Positioning Inc., Calgary, Alberta (CA)

( * ) Notice: Subject to any disclaimer, the term of this patent is extended or adjusted under 35 U.S.C. 154(b) by 432 days.

(21) Appl. No.: 13/037,130

(22) Filed: Feb. 28, 2011

(65) Prior Publication Data

US 2012/0221244 A1    Aug. 30, 2012

(51) Int. Cl.
| | | |
|---|---|---|
| G06F 17/00 | (2006.01) | |
| G06F 19/00 | (2011.01) | |
| G01C 21/00 | (2006.01) | |
| G01C 21/10 | (2006.01) | |
| G01S 19/40 | (2010.01) | |

(52) U.S. Cl.
USPC .......... 701/408; 701/469; 701/472; 701/501; 701/507; 340/995.28; 342/357.23

(58) Field of Classification Search
USPC ......... 701/400, 408, 409, 410, 411, 412, 442, 701/445, 466, 468, 469, 472, 473, 475, 479, 701/480, 483, 494, 495, 498, 499, 500, 501, 701/505, 507, 509, 510, 511, 512, 514, 518, 701/519, 527, 534, 535, 536; 340/988, 340/995.25, 995.28; 342/357.2, 357.22, 342/357.23, 357.46
See application file for complete search history.

(56) References Cited

U.S. PATENT DOCUMENTS

| | | | | |
|---|---|---|---|---|
| 6,907,347 | B2* | 6/2005 | Ibrahim et al. | 701/470 |
| 2004/0006424 | A1* | 1/2004 | Joyce et al. | 701/207 |
| 2009/0037106 | A1* | 2/2009 | Gavriline et al. | 701/216 |
| 2010/0088030 | A1* | 4/2010 | Stephens et al. | 701/220 |
| 2010/0250133 | A1* | 9/2010 | Buros | 701/216 |

OTHER PUBLICATIONS

Jacques Georgy, Aboelmagd Noureldin, Michael J. Korenberg, Mohamed M. Bayoumi, "Low-Cost Three-Dimensional Navigation Solution for RISS/GPS Integration Using Mixture Particle Filter," IEEE Transactions on Vehicular Technology, Feb. 2010, pp. 599-615, Volume, No. 2.

* cited by examiner

*Primary Examiner* — Thomas Tarcza
*Assistant Examiner* — Edward Pipala
(74) *Attorney, Agent, or Firm* — Marsh Fischmann & Breyfogle LLP

(57) ABSTRACT

A navigation module and method for providing an INS/GNSS navigation solution for a moving platform is provided, comprising a receiver for receiving absolute navigational information from an external source (e.g., such as a satellite), means for obtaining speed or velocity information and an assembly of self-contained sensors capable of obtaining readings (e.g., such as relative or non-reference based navigational information) about the moving platform, and further comprising at least one processor, coupled to receive the output information from the receiver, sensor assembly and means for obtaining speed or velocity information, and operative to integrate the output information to produce a navigation solution. The at least one processor may operate to provide a navigation solution by using the speed or velocity information to decouple the actual motion of the platform from the readings of the sensor assembly.

74 Claims, 65 Drawing Sheets

METHOD AND APPARATUS FOR IMPROVED NAVIGATION OF A MOVING PLATFORM

FIELD OF THE INVENTION

The present invention relates to positioning and navigation systems adapted for use in environments with good, degraded, or denied satellite-based navigation signals.

BACKGROUND OF THE INVENTION

The positioning of a moving platform, such as, wheel-based platforms/vehicles or individuals, is commonly achieved using known reference-based systems, such as the Global Navigation Satellite Systems (GNSS). The GNSS comprises a group of satellites that transmit encoded signals and receivers on the ground, by means of trilateration techniques, can calculate their position using the travel time of the satellites' signals and information about the satellites' current location.

Currently, the most popular form of GNSS for obtaining absolute position measurements is the global positioning system (GPS), which is capable of providing accurate position and velocity information provided that there is sufficient satellite coverage. However, where the satellite signal becomes disrupted or blocked such as, for example, in urban settings, tunnels and other GNSS-degraded or GNSS-denied environments, a degradation or interruption or "gap" in the GPS positioning information can result.

In order to achieve more accurate, consistent and uninterrupted positioning information, GNSS information may be augmented with additional positioning information obtained from complementary positioning systems. Such systems may be self-contained and/or "non-reference based" systems within the platform, and thus need not depend upon external sources of information that can become interrupted or blocked.

One such "non-reference based" or relative positioning system is the inertial navigation system (INS). Inertial sensors are self-contained sensors within the platform that use gyroscopes to measure the platform's rate of rotation/angle, and accelerometers to measure the platform's specific force (from which acceleration is obtained). Using initial estimates of position, velocity and orientation angles of the moving platform as a starting point, the INS readings can subsequently be integrated over time and used to determine the current position, velocity and orientation angles of the platform. Typically, measurements are integrated once for gyroscopes to yield orientation angles and twice for accelerometers to yield position of the platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors.

Another known complementary "non-reference based" system is a system for measuring speed/velocity information such as, for example, odometric information from a odometer within the platform. Odometric data can be extracted using sensors that measure the rotation of the wheel axes and/or steer axes of the platform. Wheel rotation information can then be translated into linear displacement, thereby providing wheel and platform speeds, resulting in an inexpensive means of obtaining speed with relatively high sampling rates. Where initial position and orientation estimates are available, the odometric data are integrated thereto in the form of incremental motion information over time.

Odometry has short-term accuracy, however, odometric data can contain errors such as those that may arise from wheel slippage. If odometry is to be used alone to obtain a positioning solution (i.e. using it to get both translational speed of the platform as well as rotational motion), the integration of motion information including errors such as wheel slippage will result in the small errors increasing without bound over time because of integration operations. For instance, it is known that orientation errors can create large positional errors that increase with the distance traveled by the platform.

Given that each positioning technique described above (INS/GNSS/Speed Information) may suffer loss of information or errors in data, common practice involves integrating the information/data obtained from the GNSS with that of the complementary system(s). For instance, to achieve a better positioning solution, INS and GPS data may be integrated because they have complementary characteristics. INS readings are accurate in the short-term, but their errors increase without bounds in the long-term due to inherent sensor errors. GNSS readings are not as accurate as INS in the short-term, but GNSS accuracy does not decrease with time, thereby providing long-term accuracy. Also, GNSS may suffer from outages due to signal blockage, multipath effects, interference or jamming, while INS is immune to these effects.

Although available, integrated INS/GNSS is not often used commercially for low cost applications because of the relatively high cost of navigational or tactical grades of inertial measurement units (IMUs) needed to obtain reliable independent positioning and navigation during GNSS outages. Low cost, small, lightweight and low power consumption Micro-Electro-Mechanical Systems (MEMS)-based inertial sensors may be used together with low cost GNSS receivers, but the performance of the navigation system will degrade very quickly in contrast to the higher grade IMUs in areas with little or no GNSS signal availability due to time-dependent accumulation of errors from the INS.

Speed information from the odometric readings, or from any other source, may be used to enhance the performance of the MEMS-based integrated INS/GNSS solution by providing velocity updates, however, current INS/Odometry/GNSS systems continue to be plagued with the unbounded growth of errors over time during GNSS outages.

One reason for the continued problems is that commercially available navigation systems using INS/GNSS integration or INS/Odometry/GNSS integration rely on the use of traditional Kalman Filter (KF)-based techniques for sensor fusion and state estimation. The KF is an estimation tool that provides a sequential recursive algorithm for the estimation of the state of a system when the system model is linear.

As is known, the KF estimates the system state at some time point and then obtains observation "updates" in the form of noisy measurements. As such, the equations for the KF fall into two groups:

Time update or "prediction" equations: used to project forward in time the current state and error covariance estimates to obtain an a priori estimate for the next step, or Measurement update or "correction" equations: used to incorporate a new measurement into the a priori estimate to obtain an improved posteriori estimate.

While the commonly used Linearized KF (LKF) and Extended KF (EKF) can provide adequate solutions when higher grade IMUs are utilized by linearizing the originally nonlinear models, the KF generally suffers from a number of major drawbacks that become influential when using low cost MEMS-based inertial sensors, as outlined below.

The INS/GNSS integration problem at hand has nonlinear models. Thus, in order to utilize the linear KF estimation techniques in this type of problem, the nonlinear INS/GNSS model has to be linearized around a nominal trajectory. This linearization means that the original (nonlinear) problem be transformed into an approximated problem that may be solved optimally, rather than approximating the solution to the correct problem. The accuracy of the resulting solution can thus be reduced due to the impact of neglected nonlinear and higher order terms. These neglected higher order terms are more influential and cause error growth in the positioning solution, in degraded and GNSS-denied environments, particularly when low cost MEMS-based IMUs are used.

Further, the KF requires an accurate stochastic model of each of the inertial sensor errors, which can be difficult to obtain, particularly where low cost MEMS-based sensors are used because they suffer from complex stochastic error characteristics. The KF is restricted to use only linear low-order (low memory length) models for these sensors' stochastic errors such as, for example, random walk, Gauss-Markov models, first order Auto-Regressive models or second order Auto-Regressive models. The dependence of the KF on these inadequate models is also a drawback of the KF when using low cost MEMS-based inertial sensors.

As a result of these shortcomings, the KF can suffer from significant drift or divergence during long periods of GNSS signal outages, especially where low cost sensors are used. During these periods, the KF operates in prediction mode where errors in previous predictions, which are due to the stochastic drifts of the inertial sensor readings not well compensated by linear low memory length sensors' error models and inadequate linearized models, are propagated to the current estimate and summed with new errors to create an even larger error. This propagation of errors causes the solution to drift more with time, which in turn causes the linearization effect to worsen because of the drifting solution used as the nominal trajectory for linearization (in both LKF and EKF cases). Thus, the KF techniques suffer from divergence during outages due to approximations during the linearization process and system mis-modeling, which are influential when using MEMS-based sensors.

In addition, the traditional INS typically relies on a full inertial measurement unit (IMU) having three orthogonal accelerometers and three orthogonal gyroscopes. This full IMU setting has several sources of error, which, in the case of low-cost MEMS-based IMUs, will cause severe effects on the positioning performance. The residual uncompensated sensor errors, even after KF compensation, can cause position error composed of three additive quantities: (i) proportional to the cube of GNSS outage duration and the uncompensated horizontal gyroscope biases; (ii) proportional to the square of GNSS outage duration and the three accelerometers uncompensated biases, and (iii) proportional to the square of GNSS outage duration, the horizontal speed, and the vertical gyroscope uncompensated bias.

Another traditional solution, known as Dead reckoning, which can be used to provide a two dimensional (2D) positioning solution for land vehicles using a single axis gyroscope vertically aligned with the vehicle and the speed readings from an odometer. Dead reckoning relies on an assumption that vehicles will primarily move on the horizontal plane. However, this solution is also plagued with certain drawbacks, namely: (i) it is a 2D solution that does not estimate the altitude nor the vertical component of velocity; and (ii) assuming that the vehicle is moving in the horizontal plane, it disregards the tilt angles of the vehicles and subsequently the off-plane motion which causes two main issues: (a) the assumption that the gyroscope vertically aligned to the vehicle also has its axis in the pure vertical (i.e. normal to the East-North plane), which is a problem because its axis is actually tilted, will affect the accuracy of the azimuth calculation, and (b) the assumption that the vehicle's traveled path is horizontal, which is a problem because the vehicle and its path are actually tilted, will cause an error in the horizontal position estimation.

The foregoing drawbacks of the KF have resulted in increased investigation into alternative methods of INS/GNSS integration models, such as, for example, nonlinear artificial intelligence techniques. However, there is a need for enhancing the performance of low-end systems relying on low cost MEMS-based INS/GNSS sensors and for mitigating the effect of all sources of errors to provide a more adequate navigation solution. Further, there is also a need for more advanced modeling techniques that are capable of modeling the stochastic sensor errors instead of the linear low memory length models currently used.

SUMMARY

A navigation module for providing an INS/GNSS navigation solution for a moving platform is provided. A method of using the navigation module to determine an INS/GNSS navigation solution is also provided.

The module comprises a receiver for receiving absolute navigational information about the moving platform from an external source (e.g., such as a satellite), and producing an output of navigational information indicative thereof.

The module further comprises means for obtaining speed or velocity information and producing an output of information indicative thereof.

The module further comprises an assembly of self-contained sensors capable of obtaining readings (e.g., such as relative or non-reference based navigational information) and producing an output indicative thereof for generating navigational information. The sensor assembly may comprise accelerometers, gyroscopes, magnetometers, barometers, and any other self-contained sensing means that are capable of generating navigational information. More specifically, where the means for generating speed or velocity information (e.g., such as an odometer), is capable of providing uninterrupted information to the module, the sensor assembly may comprise at least two accelerometers and one gyroscope. Alternatively, where the means for generating speed or velocity information is subject to interruption (e.g. such as platforms having transceivers that enables them to get their own Doppler-derived velocities), the sensor assembly may comprise three accelerometers and three gyroscopes.

Finally, the module further comprises at least one processor, coupled to receive the output information from the receiver, sensor assembly and means for obtaining speed or velocity information, and operative to integrate the output information to produce a navigation solution. The at least one processor may operate to provide a navigation solution by using the speed or velocity information to decouple the actual motion of the platform from the readings of the sensor assembly. The processor may be programmed to utilize a filtering technique, such as a non-linear filtering technique (e.g., a Mixture Particle Filter), and the integration of the information from different sources may be done in either loosely or tightly coupled integration schemes. The filtering algorithm may utilize a system model and a measurement model, wherein the system and measurement model used by the algorithm may depend upon whether or not the speed or velocity information available to the module can be interrupted. The system and measurement models utilized by the present navigation module provides new combinations of sensor assembly and speed or velocity information and enhanced navigation solutions relating to a moving platform, even in circumstances of degraded or denied GNSS information.

A method for determining an improved navigation solution is further provided comprising the steps of:

a) receiving absolute navigational information from an external source and producing output readings indicative thereof;

b) obtaining readings relating to navigational information at self-contained sensors within the module and producing an output indicative thereof;

c) obtaining speed or velocity information and producing output readings indicative thereof; and d) providing at least one processor for processing and filtering the navigational information and speed or velocity information to produce a navigation solution relating to the module, wherein the at least one processor is capable of utilizing the speed or velocity readings to decouple the actual motion of the platform from the sensor information.

Where, the navigation module comprises a non linear state estimation or filtering technique, such as, for example, Mixture Particle Filter for performing INS/GNSS integration, the module may be optionally enhanced to provide advanced modeling of inertial sensors stochastic drift together with the derivation of measurement updates for such drift.

The module may be optionally programmed to detect and assess the quality of GNSS information received by the module and, where degraded, automatically discard or discount the information.

The module may be optionally enhanced to automatically switch between a loosely coupled integration scheme and a tightly coupled integration scheme.

The module may be optionally enhanced to automatically assess measurements from each external source, or GNSS satellite visible to the module in case of a tightly coupled integration scheme, and detect degraded measurements.

The module may be optionally enhanced to calculate misalignment between the sensor assembly of the module and the platform.

The module may be optionally enhanced to perform a backward or post-mission process to calculate a solution subsequent to the forward navigation solution, and to blend the two solutions to provide an enhanced backward smoothed solution.

The module may be optionally enhanced to perform one or more of any of the foregoing options.

Table 1: RMS horizontal position error during GPS outages for Montreal trajectory shown in FIG. 3.

Table 2: Maximum horizontal position error during GPS outages for Montreal trajectory.

Table 3: RMS altitude error during GPS outages for the Montreal trajectory.

Table 4: Maximum altitude error during GPS outages for Montreal trajectory.

Table 5: RMS horizontal position error during 120 sec. GPS outages for Kingston-Napanee trajectory.

Table 6: Maximum horizontal position error during 120 sec. GPS outages for Kingston-Napanee trajectory.

Table 7: RMS altitude error during 120 sec. GPS outages for Kingston-Napanee trajectory.

Table 8: Maximum altitude error during 120 sec. GPS outages for Kingston-Napanee trajectory.

Table 9: RMS horizontal position error during 60 sec. GPS outages for Montreal-Kingston trajectory.

Table 10: Maximum horizontal position error during 60 sec. GPS outages for Montreal-Kingston trajectory.

Table 11: RMS horizontal position error during 180 sec. GPS outages for Montreal-Kingston trajectory.

Table 12: Maximum horizontal position error during 180 sec. GPS outages for Montreal-Kingston trajectory.

Table 13: Maximum position error during the 10 simulated outages for different numbers of visible satellites.

Table 14: RMS and maximum position error for the natural GPS degradation or blockage periods whose duration exceeds 100 sec in the Toronto trajectory shown in FIG. 46.

Table 15: Crossbow 300CC IMU specifications.

Table 16: Analog Devices ADIS16405 IMU Specifications.

Table 17: Honeywell HG1700 IMU Specifications.

Table 18: Benchmarking results for different GNSS outages durations with over 100. randomly simulated outages for each duration.

DESCRIPTION OF THE PREFERRED EMBODIMENT

An improved navigation module and method for providing an INS/GNSS navigation solution for a moving platform is provided. More specifically, the present navigation module and method for providing a navigation solution may be used as a means of overcoming inadequacies of: (i) traditional full IMU/GNSS integration, traditional full IMU/Odometry/GNSS integration, and traditional 2D dead reckoning/GNSS integration; (ii) commonly used linear state estimation techniques where low cost inertial sensors are used, particularly in circumstances where positional information from the GNSS is degraded or denied, such as in urban canyons, tunnels and other such environments. Despite such degradation or denial of GNSS information, the present navigation module and method of producing navigational information may provide uninterrupted navigational information about the moving platform by augmenting the INS/GNSS information with additional complementary sources of information. The type of complementary information used, and how such information is used, may depend upon the assembly of the navigation module and the use thereof.

Navigation Module

Figure 1:
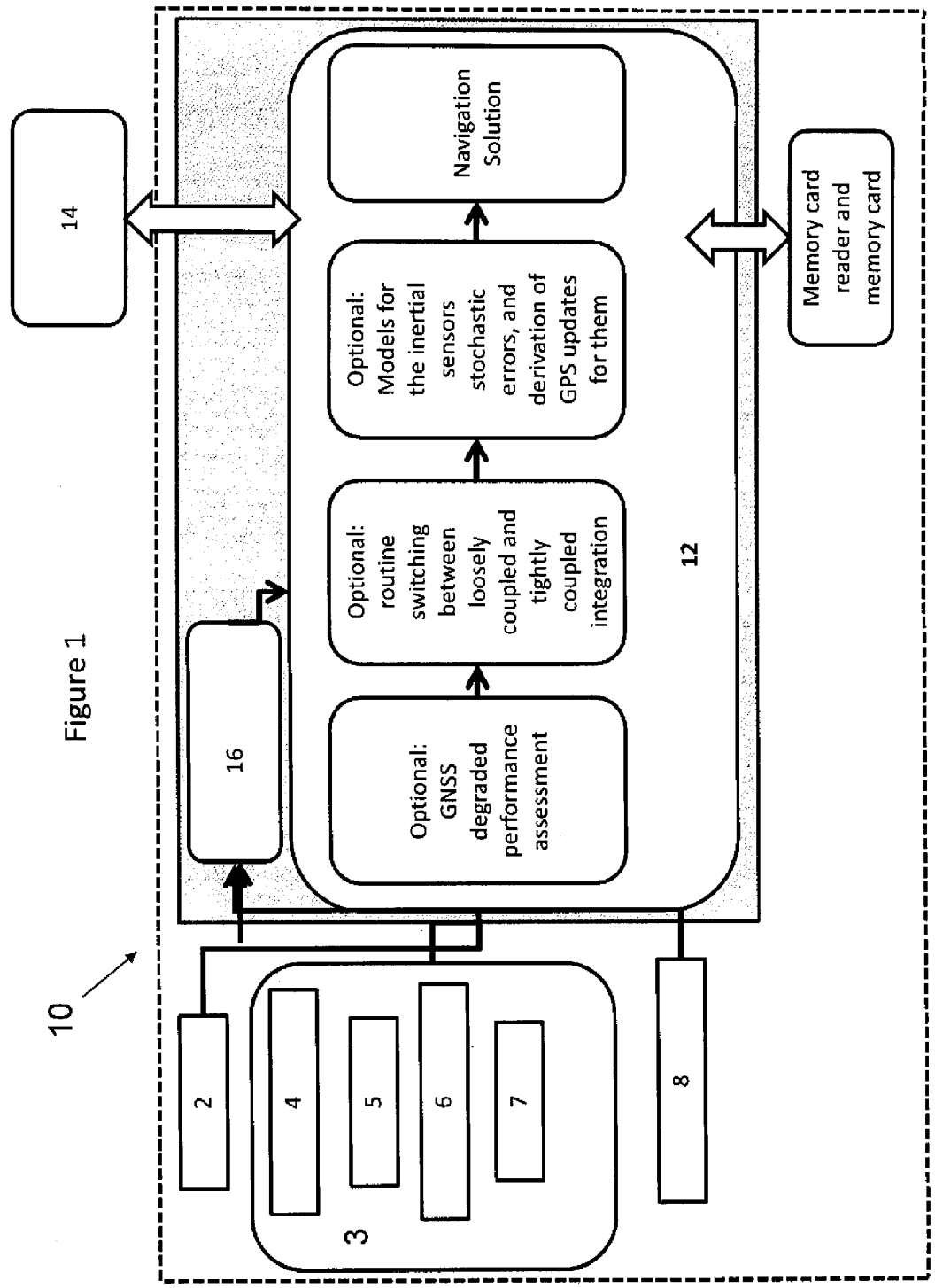
FIG. 1: A diagram demonstrating the present navigation module as defined herein.

The present navigation module 10 (FIG. 1) may comprise means for receiving "absolute" or "reference-based" navigation information 2 about a moving platform from external sources, such as satellites, whereby the receiving means is capable of producing an output indicative of the navigation information. For example, the receiver means may be a GNSS receiver capable of receiving navigational information from GNSS satellites and converting the information into position, and velocity information about the moving platform. The GNSS receiver may also provide navigation information in the form of raw measurements such as pseudoranges and Doppler shifts.

In one embodiment, the GNSS receiver may be a Global Positioning System (GPS) receiver, such as a uBlox LEA-5T receiver module. It is to be understood that any number of receiver means may be used including, for example and without limitation, a NovAtel OEM 4 dual frequency GPS receiver, a NovAtel OEMV-1G single frequency GPS receiver, or a Trimble Lassen SQ GPS receiver, which is a single frequency low-end receiver with access to GPS only.

The present navigation module may also comprise self-contained sensor means 3, in the form of a sensor assembly, capable of obtaining or generating "relative" or "non-reference based" readings relating to navigational information about the moving platform, and producing an output indicative thereof. For example, the sensor assembly may be made up of accelerometers 4, for measuring accelerations, and gyroscopes 5, for measuring turning rates of the moving platform. Optionally, the sensor assembly may have other self-contained sensors such as, without limitation, magnetometers 6, for measuring magnetic field strength for establishing heading, barometers 7, for measuring pressure to establish altitude, or any other sources of "relative" navigational information.

In one embodiment, the sensor assembly may comprise orthogonal Micro-Electro-Mechanical Systems (MEMS) accelerometers, and MEMS gyroscopes, such as, for example, those obtained in one inertial measurement unit package from Analog Devices Inc. (ADI) Model No. ADIS16405, and may or may not include orthogonal magnetometers available in the same package or in another package such as, for example model HMC5883L from Honeywell, and barometers such as, for example, (model MS5803) from Measurement Specialties.

More specifically, if circumstances arise where means of speed or velocity reading information is available and uninterrupted, one embodiment of the present navigation module may comprise a sensor assembly having a reduced number of inertial sensors with at least two accelerometers in the longitudinal and lateral directions of the moving platform, and one vertical gyroscope for monitoring heading rate of the platform. In one embodiment, the sensor assembly comprises two accelerometers (in the longitudinal and lateral directions) and one gyroscope. Optionally, other self-contained sources of navigational information such as, for example, magnetometers and/or barometers and/or a third vertical accelerometer may be added.

In circumstances where means of speed reading or velocity information is available, but interrupted, another embodiment of the present navigation module may comprise a traditional sensor assembly having three accelerometers in the longitudinal, lateral and vertical directions of the moving platform, and between one and three vertical gyroscopes (two for measuring roll and pitch, and a vertical gyroscope for measuring heading). Optionally, other self-contained sources of navigational information such as, for example, magnetometers and/or barometers may be added.

Third, the present navigation module may comprise means for or a source for obtaining speed and/or velocity information 8 of the moving platform, wherein said source is capable of further generating an output or "reading" indicative thereof. While it is understood that such source can be either speed and/or velocity information, said source shall only be referenced here in as a source of speed information. In one embodiment, the source for generating speed information may comprise an odometer, a wheel-encoder, shaft or motor encoder of any wheel-based or track-based platform, or to any other source of speed and/or velocity readings (for example, those derived from Doppler shifts of any type of transceiver). In a preferred embodiment, the source for generating speed is the built-in odometer of the platform. The source of obtaining speed information, such as the odometer, may be connected to the Controller Area Network (CAN) bus or the On Board Diagnostics version II (OBD-II) of the platform. It should be understood that the means or source for generating speed/velocity information about the moving platform may be connected to the navigation module via wired or wireless connection.

Figure 2A:
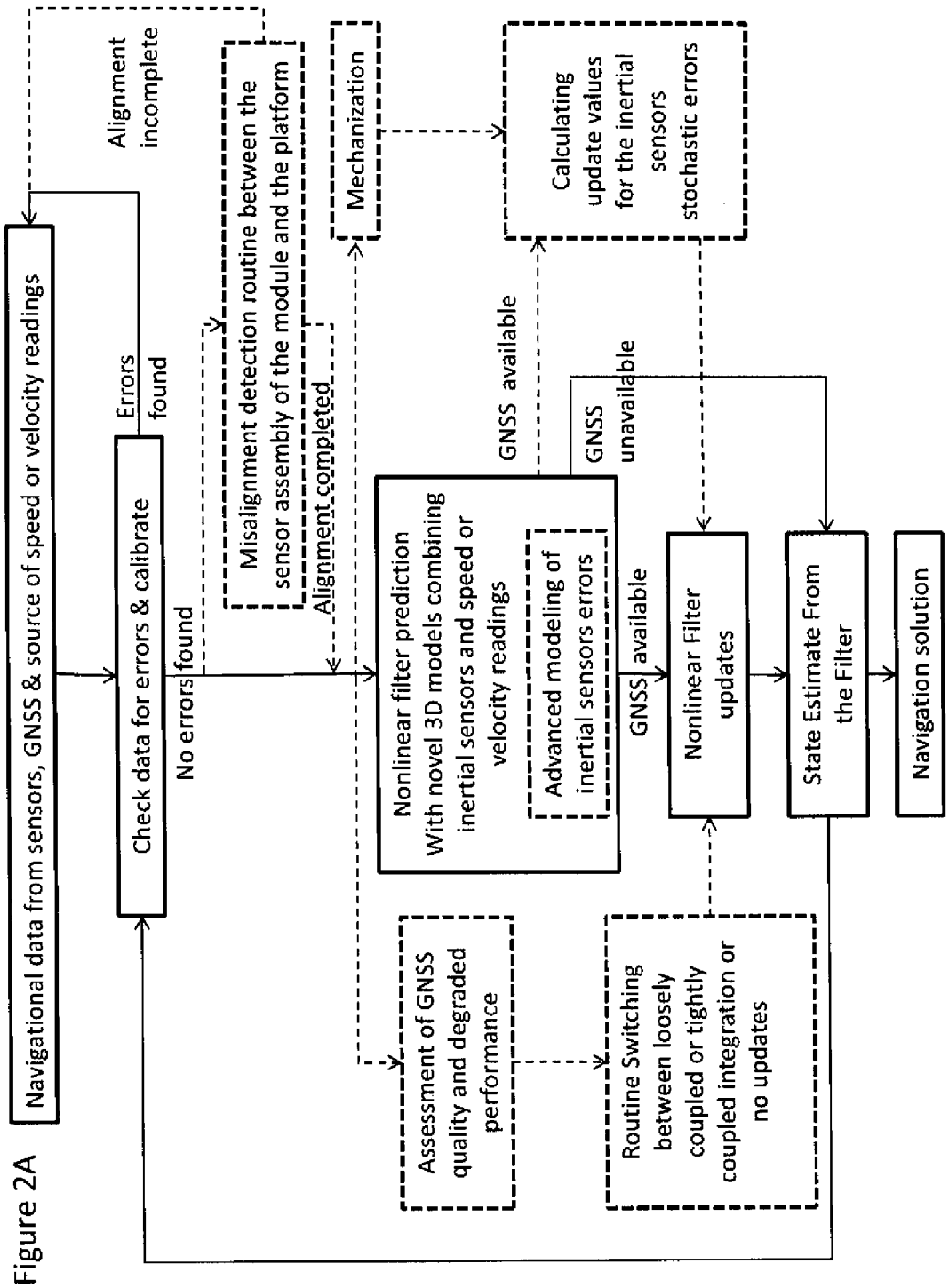
FIG. 2A: A flow chart diagram demonstrating the present navigation module of FIG. 1 (dashed lines and arrows depict optional processing).

Finally, the present navigation module 10 may comprise at least one processor 12 or microcontroller coupled to the module for receiving and processing the foregoing absolute navigation 2, sensor assembly 3 and speed information 8, and determining a navigation solution output using the speed information to decouple the actual motion of the platform from the sensor assembly information. In both circumstances of GNSS availability and interruption, the decoupling of the information may occur by way of mathematical system and measurement models that the processor is programmed to use (FIG. 2A), however the models differ in each case, as discussed in detail below.

The navigation solution determined by the present navigation module 10 may be communicated to a display or user interface 14. It is contemplated that the display 14 be part of the module 10, or separate therefrom (e.g., connected wired or wirelessly thereto). The navigation solution determined in real-time by the present navigation module 10 may further be stored or saved to a memory device/card 16 operatively connected to the module 10.

In one embodiment, a single processor such as, for example, ARM Cortex R4 or an ARM Cortex A8 may be used to integrate and process the signal information. In another embodiment, the signal information may initially be captured and synchronized by a first processor such as, for example, an ST Micro (STM32) family or other known basic microcontroller, before being subsequently transferred to a second processor such as, for example, ARM Cortex R4 or ARM Cortex A8.

The processor may be programmed to use known state estimation techniques to provide the navigation solution. In one embodiment, the state estimation technique may be a non-linear technique. In a preferred embodiment, the processor may be programmed to use the non-linear Particle Filter (PF) or the Mixture PF. In another embodiment, the processor may be programmed to use a linear state estimation technique, thereby necessitating linearization of the information.

It is an object of the present navigation module 10 to produce three dimensional (3D) position, velocity and orientation information for any moving platform that is, for example, wheel-based, track-based or has a source of speed or velocity readings (whether interrupted or not), particularly for circumstances where positional information from the GNSS is degraded or denied. It is a further object that the integrated navigation solution may be operable in land-based wheeled platforms such as automobiles, machinery with wheels, mobile robots and wheelchairs, or with any non-wheeled system provided that they have means of measuring speed or velocity (for example Doppler-derived velocity).

It is known that there are three main types of INS/GNSS integration that have been proposed to attain maximum advantage depending upon the type of use and choice of simplicity versus robustness. This leads to three main integration architectures:

1. Loosely coupled
2. Tightly coupled
3. Ultra-tightly coupled (or deeply coupled).

The first type of integration, which is called loosely coupled, uses an estimation technique to integrate inertial sensors data with the position and velocity output of a GNSS receiver. The distinguishing feature of this configuration is a separate filter for the GNSS. This integration is an example of cascaded integration because of the two filters (GNSS filter and integration filter) used in sequence.

The second type, which is called tightly coupled, uses an estimation technique to integrate inertial sensors readings with raw GNSS data (i.e. pseudoranges that can be generated from code or carrier phase or a combination of both, and pseudorange rates that can be calculated from Doppler shifts) to get the vehicle position, velocity, and orientation. In this solution, there is no separate filter for GNSS, but there is a single common master filter that performs the integration.

For the loosely coupled integration scheme, at least four satellites are needed to provide acceptable GNSS position and velocity input to the integration technique. The advantage of the tightly coupled approach is that less than four satellites can be used as this integration can provide a GNSS update even if fewer than four satellites are visible, which is typical of a real life trajectory in urban environments as well as thick forest canopies and steep hills. Another advantage of tightly coupled integration is that satellites with poor GNSS measurements can be detected and rejected from being used in the integrated solution.

For the third type of integration, which is ultra-tight integration, there are two major differences between this architecture and those discussed above. Firstly, there is a basic difference in the architecture of the GNSS receiver compared to those used in loose and tight integration. Secondly, the information from INS is used as an integral part of the GNSS receiver, thus, INS and GNSS are no longer independent navigators, and the GNSS receiver itself accepts feedback. It should be understood that the present navigation solution may be utilized in any of the foregoing types of integration.

In one embodiment, the present navigation module 10 may operate to determine a three dimensional (3D) navigation solution by calculating 3D position, velocity and attitude of a moving platform, wherein the navigation module comprises absolute navigational information from a GNSS receiver, the self-contained sensors which are MEMS-based reduced inertial sensor systems comprising two orthogonal accelerometers and one single-axis gyroscope vertically aligned to the platform, speed/velocity information from the odometer of the moving platform, and a processor programmed to integrate the information using Mixture PF in a loosely coupled architecture, having a system and measurement model, wherein the system model is capable of utilizing the speed information to decouple the actual motion of the platform from the readings of the accelerometers (see Example 1).

In another embodiment, the present navigation module may operate to determine a 3D navigation solution by calculating position, velocity and attitude of a moving platform, wherein the module comprises a full (three orthogonal accelerometers and three orthogonal gyroscopes) MEMS-based INS/GNSS integration using Mixture PF in a loosely coupled architecture while using the decoupling idea to provide extra measurement updates during GNSS availability and/or during GNSS outages (see Example 2).

In another embodiment, the present navigation module may optionally be programmed to utilize an enhanced loosely-coupled Mixture PF INS/GNSS integration, wherein the integration further comprises the advanced modeling of inertial sensors stochastic drift together with the derivation of updates for such drift from GNSS, where appropriate (see Example 3).

In another embodiment, the present navigation module may also optionally be programmed to automatically detect and assess the quality of GNSS information, and further provide a means of discarding or discounting degraded information (see Example 4).

In another embodiment, the present navigation module may optionally be programmed to utilize a Mixture PF for tightly-coupled INS/GNSS integration (see Example 5—Kingston Trajectory). In another embodiment, the navigation module may optionally be further programmed to elect information between a loosely coupled and a tightly coupled integration scheme (see Example 5—Toronto Trajectory). Moreover, where tightly coupled architecture is elected, the GNSS information from each available satellite may be assessed independently and either discarded (where degraded) or utilized as a measurement update (see Example 5—Toronto Trajectory).

In another embodiment, the present navigation module may optionally be programmed to operate an alignment procedure, which may be performed to calculate the orientation of the housing or frame of the sensor assembly within the frame of the moving platform, such as, for example the technique described in Example 7.

In another embodiment, the present navigation module may optionally be programmed to detect stopping periods, known as zero velocity update (zupt) periods, either from the speed or velocity readings, from the inertial sensors readings, or from a combination of both. The detected stopping periods may be used to perform explicit zupt updates if the speed or velocity readings are interrupted. It is to be noted that in the case where the speed or velocity readings are uninterrupted, no explicit zupt update is needed because it is always implicitly performed. The detected stopping periods may be also used to automatically recalculate the biases of the inertial sensors.

Figure 2B:
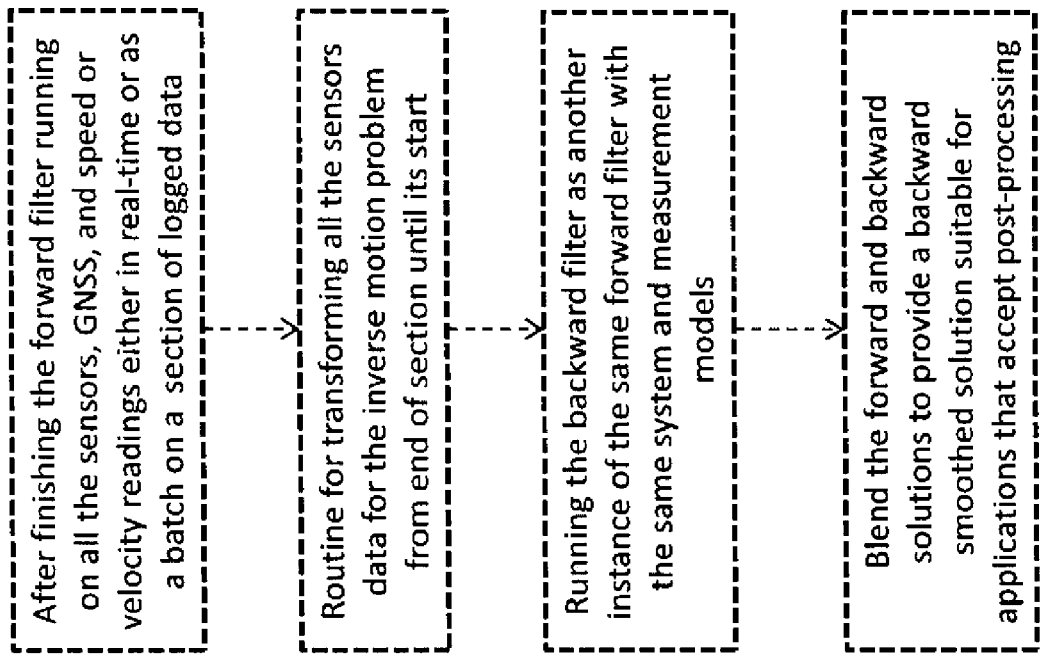
FIG. 2B: A flow chart diagram demonstrating the optional post-mission embodiment of the present navigation module defined herein.
Figure 3:
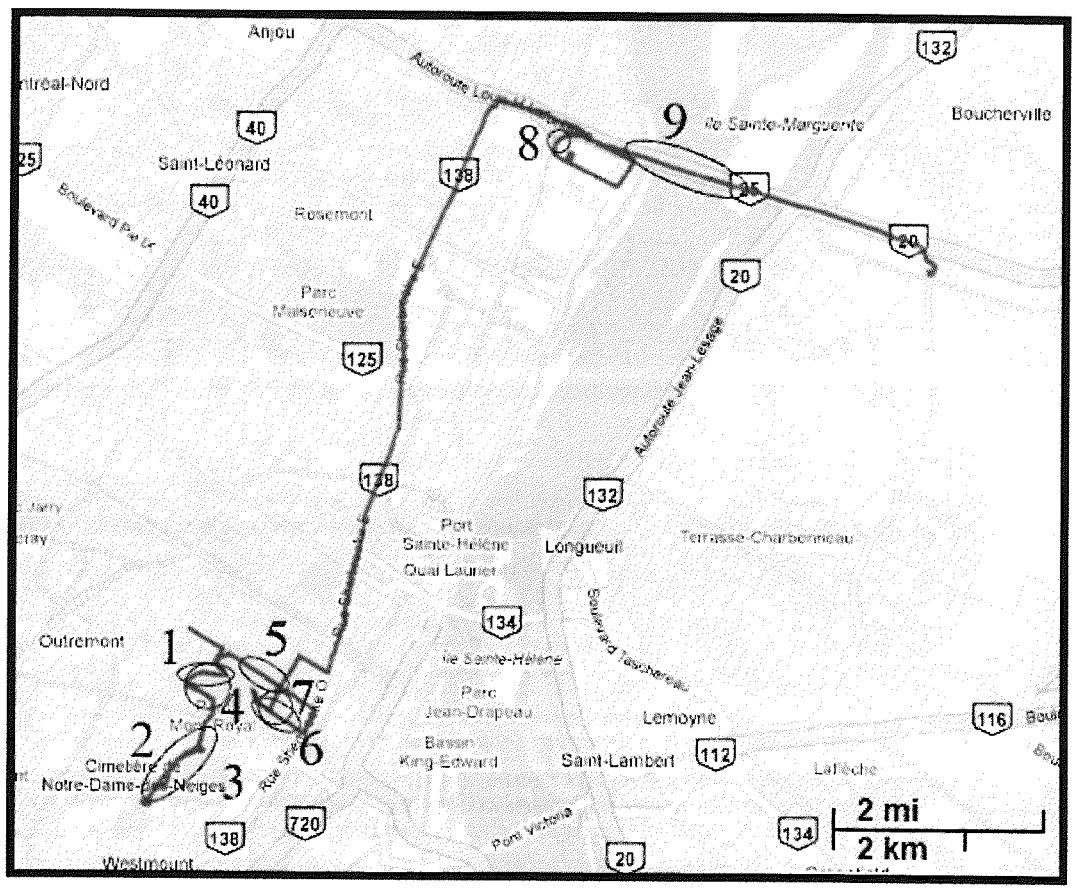
FIG. 3: Road Test Trajectory in Montreal, Quebec, Canada. Circles indicate the locations of GPS outages.

In another embodiment, the present navigation module may optionally be programmed to determine a low-cost backward smoothed positioning solution for a moving platform with speed or velocity readings (whether interrupted or not), such a positioning solution might be used, for example, by mapping systems (see FIG. 3 and Example 6). In one embodiment, the foregoing navigation module utilizing low-cost MEMS inertial sensors, the platform's odometer and GNSS along with a nonlinear filtering technique, may be further enhanced by exploiting the fact that mapping problem accepts post-processing and that nonlinear backward smoothing may be achieved (see FIG. 2B).

It is contemplated that the present system and/or measurement models, relying on the fact that the motion of the moving platform detected from the speed or velocity readings (whether uninterrupted or interrupted) is decoupled from the sensors assembly readings, can be used with any type of state estimation technique or filtering technique, for e.g., linear or non-linear techniques alone or in combination. If the technique is nonlinear, the nonlinear system and measurement models are utilized as defined herein. If the state estimation technique is linear, for example a Kalman filter (KF)-based technique, the present nonlinear system and measurement models will be linearized to be used as the system and measurement model inside the KF. In the latter circumstance, the present nonlinear system model will be used without the process noise terms in what is called "mechanization", which provides the nominal solution around which the linearization is performed. This mechanization can be an unaided mechanization in case of open loop systems or an aided mechanization that receives feedback from the estimated solution in the case of closed loop systems.

It is contemplated that the optional modules presented above can be used with other sensors combinations (i.e. different system and measurement models) not just those used in the present navigation module relying on the fact that the motion of the moving platform detected from the speed or velocity readings (whether uninterrupted or interrupted) is decoupled from the sensors assembly readings. The optional modules are the advanced modeling of inertial sensors errors, the derivation of possible measurements updates for them from GNSS when appropriate, the automatic assessment of GNSS solution quality and detecting degraded performance, the automatic switching between loosely and tightly coupled integration schemes, the assessment of each visible GNSS satellite when in tightly coupled mode, the alignment detection module, the automatic zupt detection with its possible updates and inertial sensors bias recalculations, and finally the backward smoothing technique. For example, the optional modules can be used with navigation solutions relying on a 2D dead reckoning or a traditional full IMU It is contemplated that the optional modules presented above can be used with navigation solutions relying on either linear or nonlinear state estimation techniques or filtering techniques.

It is further contemplated that the present navigation module comprising a new combination of speed readings and the inertial sensors can also be used (whether with linear or nonlinear filtering techniques) together with modeling (whether with linear or nonlinear, short memory length or long memory length) and/or automatic calibration for the errors in speed or velocity readings. It is also contemplated that modeling (whether with linear or nonlinear, short memory length or long memory length) and/or calibration for the other errors of inertial sensors (not just the stochastic drift) can be used. It is also contemplated that modeling (whether with linear or nonlinear, short memory length or long memory length) and/or calibration for the other sensors in the sensor assembly (such as, for example the barometer and magnetometer) can be used.

It is further contemplated that the other sensors in the sensor assembly such as, for example, the barometer (e.g. with the altitude derived from it) and magnetometer (e.g. with the heading derived from it) can be used in one or more of different ways such as: (i) as control input to the system model of the filter (whether with linear or nonlinear filtering techniques); (ii) as measurement update to the filter either by augmenting the measurement model or by having an extra update step; (iii) in the routine for automatic GNSS degradation checking; (iv) in the alignment procedure that calculates the orientation of the housing or frame of the sensor assembly within the frame of the moving platform.

It is further contemplated that the source of velocity readings (in the case that these readings accept interruption) can be the GNSS receiver itself. This means that the velocity from the GNSS receiver and the speed calculated thereof can be used to decouple the motion of the platform from the sensor assembly readings. All the modules of the solution can continue performing their work based on this. An example of the usage of this contemplation is the ability to calculate pitch and roll angles from a single GNSS receiver with a single antenna together with two or three accelerometers.

It is further contemplated that the hybrid loosely/tightly coupled integration scheme option in the present navigation module electing either way can be replaced by other architectures that benefits from the advantages of both loosely and tightly coupled integration. Such other architecture might be doing the raw GNSS measurement updates from one side (tightly coupled updates) and the loosely coupled GNSS-derived heading update and inertial sensors errors updates from the other side: (i) sequentially in two consecutive update steps, or (ii) in a combined measurement model with corresponding measurement covariances.

It is further contemplated that the alignment calculation option between the frame of the sensor assembly and the frame of the moving platform can be either augmented or replaced by other techniques for calculating the misalignment between the two frames. Some misalignment calculation techniques, which can be used, are able to resolve all tilt and heading misalignment of a free moving unit containing the sensors within the moving platform.

It is further contemplated that the sensor assembly can be either tethered or non-tethered to the moving platform.

It is further contemplated that the present navigation module can use when appropriate some constraints on the motion of the platform such as adaptive Non-holonomic constraints, for example, those that keep a platform from moving sideways or vertically jumping off the ground. These constraints can be used as an explicit extra update in the case where the speed or velocity updates are interrupted (i.e. when utilizing the full three accelerometers and the three gyroscopes), or implicitly when projecting speed to perform velocity updates. These constraints are already implicitly used in the case when the speed or velocity readings are uninterrupted (i.e. when utilizing the reduced sensor system relying on the new combination of inertial sensors and speed or velocity readings in the system model).

It is further contemplated that the present navigation module can be further integrated with maps (such as steep maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or denial), or they can totally replace the absolute navigation information in some applications.

It is further contemplated that the present navigation module, when working either in a tightly coupled scheme or the hybrid loosely/tightly coupled option, need not be bound to utilizing pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based paseudorange and carrier-phase measurements, such enhancements is the carrier-smoothed pseudorange.

It is further contemplated that the present navigation module comprising a new combination of speed readings and the inertial sensors (based on using the speed readings for decoupling the motion of the moving platform from the sensor assembly readings) can also be used in a system that implements an ultra-tight integration scheme between GNSS receiver and these other sensors and speed readings.

It is further contemplated that the present navigation module and method herein can be used with various wireless communication systems that can be used for positioning and navigation either as an additional aid (that will be more beneficial when GNSS is unavailable) or as a substitute for the GNSS information (e.g. for applications where GNSS is not applicable). Examples of these wireless communication systems used for positioning are, such as, those provided by cellular phone towers, radio signals, television signal towers, WiFi or Wimax. For example, for cellular phone based applications, an absolute coordinate from cell phone towers and the ranges between the indoor user and the towers may utilize the methodology described herein, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. By further example, for WiFi positioning applications, different methods might be used with different accuracies, such as for example, time of arrival, time difference of arrival, angles of arrival, received signal strength, and fingerprinting techniques, among others. The above-mentioned ideas, among others, are also applicable in a similar manner for other wireless positioning techniques based upon wireless communication systems.

It is further contemplated that the present navigation module and method described herein can be used with aiding information from other moving platforms. This aiding information can be used as additional aid (that will be more beneficial when GNSS is unavailable) or as a substitute for the GNSS information (e.g. for applications where GNSS is not applicable). One example of aiding information from other platforms may be capable of relying on wireless communication systems between different platforms. The underlying idea is that the moving platforms that have better positioning or navigation solution (for example having GNSS with good availability and accuracy) can help the moving platforms with degraded or unavailable GNSS to get an improved positioning or navigation solution. This help relies on the well-known position of the aiding platforms and the wireless communication system for positioning the platform(s) with degraded or unavailable GNSS. This contemplated variant refers to the on or both circumstance(s) where: (i) the platform(s) with degraded or unavailable GNSS utilize the module and method described herein and get aiding from other platforms and communication system, (ii) the aiding platform with GNSS available and thus a good navigation solution utilize the module and method described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals.

It is contemplated that the present navigation module can use various types of inertial sensors, other than MEMS based sensors described herein by way of example.

Without any limitation to the foregoing, the present navigation module and method of determining a navigation solution are further described by way of the following examples.

EXAMPLES

Example 1

Mixture Particle Filter for Three Dimensional (3D) Reduced Inertial Sensor System/GNSS Integration In the present example, the navigation module is utilized to determine a three dimensional (3D) navigation solution by calculating 3D position, velocity and attitude of a moving platform. Specifically, the module comprises absolute navigational information from a GNSS receiver, relative navigational information from a reduced number of MEMS-based inertial sensors consisting of two orthogonal accelerometers and one single-axis gyroscope (aligned with the vertical axis of the platform, instead of a full IMU with three accelerometers and three gyroscopes as will be seen in the next example), speed information from the platform odometer and a processor programmed to integrate the information in a loosely-coupled architecture using Mixture PF having the system and measurement models defined herein below. Thus, in this embodiment, the present navigation module targets a 3D navigation solution employing MEMS-based inertial sensors/GPS integration using Mixture PF.

In order to relate this Example 1 to the former Description in the patent, it is to be noted that the example and models presented in this embodiment are suitable for the case where the speed or velocity readings are uninterrupted. Thus they are used as a control input in the system model. It is to be noted that the proposed idea of using the speed or velocity readings to decouple the motion of the platform from the accelerometer readings to generate better non drifting pitch and roll estimates is used in the system model.

Background

By way of background, pitch and roll angles of a moving platform are typically calculated using information from two of the three gyroscopes used. In contrast, the present module, provides the pitch and roll angles of the platform by utilizing the measurements from two or three accelerometers, thereby eliminating the need for the two additional gyroscopes. More specifically, the present module operates to incorporate information from the two or three accelerometers into the system model used by the Mixture PF to estimate the pitch and roll angles. The benefits of this over the commonly used full IMU/GNSS integration or the commonly used 2D dead reckoning/GNSS integration will be discussed below. In general, the better pitch and roll estimates lead to estimating a more correct azimuth angle (as the gyroscope tilt from horizontal is taken into account), more correct horizontal position and velocity, in addition to the upward velocity, and the altitude.

First, the advantages of the present embodiment proposed in this example over the 2D dead reckoning solution with a single gyroscope and odometer integrated with GNSS will be discussed. One advantage of the present embodiment proposed in this example over the 2D dead reckoning solution, is the measurements of the two accelerometers being incorporated in the system model used by the filter to estimate the pitch and roll angles. The first benefit of this is the calculation of a correct azimuth angle, because the gyroscope (vertically aligned to body frame of the vehicle) is tilted together with the vehicle when it is not purely horizontal, and thus it is not measuring the angular rate in the horizontal East-North plane. Since the azimuth angle is in the East-North plane, detecting and correcting the gyroscope tilt provides a more accurate calculation of the azimuth angle than the 2D dead reckoning, which neglects this effect.

Another advantage of the present embodiment is increased accuracy due to the following: (i) the incorporation of pitch angle in calculating the two horizontal velocities from the odometer-derived speed, thus more accurate velocity and consequently position estimates, and (ii) the more accurate azimuth calculation of the first advantage leads to better estimates of velocities along East and North.

A third advantage is in the capability of calculating pitch angle, roll angle, upward velocity, and altitude, which have not typically been calculated in 2D dead reckoning solutions.

The advantages of the present embodiment proposed in this example over a full IMU/GPS solution are due to two factors, namely the calculation of pitch and roll from accelerometers instead of gyroscopes, and the calculation of velocity from odometer-derived speed instead of accelerometers. For instance, it is known that, during a GNSS outage of duration t, a residual uncompensated bias (even after KF compensation) in one of the two eliminated gyroscopes (the horizontal ones) will introduce an angle error in pitch or roll proportional to time because of integration. This small angle will cause misalignment of the INS. Therefore, when projecting the acceleration from body frame to local-level frame (here the East-North-Vertical Up frame), the acceleration vector will be projected incorrectly. This will introduce an error in acceleration in one of the horizontal channels in the local-level frame and consequently this will lead to an error in velocity proportional to $t^2$ and in position proportional to $t^3$. When pitch and roll are calculated from accelerometers, the very first integration is eliminated and thus the error in pitch and roll is not proportional to time. Furthermore, the part of position error due to these angle errors will be proportional to $t^2$ rather than $t^3$.

In addition to the above-mentioned advantage of using two accelerometers rather than two gyroscopes for calculating pitch and roll, the second advantage of the present embodiment proposed in this example is further improvement in velocity calculations. To calculate velocity using the forward speed derived from the vehicle's odometer rather than the accelerometers, relying on the non-holonomic constraints on land vehicles, achieves better performance than calculating it from the accelerometers. This is because, when calculating velocity from accelerometers, any residual uncompensated accelerometer bias error (even after KF compensation) will introduce an error proportional to the GNSS outage duration t in velocity, and an error proportional to $t^2$ in position. The calculation of velocity from the odometer avoids the first integration, so position calculation need only to involve one integration. This means that position can be obtained after one integration when odometer measurements are used while it requires two consecutive integrations to obtain position when accelerometer measurements are used. In long GNSS outages, the error when using accelerometers will be proportional to the square of the outage duration, which makes this error drastic in long outages.

In consequence to the above-described two improvements, a further improvement in position calculation follows. The errors in pitch and roll calculated from accelerometers (no longer proportional to time) will cause a misalignment of the inertial system that will influence the projection of velocity (in the case of the present embodiment proposed in this example) rather than acceleration (in full-IMU case), from body frame to local-level frame. This last fact makes the part of position error due to pitch and roll errors proportional to t rather than to the $t^2$ that was previously discussed in the first improvement of eliminating the two gyroscopes. Thus, this current benefit of odometer over accelerometer is concerning the misalignment problem discussed earlier, which will be more drastic when using accelerometers, since acceleration is projected incorrectly in case of misalignment, while when odometer is used velocity is projected incorrectly. In general, this causes a difference of another order of magnitude in time between the odometer solution and the accelerometer solution.

The only remaining main source of error in the present embodiment proposed in this example is the azimuth error due to the vertically aligned gyroscope (this error is also present in case of a full-IMU, i.e. it is not a drawback in the present embodiment proposed in this example). Any residual uncompensated bias in this vertical gyroscope will cause an error proportional to time in azimuth. The position error because of this azimuth error will be proportional to vehicle speed, time, and azimuth error (in turn proportional to time and uncompensated bias). This only remaining source of error will be tackled by adequately modeling the stochastic drift of this gyroscope using advanced modeling techniques, which leads to a solution with high positioning performance (see Example 3).

Another advantage of the present embodiment proposed in this example over a full-IMU is its further lower cost because of the use of fewer inertial sensors.

Navigation Solution

The state of the moving platform is $x_k = [\phi_k, \lambda_k, h_k, v_k^f, p_k, r_k, A_k]^T$, where $\phi_k$ is the latitude of the vehicle, $\lambda_k$ is the longitude, $h_k$ is the altitude, $v_k^f$ is the forward speed, $p_k$ is the pitch angle, $r_k$ is the roll angle, and $A_k$ is the azimuth angle.

The nonlinear system model (also called state transition model, which is here the motion model) is given by $$x_k = f(x_{k-1}, u_{k-1}, w_{k-1})$$

where $u_k$ is the control input which is the reduced inertial sensors and odometer readings, and $w_k$ is the process noise which is independent of the past and present states and accounts for the uncertainty in the platform motion and the control inputs. The state measurement model is $$z_k = h(x_k, v_k)$$

Where $v_k$ is the measurement noise which is independent of the past and current states and the process noise and accounts for uncertainty in GNSS readings.

In order to discuss some advantages of Mixture PF, which is the filtering technique used in this example, some aspects of the basic PF called Sampling/Importance Resampling (SIR) PF are first discussed. In the prediction phase, the SIR PF samples from the system model, which does not depend on the last observation. In MEMS-based INS/GNSS integration, the sampling based on the system model, which depends on inertial sensor readings as control inputs, makes the SIR PF suffers from poor performance because with more drift this sampling operation will not produce enough samples in regions where the true probability density function (PDF) of the state is large, especially in the case of MEMS-based sensors. Because of the limitation of the SIR PF, it has to use a very large number of samples to assure good coverage of the state space, thus making it computationally expensive. Mixture PF is one of the variants of PF that aim to overcome this limitation of SIR and to use much less number of samples while not sacrificing the performance. The much lower number of samples makes Mixture PF applicable in real time as will be discussed later in the experimental results.

As described above, in the SIR PF the samples are predicted from the system model, and then the most recent observation is used to adjust the importance weights of this prediction. This enhancement adds to the samples predicted from the system model some samples predicted from the most recent observation. The importance weights of these new samples are adjusted according to the probability that they came from the previous belief of the platform state (i.e. samples of the last iteration) and the latest platform motion.

For the application at hand, in the sampling phase of the Mixture PF used in the present embodiment proposed in this example, some samples predicted according to the most recent GNSS observation are added to those samples predicted according to the system model. The most recent GNSS observation is used to adjust the importance weights of the samples predicted according to the system model. The importance weights of the additional samples predicted according to the most recent GNSS observation are adjusted according to the probability that they were generated from the samples of the last iteration and the system model with latest control inputs. When GNSS signal is not available, only samples based on the system model are used, but when GNSS is available both types of samples are used which gives better performance and thus leads to a better performance during GNSS outages. Also adding the samples from GNSS observation leads to faster recovery to true position after GNSS outages.

The System Model

It should be noted that the common reference frames are used herein. The body frame of the platform has X-axis along the transversal direction, Y-axis along the forward longitudinal direction, and Z-axis along the vertical direction of the platform. The local-level frame is the ENU frame that has axes along East, North, and vertical (Up) directions. The rotation matrix that transforms from the platform body frame to the local-level frame at time k−1 is:

$$R_{b,k-1}^l = \begin{bmatrix} \cos A_{k-1} \cos r_{k-1} + \sin A_{k-1} \sin p_{k-1} \sin r_{k-1} & \sin A_{k-1} \cos p_{k-1} & \cos A_{k-1} \sin r_{k-1} - \sin A_{k-1} \sin p_{k-1} \cos r_{k-1} \\ -\sin A_{k-1} \cos r_{k-1} + \cos A_{k-1} \sin p_{k-1} \sin r_{k-1} & \cos A_{k-1} \cos p_{k-1} & -\sin A_{k-1} \sin r_{k-1} - \cos A_{k-1} \sin p_{k-1} \cos r_{k-1} \\ -\cos p_{k-1} \sin r_{k-1} & \sin p_{k-1} & \cos p_{k-1} \cos r_{k-1} \end{bmatrix}$$

To describe the system model utilized in the present navigation module, which is the motion model for the navigation states, the control input and the process noise terms are first introduced. The readings provided by the odometer, the two accelerometers and the gyroscope comprises the control input as $u_{k-1} = [v_{k-1}^{od} \ \alpha_{k-1}^{od} \ f_{k-1}^{x} \ f_{k-1}^{y} \ \omega_{k-1}^{z}]^T$ where $v_{k-1}^{od}$ is the speed derived from the vehicle odometer, $\alpha_{k-1}^{od}$ is the acceleration derived from the vehicle odometer, $f_{k-1}^{x}$ is the transversal accelerometer measurement, $f_{k-1}^{y}$ is the forward accelerometer reading, and $\omega_{k-1}^{z}$ the angular rate obtained from the vertically aligned gyroscope, respectively. The corresponding process noise associated with each of the above measurements forms the process noise vector; $w_{k-1} = [\delta v_{k-1}^{od} \ \delta \alpha_{k-1}^{od} \ \delta f_{k-1}^{x} \ \delta f_{k-1}^{y} \ \delta \omega_{k-1}^{z}]^T$ where $\delta v_{k-1}^{od}$ is the stochastic error in odometer derived speed, $\delta \alpha_{k-1}^{od}$ is the stochastic error in odometer derived acceleration, $\delta f_{k-1}^{x}$ is the stochastic bias error in transversal accelerometer, $\delta f_{k-1}^{y}$ is the stochastic bias error in the forward accelerometer, and $\delta \omega_{k-1}^{z}$ is the stochastic bias error in gyroscope reading.

When using three accelerometers the control input is $u_{k-1} = [v_{k-1}^{od} \ \alpha_{k-1}^{od} \ f_{k-1}^{x} \ f_{k-1}^{y} \ f_{k-1}^{z} \ \omega_{k-1}^{z}]^T$ and the process noise vector is $w_{k-1} = [\delta v_{k-1}^{od} \ \delta \alpha_{k-1}^{od} \ \delta f_{k-1}^{x} \ \delta f_{k-1}^{y} \ \delta f_{k-1}^{z} \ \delta \omega_{k-1}^{z}]^T$, where $f_{k-1}^{z}$ is the vertical accelerometer reading, and $\delta f_{k-1}^{z}$ is the stochastic bias error in the vertical accelerometer.

Position and Velocity Components

Before describing the system equations for position and velocity, the relation between the vehicle velocity in the body frame and in the local-level frame is emphasized, it is given by $$\begin{bmatrix} v_{k-1}^E \\ v_{k-1}^N \\ v_{k-1}^{Up} \end{bmatrix} = R_{b,k-1}^l \begin{bmatrix} 0 \\ v_{k-1}^f \\ 0 \end{bmatrix}$$

where $v_{k-1}^E$, $v_{k-1}^N$, and $v_{k-1}^{Up}$ are the components of vehicle velocity along East, North, and vertical Up directions, and $v_{k-1}^f$ is the forward longitudinal speed of the vehicle, while the transversal and vertical components are zeros. The latitude can then be obtained as:

$$\varphi_k = \varphi_{k-1} + \frac{d\varphi}{dt}\bigg|_{k-1} \Delta t = \varphi_{k-1} + \frac{v_{k-1}^N}{R_M + h_{k-1}} \Delta t$$

$$\Delta t = \varphi_{k-1} + \frac{v_{k-1}^f \cos A_{k-1} \cos p_{k-1}}{R_M + h_{k-1}} \Delta t$$

where $R_M$ is the Meridian radius of curvature of the Earth's reference ellipsoid, and $\Delta t$ is the sampling time. Similarly, the longitude is expressed as:

$$\lambda_k = \lambda_{k-1} + \frac{d\lambda}{dt}\bigg|_{k-1} \Delta t$$

$$= \lambda_{k-1} + \frac{v_{k-1}^E}{(R_N + h_{k-1})\cos\varphi_{k-1}} \Delta t$$

-continued $$= \lambda_{k-1} + \frac{v_{k-1}^f \sin A_{k-1} \cos p_{k-1}}{(R_N + h_{k-1})\cos\varphi_{k-1}} \Delta t$$

where $R_N$ is the normal radius of curvature of the Earth's reference ellipsoid. Finally, the altitude is given by $$h_k = h_{k-1} + \frac{dh}{dt}\bigg|_{k-1} \Delta t$$

$$= h_{k-1} + v_{k-1}^{Up} \Delta t$$

$$= h_{k-1} + v_{k-1}^f \sin p_{k-1} \Delta t$$

The forward speed is given by $$v_k^f = v_{k-1}^{od} - \delta v_{k-1}^{od}$$

Azimuth Angle

In a time interval of $\Delta t$ between the time epoch $k-1$ and $k$, the counter clockwise angle of rotation around the vertical axis of the body frame of the vehicle is $$\gamma_{k-1}^z = (\omega_{k-1}^z - \delta\omega_{k-1}^z)\Delta t$$

The aim now is to get the corresponding angle when projected on the East-North plane (i.e. the corresponding angle about the vertical "up" direction of the local-level frame). The unit vector along the forward direction of the vehicle at time k observed from the body frame at time k is $U_{k|k}^b = [0\ 1\ 0]^T$. It is necessary to get this unit vector (which is along the forward direction of the vehicle at time k) seen from the body frame at time k-1 (i.e. $U_{k|k-1}^b$). The rotation matrix from the body frame at time k-1 to the frame at time k due to a rotation of $\gamma_{k-1}^z$ around the vertical axis of the vehicle is $R_z(\gamma_{k-1}^z)$. The relation between $U_{k|k}^b$ and $U_{k|k-1}^b$ is given by $$U_{k|k}^b = R_z(\gamma_{k-1}^z) U_{k|k-1}^b$$

Thus, since $R_z(\gamma_{k-1}^z)$ is an orthogonal rotation matrix $$U_{k|k-1}^b = (R_z(\gamma_{k-1}^z))^T U_{k|k}^b$$

$$= \begin{bmatrix} \cos\gamma_{k-1}^z & -\sin\gamma_{k-1}^z & 0 \\ \sin\gamma_{k-1}^z & \cos\gamma_{k-1}^z & 0 \\ 0 & 0 & 1 \end{bmatrix} \begin{bmatrix} 0 \\ 1 \\ 0 \end{bmatrix}$$

$$= \begin{bmatrix} -\sin\gamma_{k-1}^z \\ \cos\gamma_{k-1}^z \\ 0 \end{bmatrix}$$

The unit vector along the forward direction of the vehicle at time k seen from the local-level frame at time k-1 can be obtained as follows $$U_{k|k-1}^l = \begin{bmatrix} U^E \\ U^N \\ U^{Up} \end{bmatrix}$$

$$= R_{b|k-1}^l U_{k|k-1}^l$$

$$= R_{b,k-1}^l \begin{bmatrix} -\sin\gamma_{k-1}^z \\ \cos\gamma_{k-1}^z \\ 0 \end{bmatrix}$$

Thus the new heading from North direction because of the angle $\gamma_{k-1}^z$ is $$\tan^{-1}\left(\frac{U^E}{U^N}\right),$$

where $$U^E = \sin A_{k-1} \cos p_{k-1} \cos\gamma_{k-1}^z - (\cos A_{k-1} \cos r_{k-1} + \sin A_{k-1} \sin p_{k-1} \sin r_{k-1})\sin\gamma_{k-1}^z$$

$$U^N = \cos A_{k-1} \cos p_{k-1} \cos\gamma_{k-1}^z - (-\sin A_{k-1} \cos r_{k-1} + \cos A_{k-1} \sin p_{k-1} \sin r_{k-1})\sin\gamma_{k-1}^z$$

Note that the azimuth angle defined by $$\tan^{-1}\left(\frac{U^E}{U^N}\right)$$

is the angle from the North and its positive values are for clockwise direction.

In addition to the rotations performed by the vehicle, the angle $\gamma_{k-1}^z$ has two additional parts. These are due to the Earth's rotation and the change of orientation of the local-level frame. The part due to the Earth's rotation, around the vertical Up direction, is equal to $(\omega^e \sin\phi_{k-1})\Delta t$ counter clockwise in the local-level frame ($\omega^e$ is the Earth's rotation rate). This Earth rotation component is compensated directly from the new calculated heading to give the azimuth angle. It is worth mentioning that this component should be subtracted if the calculation is for the yaw angle (which is positive along the counter clockwise direction). In this study, we are obtaining the azimuth angle directly (which is positive along the clockwise direction), thus this Earth rotation component is added. The part monitored on $\gamma_{k-1}^z$ due to the change of orientation of the local-level frame with respect to the Earth from time epoch k-1 to k is along the counter clockwise direction and can be expressed as:

$$\left.\frac{d\lambda}{dt}\right|_{k-1} (\sin\varphi_{k-1})\Delta t = \frac{v_{k-1}^E \sin\varphi_{k-1}}{(R_N + h_{k-1})\cos\varphi_{k-1}}\Delta t$$

$$= \frac{v_{k-1}^f \sin A_{k-1} \cos p_{k-1} \tan\varphi_{k-1}}{(R_N + h_{k-1})}\Delta t$$

This part also has to be added while calculating the azimuth angle. Finally the model for computing the azimuth angle is:

$$A_k = \tan^{-1}\left(\frac{U^E}{U^N}\right) + (\omega^e \sin\varphi_{k-1})\Delta t + \frac{v_{k-1}^f \sin A_{k-1} \cos p_{k-1} \tan\varphi_{k-1}}{(R_N + h_{k-1})}\Delta t$$

Pitch and Roll Angles

A brief derivation of the pitch and roll equations follows. When the platform is stationary, the accelerometers measure components due to gravity because of the pitch and roll angles (tilt from the horizontal plane). The accelerometers measurement are given by $$\begin{bmatrix} f^x \\ f^y \\ f^z \end{bmatrix} = R_l^b \begin{bmatrix} 0 \\ 0 \\ g \end{bmatrix}$$

$$= (R_b^l)^T \begin{bmatrix} 0 \\ 0 \\ g \end{bmatrix}$$

$$= \begin{bmatrix} -g\cos p \sin r \\ g\sin p \\ g\cos p \cos r \end{bmatrix}$$

where g is the gravity acceleration. If only two accelerometers along the X and Y directions are utilized, the pitch and the roll angles can be expressed as follows:

$$p = \sin^{-1}\left(\frac{f_y}{g}\right)$$

$$r = \sin^{-1}\left(\frac{-f_x}{g\cos p}\right)$$

If three accelerometers along the X, Y, and Z directions are utilized, the pitch and the roll angles can be expressed as follows:

$$p = \tan^{-1}\left(\frac{f_y}{\sqrt{f_x^2 + f_z^2}}\right)$$

$$r = \tan^{-1}\left(\frac{-f_x}{f_z}\right)$$

When the platform is moving, the forward accelerometer (corrected for the sensor errors) measures the forward platform acceleration as well as the component due to gravity. In order to calculate the pitch angle, the platform acceleration derived from the odometer measurements is removed (or decoupled) from the forward accelerometer measurements. Consequently, the pitch angle, when using two accelerometers in the sensor assembly, is computed as:

$$p_k = \sin^{-1}\left(\frac{(f_{k-1}^y - \delta f_{k-1}^y) - (a_{k-1}^{od} - \delta a_{k-1}^{od})}{g}\right)$$

and when using three accelerometers is computed as:

$$p_k = \tan^{-1}\left(\frac{(f_{k-1}^y - \delta f_{k-1}^y) - (a_{k-1}^{od} - \delta a_{k-1}^{od})}{\sqrt{[(f_{k-1}^x - \delta f_{k-1}^x) + (v_{k-1}^{od} - \delta v_{k-1}^{od})(\omega_{k-1}^z - \delta\omega_{k-1}^z)]^2 + [(f_{k-1}^z - \delta f_{k-1}^z)]^2}}\right)$$

Similarly the transversal accelerometer (corrected for the sensor errors) measures the normal component of the vehicle acceleration as well as the component due to gravity. Thus, to calculate the roll angle, the transversal accelerometer measurement must be compensated for the normal component of acceleration. The roll angle, when using two accelerometers in the sensor assembly, is then given by:

$$r_k = \sin^{-1}\left(\frac{(f_{k-1}^x - \delta f_{k-1}^x) + (v_{k-1}^{od} - \delta v_{k-1}^{od})(\omega_{k-1}^z - \delta\omega_{k-1}^z)}{g\cos p_k}\right)$$

and when using three accelerometers is computed as:

$$r_k = \tan^{-1}\left(\frac{(f_{k-1}^x - \delta f_{k-1}^x) + (v_{k-1}^{od} - \delta v_{k-1}^{od})(\omega_{k-1}^z - \delta\omega_{k-1}^z)}{(f_{k-1}^z - \delta f_{k-1}^z)}\right)$$

Overall State Transition Model

The overall state transition model may be represented as follows in the case where two accelerometers are used:

$$x_k = \begin{bmatrix} \varphi_k \\ \lambda_k \\ h_k \\ v_k^f \\ p_k \\ r_k \\ A_k \end{bmatrix}$$

$$= f(x_{k-1}, u_{k-1}, w_{k-1})$$

$$= \begin{bmatrix} \varphi_{k-1} + \frac{v_{k-1}^f \cos A_{k-1} \cos p_{k-1}}{R_M + h_{k-1}}\Delta t \\ \lambda_{k-1} + \frac{v_{k-1}^f \sin A_{k-1} \cos p_{k-1}}{(R_N + h_{k-1})\cos\varphi_{k-1}}\Delta t \\ h_{k-1} + v_{k-1}^f \sin p_{k-1} \Delta t \\ v_{k-1}^{od} - \delta v_{k-1}^{od} \\ \sin^{-1}\left(\frac{(f_{k-1}^y - \delta f_{k-1}^y) - (a_{k-1}^{od} - \delta a_{k-1}^{od})}{g}\right) \\ -\sin^{-1}\left((f_{k-1}^x - \delta f_{k-1}^x) + \frac{(v_{k-1}^{od} - \delta v_{k-1}^{od})(\omega_{k-1}^z - \delta\omega_{k-1}^z)}{g\cos p_k}\right) \\ \tan^{-1}\left(\frac{U^E}{U^N}\right) + \omega^e \sin\varphi_{k-1}\Delta t + \\ \frac{v_{k-1}^f \sin A_{k-1} \cos p_{k-1} \tan\varphi_{k-1}}{(R_N + h_{k-1})}\Delta t \end{bmatrix}$$

When three accelerometers are used the model may be represented as follows:

$$x_k = \begin{bmatrix} \varphi_k \\ \lambda_k \\ h_k \\ v_k^f \\ p_k \\ r_k \\ A_k \end{bmatrix} =$$

$$f(x_{k-1}, u_{k-1}, w_{k-1}) = \begin{bmatrix} \varphi_{k-1} + \dfrac{v_{k-1}^f \cos A_{k-1} \cos p_{k-1}}{R_M + h_{k-1}} \Delta t \\ \lambda_{k-1} + \dfrac{v_{k-1}^f \sin A_{k-1} \cos p_{k-1}}{(R_N + h_{k-1})\cos\varphi_{k-1}} \Delta t \\ h_{k-1} + v_{k-1}^f \sin p_{k-1} \Delta t \\ v_{k-1}^{od} - \delta v_{k-1}^{od} \\ \tan^{-1}\left( \dfrac{(f_{k-1}^y - \delta f_{k-1}^y) - (a_{k-1}^{od} - \delta a_{k-1}^{od})}{\sqrt{[(f_{k-1}^x - \delta f_{k-1}^x) + (v_{k-1}^{od} - \delta v_{k-1}^{od})(\omega_{k-1}^z - \delta \omega_{k-1}^z)]^2 + [(f_{k-1}^z - \delta f_{k-1}^z)]^2}} \right) \\ -\tan^{-1}\left( (f_{k-1}^x - \delta f_{k-1}^x) + \dfrac{(v_{k-1}^{od} - \delta v_{k-1}^{od})(\omega_{k-1}^z - \delta \omega_{k-1}^z)}{(f_{k-1}^z - \delta f_{k-1}^z)} \right) \\ \arctan(U^E, U^N) + \omega^e \sin\varphi_{k-1} \Delta t + \\ \dfrac{v_{k-1}^f \sin A_{k-1} \cos p_{k-1} \tan\varphi_{k-1}}{(R_N + h_{k-1})} \Delta t \end{bmatrix}$$

The Measurement Model

As previously mentioned, loosely coupled integration for sensors/odometer and GNSS information is considered in this Example 1. The present navigation module may be programmed to utilize the measurement model described below. Specifically, the GPS position and velocity update is considered, and thus the GPS observation vector is given as $z_k = [z_k^\varphi \; z_k^\lambda \; z_k^h \; z_k^{v_e} \; z_k^{v_n} \; z_k^{v_u}]^T$ which includes the GPS readings for the latitude, longitude, altitude, and velocity components along East, North, and Up directions respectively.

The measurement model for the present Example 1 can therefore be given as:

$$z_k = \begin{bmatrix} z_k^\varphi \\ z_k^\lambda \\ z_k^h \\ z_k^{v_e} \\ z_k^{v_n} \\ z_k^{v_u} \end{bmatrix} = h(x_k, v_k) = \begin{bmatrix} \varphi_k + v_k^\varphi \\ \lambda_k + v_k^\lambda \\ h_k + v_k^h \\ v_k^f \sin A_k \cos p_k + v_k^{v_e} \\ v_k^f \cos A_k \cos p_k + v_k^{v_n} \\ v_k^f \sin p_k + v_k^{v_u} \end{bmatrix}$$

where $v_k = [v_k^\varphi \; v_k^\lambda \; v_k^h \; v_k^{v_e} \; v_k^{v_n} \; v_k^{v_u}]^T$ is the noise in GPS readings.

Experimental Results

Performance of the estimated solution is demonstrated by comparing the solution to the following solutions:
1. SIR PF for 3D "reduced number of inertial sensors with speed readings"/GPS integration,
2. Mixture PF for 2D dead reckoning/GPS integration,
3. KF for 2D dead reckoning/GPS integration, and
4. KF for 3D full IMU/GPS integration.

The KF for 3D full IMU/GPS integration presented is with velocity update using the speed logged through the OBD II interface during GPS outages. It is to be noted that the four solutions using either the proposed reduced number of inertial sensors or the 2D dead reckoning employ speed read through OBD II as a control input for the system model not as a measurement update, so they do not get any updates during GPS outages. The errors in all the estimated solutions are calculated with respect to a high cost, high-end tactical grade commercially available reference solution made by NovAtel (described below). It is to be noted that all the presented PF solutions in the current Example 1 use white Gaussian noise for the stochastic errors, while the KF solutions use $1^{st}$ order Gauss Markov models for the stochastic sensors errors.

The PF presented results are achieved with the number of samples equal to 100. Using 100 samples with 20 samples predicted from observation likelihood, one iteration of the Mixture PF for 3D "reduced number of inertial sensors with speed readings"/GPS integration takes 0.00398 seconds (average of all iterations) using MATLAB 2007 on an Intel Core 2 Duo T7100 1.8 GHz processor with 2 GB RAM. So the algorithm can work in real-time. One iteration of the KF for 2D dead reckoning/GPS integration takes 0.000602 seconds (average of all iterations) on the same machine.

The performance of the proposed navigation module having 3D "reduced number of inertial sensors with speed readings" and its loosely-coupled integration with GPS using Mixture PF in environments encompassing several different conditions was examined using a road test trajectory.

Road Trajectory

The present road test trajectory (FIG. 3) is in Montreal, Quebec, Canada. This trajectory has urban roadways, some of which have relatively larger slope in the Mont-Royal area. This road test was performed for nearly 85 minutes of continuous vehicle navigation and a distance of around 100 km, and encountered some locations having GPS outages (see nine circles overlaid on the map of Montreal in FIG. 3). Since the present solution is loosely coupled, the nine GPS outages used have complete blockage: Eight outages were simulated GPS outages (post-processing) of different durations, and one was a natural outage in a tunnel under the St. Lawrence River.

Some of the simulated outages were chosen such that they encompass straight portions, turns, slopes, different speeds and stops.

The trajectory uses the NovAtel OEM4 GPS receiver and the inertial sensors from the MEMS-based Crossbow IMU300CC-100 (see Table 15). As mentioned earlier the speed readings are collected from the vehicle odometer through OBD-II. The reference solution used for assessment of the results is a commercially available solution made by NovAtel, comprising a SPAN unit integrating the high cost high end tactical grade Honeywell HG1700 IMU (see Table 17) and the NovAtel OEM4 dual frequency receiver.

Tables 1 and 2 show the root mean square (RMS) error and the maximum error in the estimated 2D horizontal position during the nine GPS outages for the compared solutions. In the present example, the 3D KF with full IMU uses velocity update from the odometer-derived speed during GPS outages, while the other solutions have no update during outages. Tables 3 and 4 show the RMS and maximum errors in the estimated altitude during these outages for the three 3D solutions.

The RMS error in pitch and roll angles in the whole trajectory for the Mixture PF with 3D "reduced number of inertial sensors with speed readings"/GPS integration are 0.8432 degrees and 0.4385 degrees, respectively.

The results for 2D horizontal position errors (Tables 1 and 2) confirm the advantages of the 3D "reduced number of inertial sensors with speed readings" and the 2D dead reckoning over the full IMU, namely: the advantage of eliminating the two gyroscopes, and calculating velocity from vehicle speed readings collected through OBD II rather than from accelerometers. This fact can be seen by comparing the results of KF for 2D dead reckoning and KF with full IMU, which also has the extra benefit of velocity updates during GPS outages. This comparison shows that, in general, reduced system/GPS integration outperforms full IMU/GPS integration. It is to be noted that the KF for full IMU/GPS integration for some outages gave better results than KF for 2D dead reckoning/GPS integration because the former has velocity update from speed read through OBD II during GPS outages, while the latter does not benefit from any update. The better performance of reduced system (whether 3D or 2D) over a full IMU will be clearer in the next trajectory where the KF with full IMU solution does not use any updates during outages. The cause for the superiority of the reduced system is that the full IMU has six inertial sensors whose errors all contribute towards the position error, while the reduced system has less inertial sensors and thus less contribution of inertial sensor errors towards the position error, especially the two eliminated gyroscopes (as mentioned earlier MEMS gyroscopes are the weak part).

The horizontal position error results show, also, that Mixture PF outperforms KF for 2D dead reckoning/GPS integration. This may be due to the ability of PF to deal with nonlinear models. All the PFs presented in this paper use nonlinear total-state system and measurement models, while the KF use linearized error-sate models. Furthermore, the results show that Mixture PF is better when using 3D "reduced number of inertial sensors with speed readings" than when using 2D dead reckoning because the former takes care of the change in road slope and of 3D motion while 2D dead reckoning assumes that motion is in a perfectly horizontal plane. The improvement of PF with 3D "reduced number of inertial sensors with speed readings" over PF with 2D dead reckoning occurs especially when there is more slope. So for nearly horizontal portions of the trajectory the improvement is not so large in 2D horizontal position, but still 3D "reduced number of inertial sensors with speed readings" has the advantage of estimating pitch, roll, velocity component along Up direction, and altitude, which were not estimated in 2D dead reckoning. The difference in performance between the 3D and 2D solutions will be clearer if the trajectory has more inclinations and for longer distances.

The results in Tables 1 and 2 show that Mixture PF performs better than the SIR PF because it has better state estimates before the GPS outage which in turn leads to a better performance during the outage.

Tables 3 and 4 show that the KF without any updates during GPS outages has a very bad altitude estimate, mainly because of uncompensated residuals in the stochastic bias of the vertical accelerometer. The KF with velocity update from odometer-derived speed largely enhances the altitude estimate because it bounds the error growth in the vertical component of velocity and hence the altitude error. The KF with velocity update from odometer-derived speed and pitch and roll update from accelerometers and odometer further enhances the altitude estimate because it has a better pitch estimate from accelerometer which leads to a better transformation of velocity from body frame to local-level frame and thus to better upward velocity update and a better altitude. Mixture PF with velocity update from odometer-derived speed and pitch and roll update from accelerometers and odometer has a better altitude estimate than the KF with exactly the same updates because of the use of nonlinear models in PF in contrast with the linearized models used by KF. Furthermore this Mixture PF solution outperforms all the other compared solutions.

All these horizontal position and altitude results demonstrate that the proposed Mixture PF solution achieves good results for a MEMS-based INS/GPS navigation solution.

Tables 3 and 4 show that both PFs with 3D "reduced number of inertial sensors with speed readings" outperform the KF with full IMU in the altitude errors during GPS outages. Furthermore the Mixture PF performs better than the SIR PF. All the previous results demonstrate that the proposed solution (i.e. Mixture PF for 3D "reduced number of inertial sensors with speed readings"/GPS integration) performs better than all the other compared solutions, and achieves good results for a MEMS-based INS/GPS navigation solution.

Figure 4:
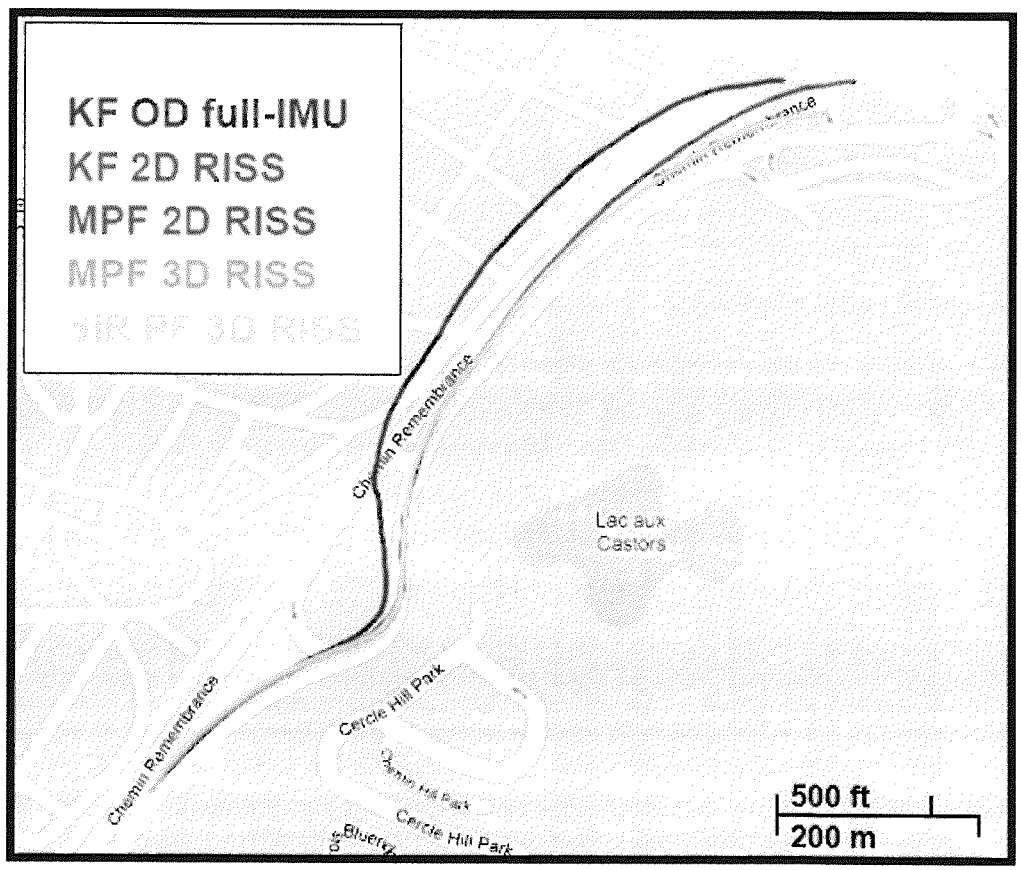
FIG. 4: Performance during GPS outage #3 of FIG. 3.
Figure 5:
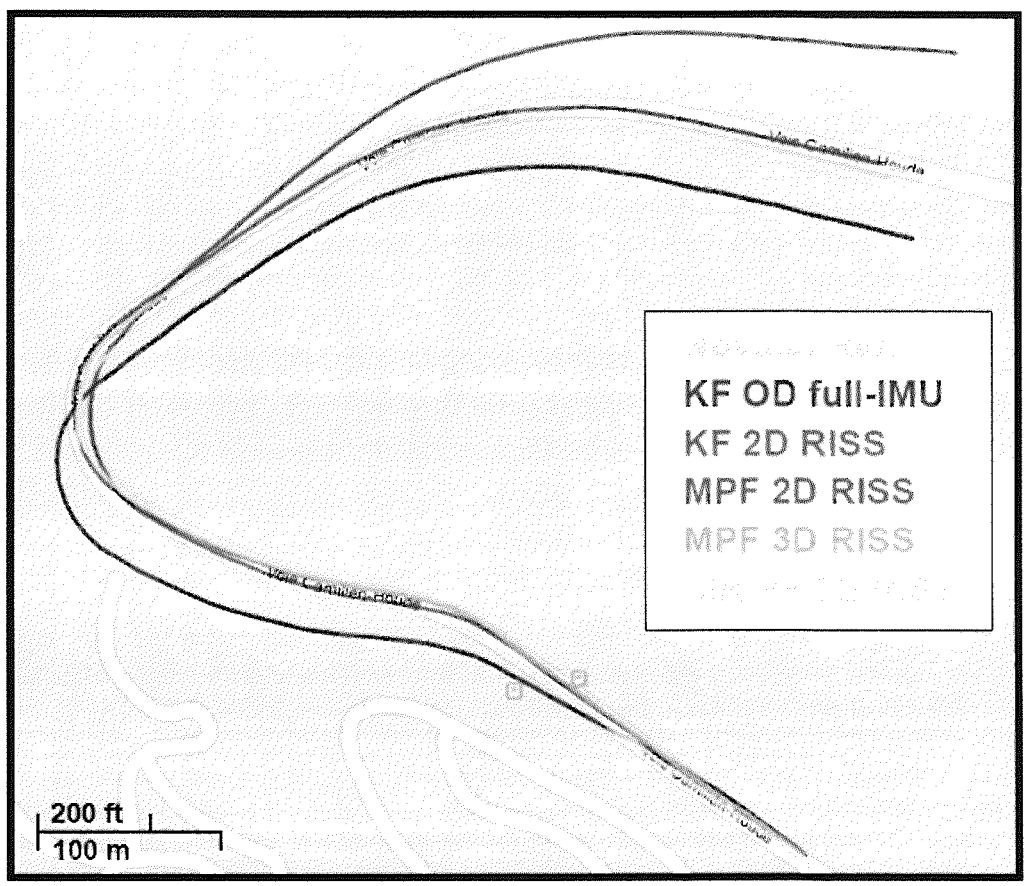
FIG. 5: Performance during GPS outage #4 of FIG. 3.
Figure 6:
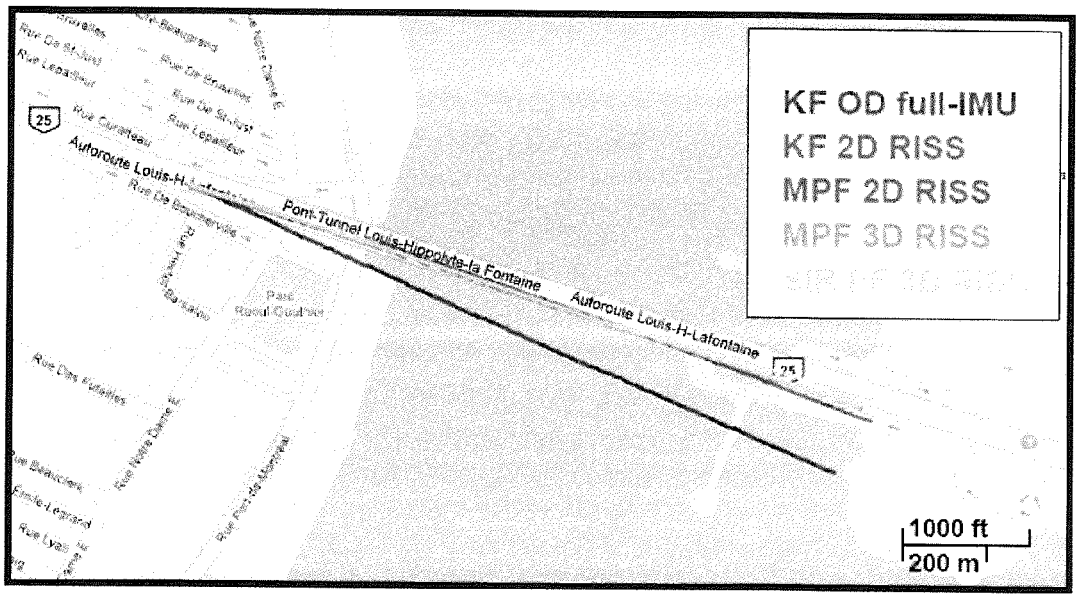
FIG. 6: Performance during GPS outage #9 of FIG. 3.
Figure 7:
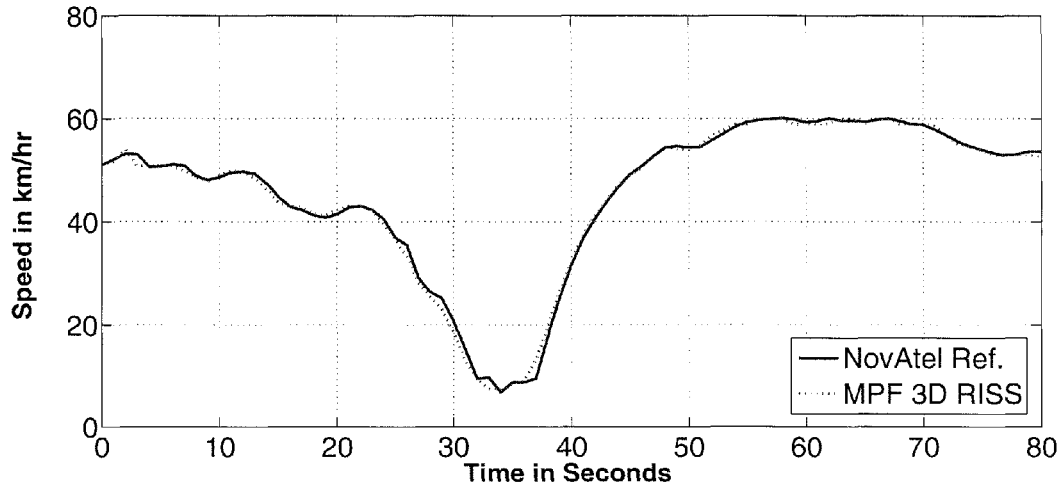
FIG. 7: Forward speed, azimuth, altitude, and pitch during GPS outage #3 in FIGS. 3 and 4.
Figure 7:
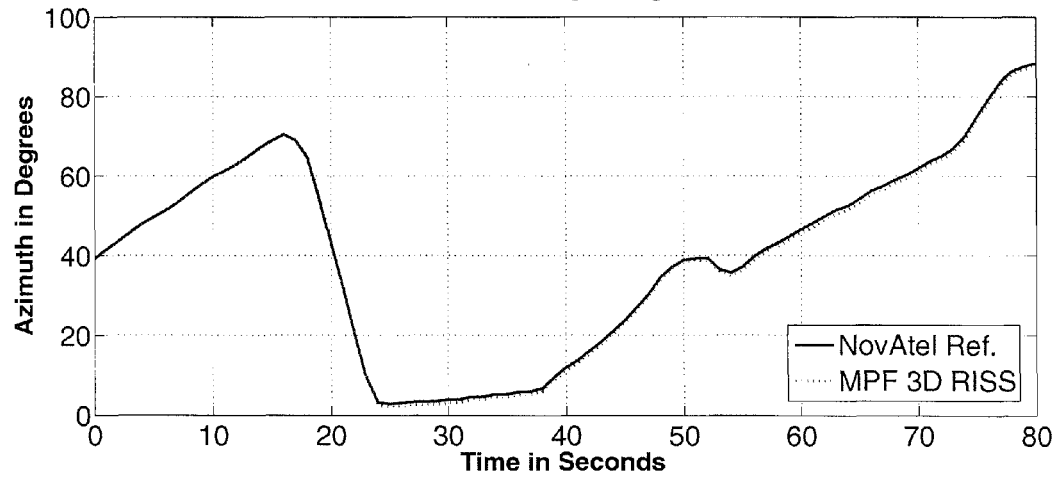
Figure 7:
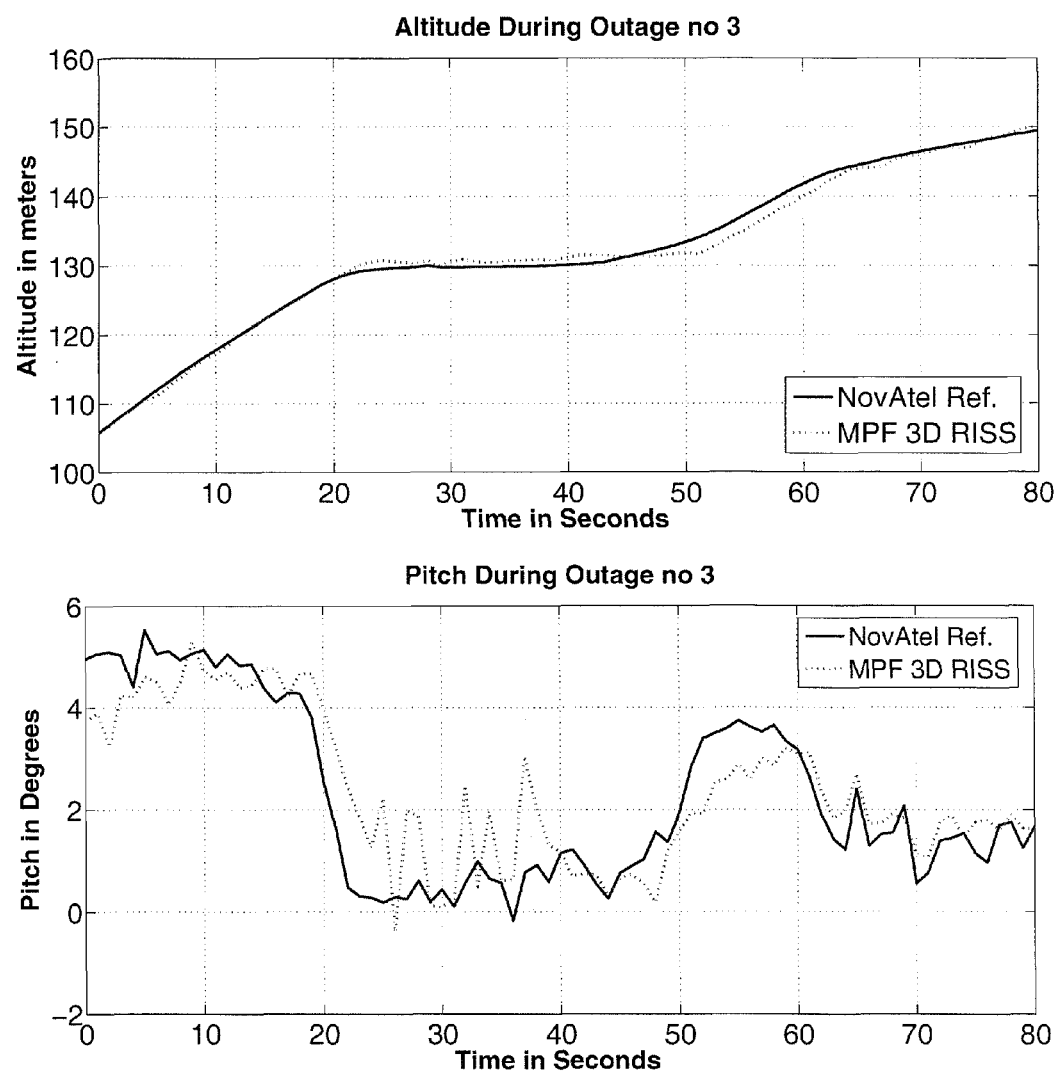

To show the details of the performance during some of these GPS outages, outages numbers 3, 4, and 9 of FIG. 3 will be presented in more detail. FIGS. 4, 5, and 6 show the sections of the trajectory during the GPS outage numbers 3, 4, and 9, respectively. To illustrate the vehicle dynamics during these three outages respectively, FIGS. 7, 8 and 9 show the forward speed of the vehicle, its azimuth angle, its altitude, and its pitch angle, all from both the NovAtel reference solution and the Mixture PF with 3D "reduced number of inertial sensors with speed readings".

To examine the performance during turns and slopes, the $3^{rd}$ and $4^{th}$ GPS outages are examined. The $3^{rd}$ outage (FIG. 4), whose duration is 80 seconds, involves a couple of turns. The first turn is a 70° turn where the speed of the vehicle goes down from 50 km/h to 10 km/h during the turn and back to 60 km/h, and the second turn is an elongated one at about 60 km/h. This outage starts at a slope of 5°, then a horizontal portion followed by a slope of 3°. The maximum horizontal position error for Mixture PF with 3D "reduced number of inertial sensors with speed readings" is 20.81 meters, while for SIR PF with 3D "reduced number of inertial sensors with speed readings" is 22.2 meters, for Mixture PF with 2D dead reckoning is 22.36 meters, for KF with 2D dead reckoning is 49.48 meters, and for KF with full IMU and OBD II velocity update is 82.88 meters.

Figure 8:
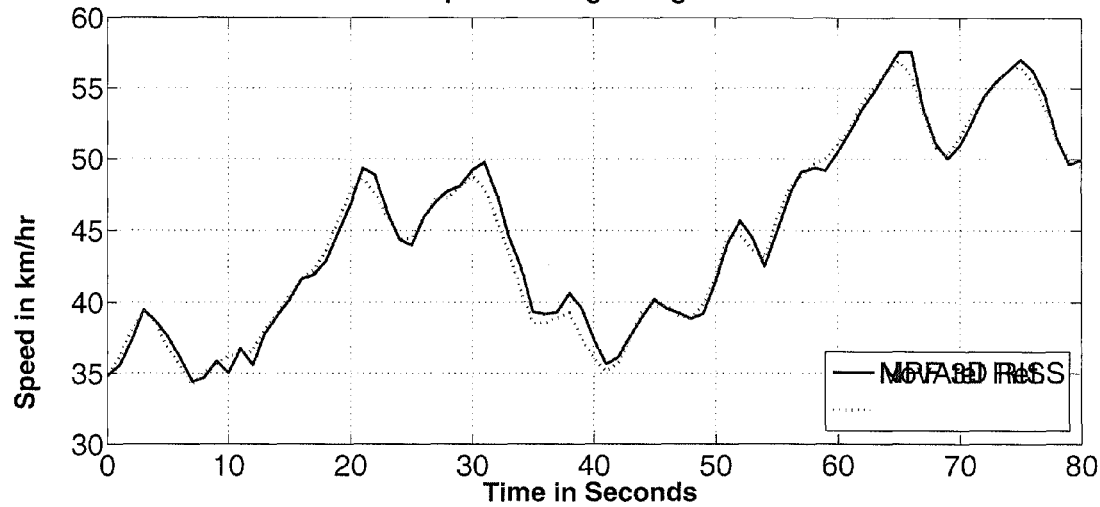
FIG. 8: Forward speed, azimuth, altitude, and pitch during GPS outage #4 in FIGS. 3 and 5.
Figure 8:
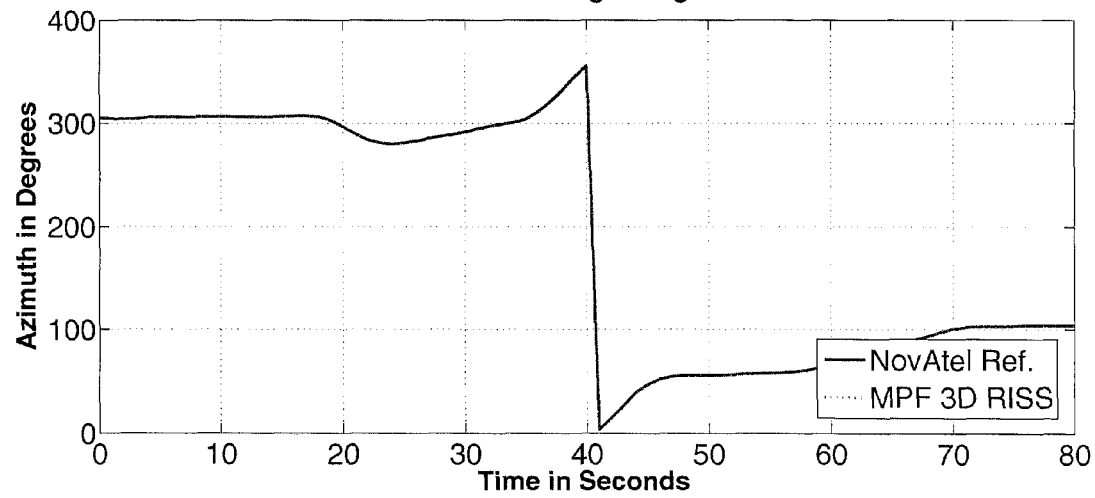
Figure 8:
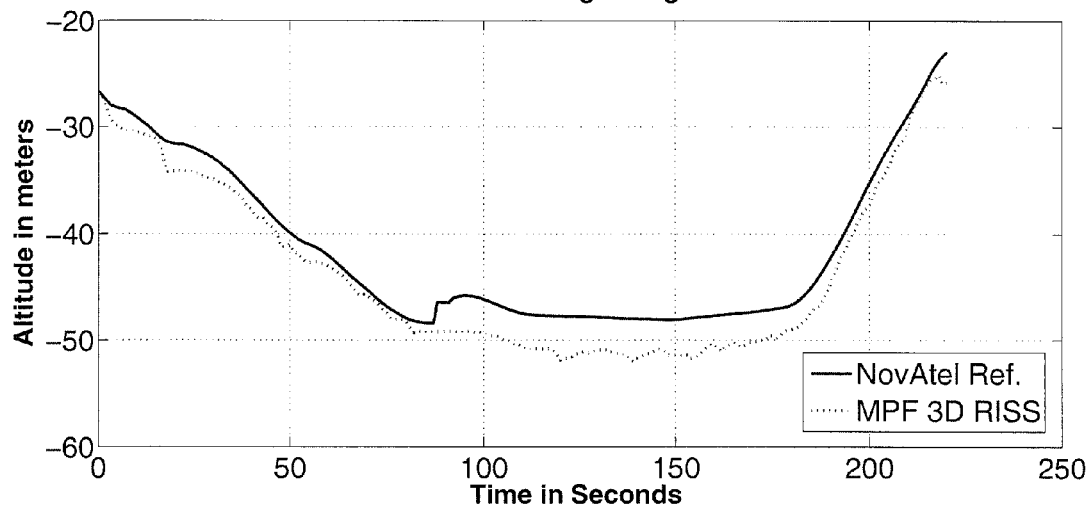
Figure 8:
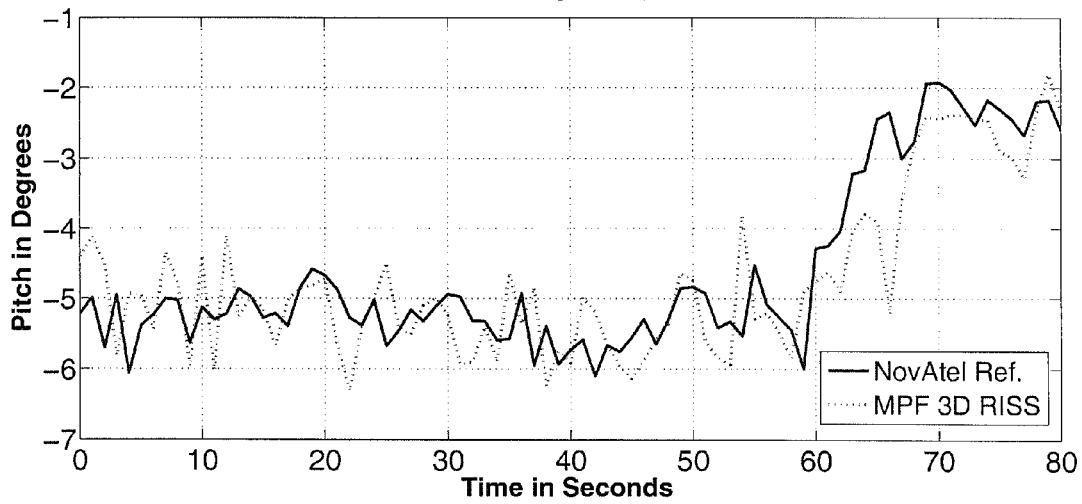
Figure 9:
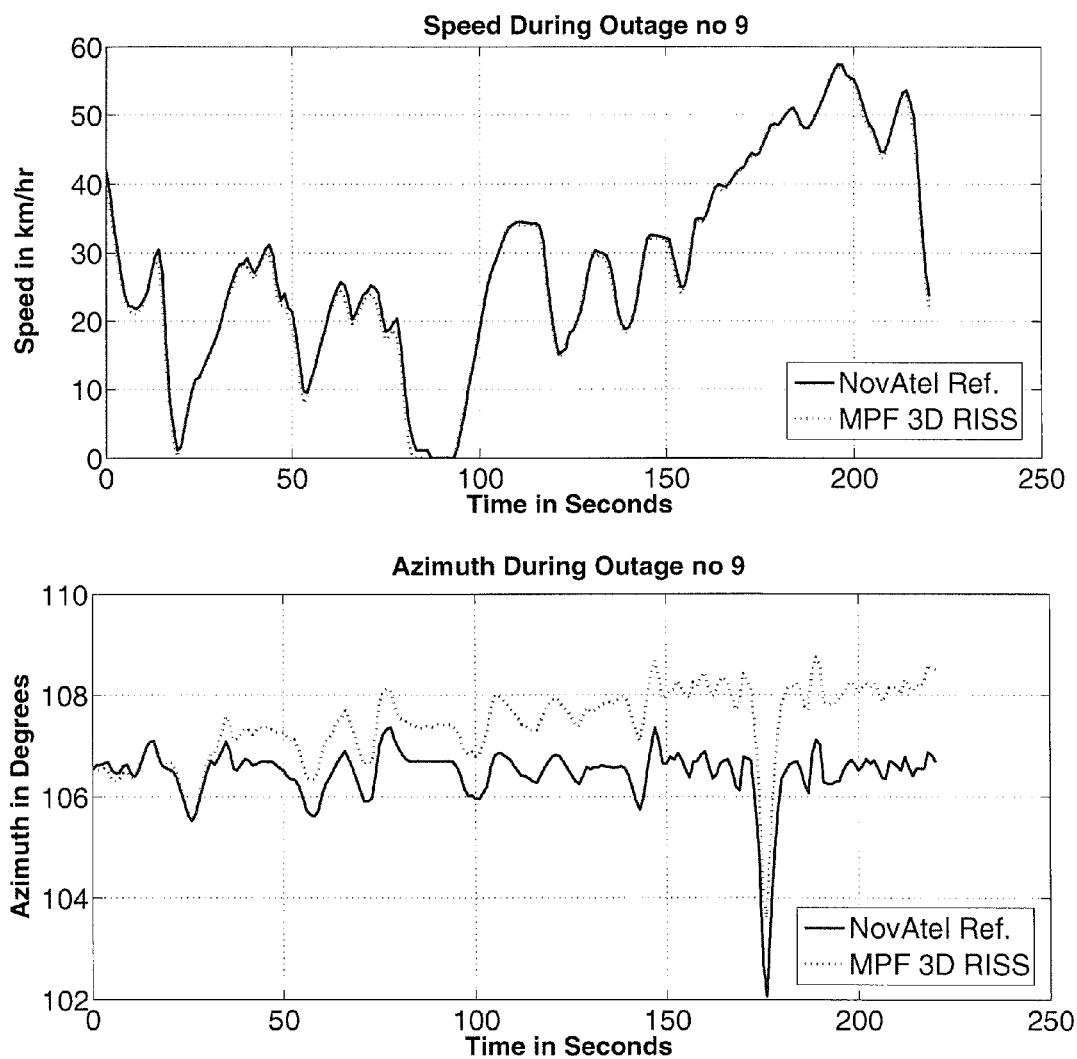
FIG. 9: Forward speed, azimuth, altitude, and pitch during GPS outage #9 in FIGS. 3 and 6.
Figure 9:
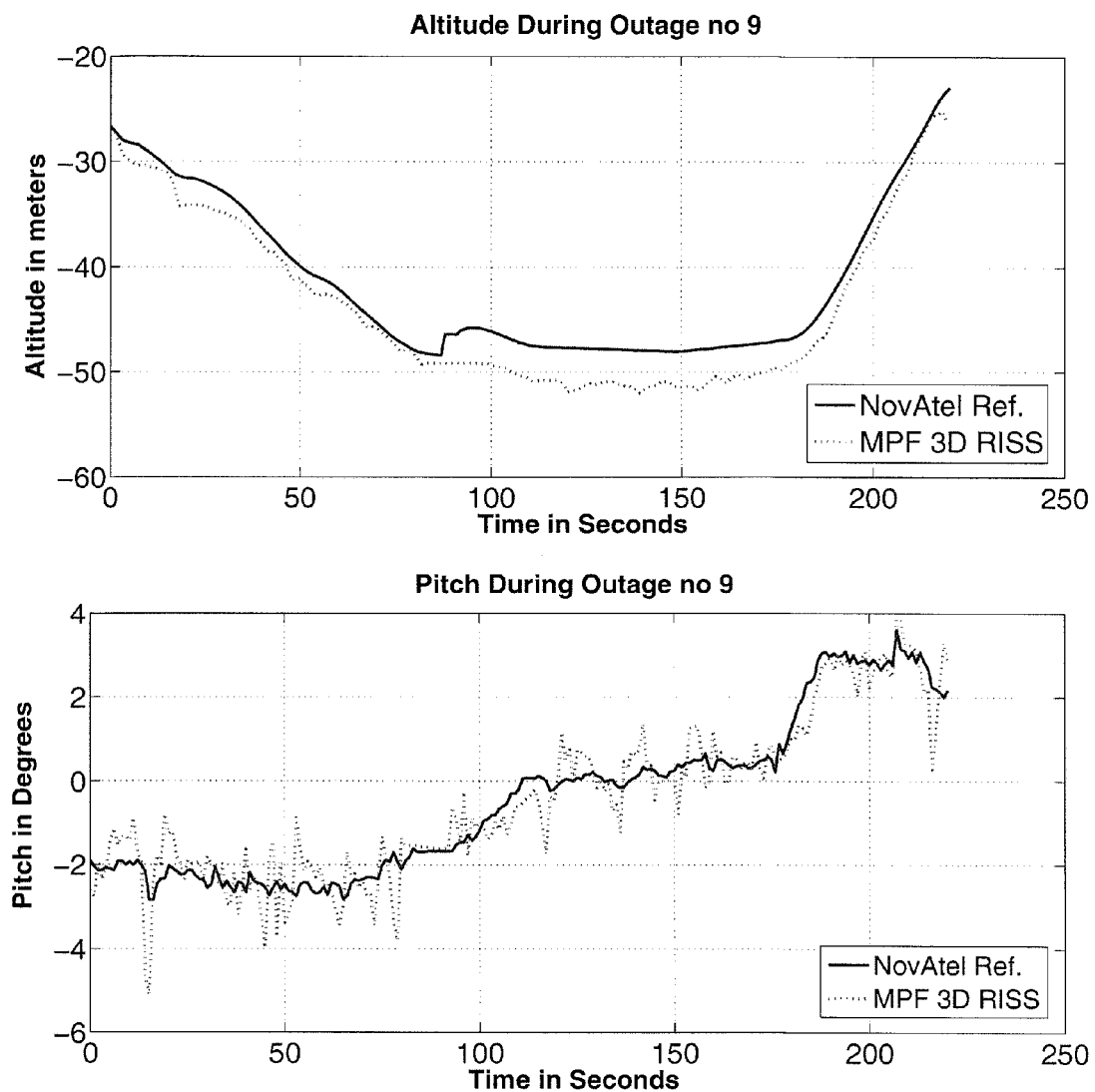

The 4$^{th}$ outage (FIG. 5), whose duration is 80 seconds, is during a near 180° elongated turn where the vehicle is between a speed of 35 and 55 km/h (see FIG. 8). Note that the discontinuity in the azimuth in FIG. 8, near the 40$^{th}$ second, is a plotting discontinuity because the azimuth angle there goes above 360°, where it cycles back to 0°. During this outage, the slope is at −5° and towards the end goes to −2°. The maximum horizontal position error for Mixture PF with 3D "reduced number of inertial sensors with speed readings" is 17.8 meters, while for SIR PF with 3D "reduced number of inertial sensors with speed readings" is 24.54 meters, for Mixture PF with 2D dead reckoning is 21.76 meters, for KF with 2D dead reckoning is 69.27 meters, and for KF with full IMU and OBD II velocity update is 36.12 meters. In this outage, the maximum error for KF with full IMU is better than KF with 2D dead reckoning because the former has velocity updates during outages, which bounds the position error growth; this fact will be clear when examining the RMS errors. The RMS position error for Mixture PF with 3D "reduced number of inertial sensors with speed readings" is 10.75 meters, while for SIR PF with 3D "reduced number of inertial sensors with speed readings" is 17.67 meters, for Mixture PF with 2D dead reckoning is 12.93 meters, for KF with 2D dead reckoning is 25.16 meters, and for KF with full IMU and odometer update is 28.59 meters. The KF with 2D dead reckoning has better RMS error than the KF with full IMU and odometer update, but worse maximum error because it drifts a lot towards the end of the outage. What makes the KF with full IMU have comparable result is the velocity update using the speed readings from OBD II. From these errors it may be observed that the Mixture PF with 3D "reduced number of inertial sensors with speed readings" improves the estimated navigation solution of a moving platform compared to other solutions. Also, it can be seen that Mixture PF with 3D "reduced number of inertial sensors with speed readings" is the best during all the portions of the turn but it has a slight drift at the end, thereby still having improved RMS and maximum position errors.

To show the performance during straight portions of the trajectory and also including stops, the 9$^{th}$ GPS outage is presented. This outage is a natural outage in a tunnel for 220 seconds where the speed changes as in FIG. 9. The slope is at −2° in the beginning, followed by a horizontal portion, and towards the end of the outage goes to 3°. The traveled distance during this outage is nearly 1.75 km. The maximum horizontal position error for Mixture PF with 3D "reduced number of inertial sensors with speed readings" is 33.41 meters, while for SIR PF with 3D "reduced number of inertial sensors with speed readings" is 40.33 meters, for Mixture PF with 2D dead reckoning is 34.23 meters, for KF with 2D dead reckoning is 50.8 meters, and for KF with full IMU and odometer update is 201.64 meters. The advantage of reduced systems (3D and 2D) over full IMU is again apparent from these results, as well as an advantage of Mixture PF over SIR PF and KF.

For MEMS-based inertial sensors, these results show that the proposed solution (Mixture PF with 3D "reduced number of inertial sensors with speed readings") has improved performance even during GPS outages encompassing different conditions such as straight portions, turns, and stops.

The results demonstrated that the present reduced inertial sensor system/GPS integration improve upon commonly available solutions for full IMU/GPS integration. Specifically, the improvement in the positioning performance can be summarized by the fact that the reduced system has fewer inertial sensor errors contributing to the position error than a full IMU. A primary reason for the improvement is due to the elimination of the two gyroscopes that were used to calculate pitch and roll angles, and the use of accelerometer data instead. Another reason is the calculation of velocity from the platform's speed readings collected through OBD II, instead of calculating velocity from accelerometer readings.

The advantages of the reduced system over a full IMU were shown by comparing the KF with 2D dead reckoning to KF with full IMU, whereby the former showed better horizontal positioning performance in all the presented trajectories despite the fact that the latter had an additional source of update during GPS outages. The results also demonstrate that the Mixture PF for 2D dead reckoning improves upon KF for 2D dead reckoning, which is primarily due to the ability of the former to deal with nonlinear system and measurement models while the latter uses linearized error models.

Furthermore the results demonstrate that the Mixture PF with 3D "reduced number of inertial sensors with speed readings" has an improved performance than Mixture PF with 2D dead reckoning, which is primarily due to the latter assuming motion in the 2D horizontal plane thereby neglecting any 3D movements. The difference in performance between 3D and 2D reduced systems may be clearer if the trajectory has more inclinations and for a longer distance. Also, 3D "reduced number of inertial sensors with speed readings" has the advantage of estimating pitch, roll, velocity component along Up, and altitude, which were not estimated in 2D dead reckoning.

Mixture PF with 3D "reduced number of inertial sensors with speed readings" was compared to SIR PF with 3D "reduced number of inertial sensors with speed readings", and demonstrated improved performance. This better performance of Mixture PF during GPS outages is primarily due to the improved performance during GPS availability before the outage.

Having run the compared solutions on several trajectories and considering the maximum error in horizontal positioning, the KF with 2D dead reckoning achieved an average improvement of approximately 76% over KF with full IMU without any updates during GPS outages and of approximately 58% over KF with full IMU with velocity updates during outages. Mixture PF with 2D dead reckoning achieved an average improvement of approximately 55% over KF with 2D dead reckoning. Mixture PF with 3D "reduced number of inertial sensors with speed readings" achieved an average improvement of approximately 9% over Mixture PF with 2D dead reckoning. This last percentage is of course trajectory dependent because it depends on the characteristics of the terrain traversed. Furthermore, Mixture PF with 3D "reduced number of inertial sensors with speed readings" achieved an average improvement of approximately 30% over SIR PF with 3D "reduced number of inertial sensors with speed readings".

The results showed that the proposed 3D navigation solution using Mixture particle filter for "reduced number of inertial sensors with speed readings"/GPS integration outperforms all the other navigation solutions in the comparison, and demonstrates good performance for MEMS-based sensors during GPS outages even for prolonged durations. Furthermore, with the low number of samples used the algorithm can work in real-time.

Example 2

Mixture Particle Filter for Enhanced 3D Full-IMU/Odometer/GPS Integration

The present example demonstrates the use of the present navigation module to determine a 3D navigation solution using a Mixture PF as a nonlinear filtering technique for integrating a full (rather than reduced) low-cost MEMS-based IMU integrated with GPS and the odometer readings from the platform. A loosely coupled integration approach was used in this Example.

It should be noted that the example and models presented in this embodiment are suitable for the case where the speed or velocity readings is interrupted. Thus, they are used for measurement update to the filter, rather than as a control input. For clarity, the use of the speed or velocity readings to decouple the motion of the platform from the accelerometer readings to generate better non-drifting pitch and roll estimates is used, but it is used as measurement updates rather than a control input because the source of speed or velocity readings might be interrupted. The foregoing provides an advantage over the commonly used odometer updates for velocity only.

Background $$R^\ell_{b,k-1} = \begin{bmatrix} \cos A_{k-1}\cos r_{k-1} + \sin A_{k-1}\sin p_{k-1}\sin r_{k-1} & \sin A_{k-1}\cos p_{k-1} & \cos A_{k-1}\sin r_{k-1} - \sin A_{k-1}\sin p_{k-1}\cos r_{k-1} \\ -\sin A_{k-1}\cos r_{k-1} + \cos A_{k-1}\sin p_{k-1}\sin r_{k-1} & \cos A_{k-1}\cos p_{k-1} & -\sin A_{k-1}\sin r_{k-1} - \cos A_{k-1}\sin p_{k-1}\cos r_{k-1} \\ -\cos p_{k-1}\sin r_{k-1} & \sin p_{k-1} & \cos p_{k-1}\cos r_{k-1} \end{bmatrix}$$

This example attempts to demonstrate the incorporation of two methods for improving the performance of MEMS-based INS/GNSS integration during GNSS outages. The first method is to utilize the speed derived from the vehicle odometer to get measurement update for velocities (exploiting the non-holonomic constraints on land vehicles). The second method is to calculate the pitch and roll angles of the platform from the readings of two accelerometers (the longitudinal and transversal accelerometers) readings or three accelerometers, together with the odometer readings, and use them as a measurement update in the filter for pitch and roll calculated from the gyroscopes. Thus the pitch and roll from accelerometers are used in the measurement model, while those from the gyroscopes are used in the system model.

Navigation Solution

In the current example, which uses Mixture PF for INS/Odometer/GNSS integration if GNSS is available, some samples predicted according to the most recent GNSS observation are added to those samples predicted according to the system model (here the INS motion model). The importance or weight of the samples predicted from the system model are adjusted using GNSS readings, while the weight of the samples predicted from GNSS observation are adjusted according to the samples of the last iteration and the system model with IMU readings. Alternatively, when GNSS signal is not available, some samples predicted using the odometer are added to those predicted based on INS motion model. The importance or weight of the samples predicted from the motion model are adjusted using odometer readings, while the weights of the samples predicted using the odometer are adjusted according to the samples of the last iteration and the motion model with IMU readings.

Thus, this Example demonstrates that during GNSS availability, sampling from both INS motion model and GNSS observation can provide improved performance, leading to improved performance of the present module during GNSS data outages. Adding samples according to the odometer (updated by the motion model) to those sampled according to the motion model (updated by the odometer) can also enhance the performance during GNSS outages.

The System Model

The common reference frames are used in this research. The body frame of the vehicle has the X-axis along the transversal direction, Y-axis along the forward longitudinal direction, and Z-axis along the vertical direction of the vehicle completing a right-handed system. The local-level frame is the ENU frame that has axes along East, North, and vertical (Up) directions. The rotation matrix that transforms from the vehicle body frame to the local-level frame at time k−1 is To describe the nonlinear system model, which is here the motion model for the navigation states, the control input and the process noise terms are first introduced. The measurement provided by the IMU is the control input; $u_{k-1} = [f_{k-1}^x \ f_{k-1}^y \ f_{k-1}^z \ \omega_{k-1}^x \ \omega_{k-1}^y \ \omega_{k-1}^z]^T$ where $f_{k-1}^x$, $f_{k-1}^y$, and $f_{k-1}^z$ are the readings of the accelerometer triad, and $\omega_{k-1}^x$, $\omega_{k-1}^y$ and $\omega_{k-1}^z$ are the readings of the gyroscope triad. The corresponding process noise associated with each of the above measurements forms the process noise vector; $w_{k-1} = [\delta f_{k-1}^x \ \delta f_{k-1}^y \ \delta f_{k-1}^z \ \delta\omega_{k-1}^x \ \delta\omega_{k-1}^y \ \delta\omega_{k-1}^z]^T$ where $\delta f_{k-1}^x$, $\delta f_{k-1}^y$, and $\delta f_{k-1}^z$ are the stochastic errors in accelerometers readings, and $\delta\omega_{k-1}^x$, $\delta\omega_{k-1}^y$, and $\delta\omega_{k-1}^z$ are the stochastic errors in gyroscopes readings.

The Position and Velocity Equations

The latitude can then be obtained as:

$$\varphi_k = \varphi_{k-1} + \frac{d\varphi}{dt}\bigg|_{k-1} \Delta t = \varphi_{k-1} + \frac{v_{k-1}^N}{R_M + h_{k-1}} \Delta t$$

where $R_M$ is the Meridian radius of curvature of the Earth's reference ellipsoid and $\Delta t$ is the sampling time. Similarly, the longitude is expressed as:

$$\lambda_k = \lambda_{k-1} + \frac{d\lambda}{dt}\bigg|_{k-1} \Delta t = \lambda_{k-1} + \frac{v_{k-1}^E}{(R_N + h_{k-1})\cos\varphi_{k-1}} \Delta t$$

where $R_N$ is the normal radius of curvature of the Earth's reference ellipsoid. The altitude is given by $$h_k = h_{k-1} + \frac{dh}{dt}\bigg|_{k-1} \Delta t = h_{k-1} + v_{k-1}^{Up} \Delta t$$

The velocity is given by $$\begin{bmatrix} v_k^E \\ v_k^N \\ v_k^{Up} \end{bmatrix} = \begin{bmatrix} v_{k-1}^E \\ v_{k-1}^N \\ v_{k-1}^{Up} \end{bmatrix} + R^\ell_{b,k-1} \begin{bmatrix} f_{k-1}^x - \delta f_{k-1}^x \\ f_{k-1}^y - \delta f_{k-1}^y \\ f_{k-1}^z - \delta f_{k-1}^z \end{bmatrix} \Delta t + \begin{bmatrix} 0 \\ 0 \\ -g \end{bmatrix} \Delta t -$$

$$\begin{bmatrix} 0 & -2\omega^e \sin\varphi_{k-1} - \frac{v_{k-1}^E \tan\varphi_{k-1}}{R_N + h_{k-1}} & 2\omega^e \cos\varphi_{k-1} + \frac{v_{k-1}^E}{R_N + h_{k-1}} \\ 2\omega^e \sin\varphi_{k-1} + \frac{v_{k-1}^E \tan\varphi_{k-1}}{R_N + h_{k-1}} & 0 & \frac{v_{k-1}^N}{R_M + h_{k-1}} \\ -2\omega^e \cos\varphi_{k-1} - \frac{v_{k-1}^E}{R_N + h_{k-1}} & \frac{-v_{k-1}^N}{R_M + h_{k-1}} & 0 \end{bmatrix} \begin{bmatrix} v_{k-1}^E \\ v_{k-1}^N \\ v_{k-1}^{Up} \end{bmatrix} \Delta t$$

where $\omega^e$ of is the Earth rotation rate and g is the acceleration of the gravity.

The Attitude Equations

The attitude angles are calculated using quaternions through the following equations. The relation between the vector of quaternion parameters and the rotation matrix from body frame to local-level frame is as follows $$q_{k-1} = \begin{bmatrix} q_{k-1}^1 \\ q_{k-1}^2 \\ q_{k-1}^3 \\ q_{k-1}^4 \end{bmatrix} = \begin{bmatrix} 0.25\{R_{b,k-1}^\ell(3,2) - R_{b,k-1}^\ell(2,3)\}/q_{k-1}^4 \\ 0.25\{R_{b,k-1}^\ell(1,3) - R_{b,k-1}^\ell(3,1)\}/q_{k-1}^4 \\ 0.25\{R_{b,k-1}^\ell(2,1) - R_{b,k-1}^\ell(1,2)\}/q_{k-1}^4 \\ 0.5\sqrt{1 + R_{b,k-1}^\ell(1,1) + R_{b,k-1}^\ell(2,2) + R_{b,k-1}^\ell(3,3)} \end{bmatrix}$$

The three gyroscopes readings should be compensated for the stochastic errors as well as the Earth rotation rate and the change in orientation of the local-level frame. The latter two are monitored by the gyroscope and form a part of the readings, so they have to be removed in order to get the actual turn.

These angular rates are assumed to be constant in the interval between time steps k−1 and k and they are integrated over time to give $$\begin{bmatrix} \theta_x \\ \theta_y \\ \theta_z \end{bmatrix} = \begin{bmatrix} \omega_{k-1}^x - \delta\omega_{k-1}^x \\ \omega_{k-1}^y - \delta\omega_{k-1}^y \\ \omega_{k-1}^z - \delta\omega_{k-1}^z \end{bmatrix} \Delta t - (R_{b,k-1}^\ell)^T \begin{bmatrix} \frac{-v_{k-1}^N}{R_M + h_{k-1}} \\ \omega^e \cos\varphi_{k-1} + \frac{v_{k-1}^E}{R_N + h_{k-1}} \\ \omega^e \sin\varphi_{k-1} + \frac{v_{k-1}^E \tan\varphi_{k-1}}{R_N + h_{k-1}} \end{bmatrix} \Delta t$$

The quaternion parameters are propagated with time as follows $$q_k = \begin{bmatrix} q_k^1 \\ q_k^2 \\ q_k^3 \\ q_k^4 \end{bmatrix} = \begin{bmatrix} q_{k-1}^1 \\ q_{k-1}^2 \\ q_{k-1}^3 \\ q_{k-1}^4 \end{bmatrix} + \frac{1}{2} \begin{bmatrix} 0 & \theta_z & -\theta_y & \theta_x \\ -\theta_z & 0 & \theta_x & \theta_y \\ \theta_y & -\theta_x & 0 & \theta_z \\ -\theta_x & -\theta_y & -\theta_z & 0 \end{bmatrix} \begin{bmatrix} q_{k-1}^1 \\ q_{k-1}^2 \\ q_{k-1}^3 \\ q_{k-1}^4 \end{bmatrix}$$

The definition of the quaternion parameters implies that $$(q_k^1)^2 + (q_k^2)^2 + (q_k^3)^2 + (q_k^4)^2 = 1$$

Due to computational errors, the above equality may be violated. To compensate for this, the following special normalization procedure is performed. If the following error exists after the computation of the quaternion parameters $$\Delta = 1 - ((q_k^1)^2 + (q_k^2)^2 + (q_k^3)^2 + (q_k^4)^2)$$

then the vector of quaternion parameters should be updated as follows $$q_k = \frac{q_k}{\sqrt{1 - \Delta}}$$

The new rotation matrix from body frame to local-level frame is computed as follows $$R_{b,k}^\ell = \begin{bmatrix} R_{b,k}^\ell(1,1) & R_{b,k}^\ell(1,2) & R_{b,k}^\ell(1,3) \\ R_{b,k}^\ell(2,1) & R_{b,k}^\ell(2,2) & R_{b,k}^\ell(2,3) \\ R_{b,k}^\ell(3,1) & R_{b,k}^\ell(3,2) & R_{b,k}^\ell(3,3) \end{bmatrix}$$

$$= \begin{bmatrix} (q_k^1)^2 - (q_k^2)^2 - (q_k^3)^2 + (q_k^4)^2 & 2(q_k^1 q_k^2 + q_k^3 q_k^4) & 2(q_k^1 q_k^3 + q_k^2 q_k^4) \\ 2(q_k^1 q_k^2 + q_k^3 q_k^4) & (q_k^2)^2 - (q_k^1)^2 - (q_k^3)^2 + (q_k^4)^2 & 2(q_k^2 q_k^3 + q_k^1 q_k^4) \\ 2(q_k^1 q_k^3 + q_k^2 q_k^4) & 2(q_k^2 q_k^3 + q_k^1 q_k^4) & (q_k^3)^2 - (q_k^1)^2 - (q_k^2)^2 + (q_k^4)^2 \end{bmatrix}$$

The attitude angles are obtained from this rotation matrix as follows $$p_k = \tan^{-1}\left(\frac{R_{b,k}^\ell(3,2)}{\sqrt{(R_{b,k}^\ell(1,2))^2 + (R_{b,k}^\ell(2,2))^2}}\right)$$

$$r_k = \tan^{-1}\left(\frac{-R_{b,k}^\ell(3,1)}{R_{b,k}^\ell(3,3)}\right)$$

$$A_k = \tan^{-1}\left(\frac{R_{b,k}^\ell(1,2)}{R_{b,k}^\ell(2,2)}\right)$$

The Measurement Model

As mentioned earlier, two measurement models are used, one when GNSS is available and the other during GNSS outages. It is to be noted that in both models, pitch and roll angles, which are predicted from the gyroscope readings in the system model as described in the previous section, are updated from the values calculated from the two (transversal and longitudinal) or three accelerometers and odometer readings.

The importance of the velocity update from odometer-derived speed during GNSS outages results because any uncompensated accelerometer bias error will introduce an error proportional to t in velocity, and an error proportional to $t^2$ in position, as discussed earlier in Example 1. The calculation of velocity from the odometer avoids the first integration operation, so it is beneficial for the integration filter to use it for updating the velocities calculated from the accelerometers.

The importance of pitch and roll update derived from accelerometers is due to several reasons mentioned earlier in Example 1, the most important of them is that the calculation of pitch and roll from the gyroscopes involves integration, while their calculation from the accelerometers does not. The drawback of the integration is that it accumulates errors due to any residual uncompensated sensor bias errors, this error will be proportional to time. As discussed earlier, this error consequently will lead to an error in velocity proportional to $t^2$ and in position proportional to $t^3$. The pitch and roll calculated from accelerometers will not have the first integration and thus position error due to them will be proportional to $t^2$. Therefore, pitch and roll update is an important factor in enhancing the performance of the navigation solution during GNSS outages.

Furthermore, velocity updates from odometer-derived speed use the transformation from body frame velocities to local-level frame, which involves the pitch and azimuth angles. Thus, better pitch estimates lead to better transformation and therefore better velocity updates. All of this results in an enhanced position estimate.

During GNSS Availability

In this Example 2, loosely-coupled integration is used and position and velocity updates are obtained from the GNSS receiver, whereas pitch and roll updates are obtained from the two (transversal and longitudinal) or three accelerometers and odometer readings. Thus the observation vector is given as $z_k = [z_k^\varphi\ z_k^\lambda\ z_k^h\ z_k^{v_e}\ z_k^{v_n}\ z_k^{v_u}\ z_k^p\ z_k^r]^T$ which consists of the GNSS readings for the latitude, longitude, altitude, and velocity components along East, North, and Up directions respectively; as well as the pitch and roll update values. The measurement model can therefore be given as:

$$z_k = \begin{bmatrix} z_k^\varphi \\ z_k^\lambda \\ z_k^h \\ z_k^{v_e} \\ z_k^{v_n} \\ z_k^{v_u} \\ z_k^p \\ z_k^r \end{bmatrix} = h(x_k, v_k) = \begin{bmatrix} \varphi_k + v_k^\varphi \\ \lambda_k + v_k^\lambda \\ h_k + v_k^h \\ v_k^E + v_k^{v_e} \\ v_k^N + v_k^{v_n} \\ v_k^{Up} + v_k^{v_u} \\ p_k + v_k^p \\ r_k + v_k^r \end{bmatrix}$$

where $v_k = [v_k^\varphi\ v_k^\lambda\ v_k^h\ v_k^{v_e}\ v_k^{v_n}\ v_k^{v_u}\ v_k^p\ v_k^r]^T$ is the noise in the observations used for update.

During GNSS Outages

When there is a GNSS outage, the speed derived from odometer is used to update velocity, as well as for the pitch and roll updates described earlier. Thus the observation vector is given as $z_k = [z_k^{v_f}\ z_k^p\ z_k^r]^T$ which consists of the odometer-derived forward speed, pitch, and roll update values. The measurement model can therefore be given as:

$$z_k = \begin{bmatrix} z_k^{v_f} \\ z_k^p \\ z_k^r \end{bmatrix} = h(x_k, v_k) = \begin{bmatrix} \sqrt{(v_k^E)^2 + (v_k^N)^2 + (v_k^{Up})^2} + v_k^{v_f} \\ p_k + v_k^p \\ r_k + v_k^r \end{bmatrix}$$

where $v_k = [v_k^{v_f}\ v_k^p\ v_k^r]^T$ is the noise in the observations used for update.

It is to be noted that the sampling from the observation likelihood, in the case of the speed derived from odometer exploits the relation between the vehicle velocity in the body frame and in the local-level frame together with the non-holonomic constraints on land vehicles which arise from the fact that the vehicle cannot move in the transversal or the vertical directions in the body frame (thus the transversal and upward components of velocity in the body frame are zeros). So, the sampling from observation likelihood uses the following $$\begin{bmatrix} z_k^{v_e} \\ z_k^{v_n} \\ z_k^{v_u} \end{bmatrix} = R_{b,k}^\ell \begin{bmatrix} 0 \\ z_k^{v_f} \\ 0 \end{bmatrix} + \begin{bmatrix} v_k^{v_e} \\ v_k^{v_n} \\ v_k^{v_u} \end{bmatrix} = \begin{bmatrix} z_k^{v_f} \sin A_k \cos p_k \\ z_k^{v_f} \cos A_k \cos p_k \\ z_k^{v_f} \sin p_k \end{bmatrix} + \begin{bmatrix} v_k^{v_e} \\ v_k^{v_n} \\ v_k^{v_u} \end{bmatrix}$$

It should be noted also that the vehicle built-in odometer detects stopping very well, so velocity updates from odometer act as a zero velocity updates (ZUPT) when the vehicle stops.

Experimental Results

A road test trajectory is presented in this Example 2 to assess the present navigation module, and demonstrates performance in environments having several different conditions. The aim is to examine the performance of the navigation module using Mixture PF for MEMS-IMU/Odometer/GPS integration, and to compare the results with three other solutions, namely:
(1) KF solution for MEMS-IMU/Odometer/GPS with exactly the same updates as Mixture PF (i.e. velocity update from odometer-derived speed, together with pitch and roll updates from accelerometers);
(2) KF solution for MEMS-IMU/Odometer/GPS with only velocity update from odometer-derived speed during GPS outages;
(3) KF solution for MEMS-IMU/GPS without any update during GPS outages.

The errors in all the estimated solutions are calculated with respect to the NovAtel reference solution.

The presented results for Mixture PF are achieved with the number of samples equal to 100. Using 100 samples, one iteration of the algorithm takes 0.0042 seconds (with update phase and 20 samples predicted from observation likelihood) or 0.00099 seconds (if prediction phase only) using MATLAB 2007 on an Intel Core 2 Duo T7100 1.8 GHz processor with 2 GB RAM. So the algorithm can work in real-time. The performance with larger numbers of particles was examined and minor enhancement in performance was observed, which was not necessary given the added computational complexity.

Road Trajectory

Figure 10:
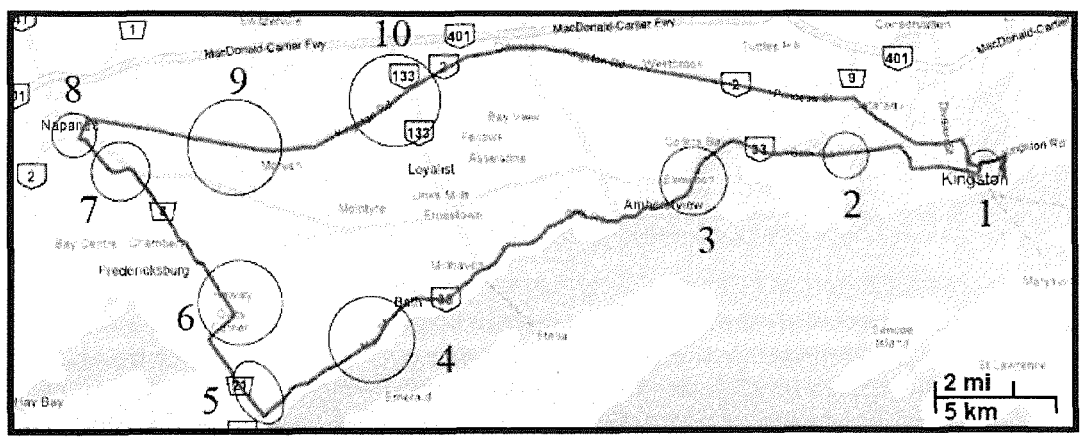
FIG. 10: Road Test Trajectory between Kingston and Napanee, Ontario, Canada. Circles indicate the locations of GPS outages.

The road test trajectory (FIG. 10) presented here is around the Kingston area in Ontario, Canada. This trajectory has some urban roadways and some long highway sections between Kingston and Napanee. In addition, the terrain varies with many hills and winding turns. This road test was performed for nearly 100 minutes of continuous vehicle navigation and a distance of around 96 Km. The ultimate check for the proposed system's accuracy is during GPS signal blockage, which can be intentionally introduced in post processing. Since the presented solution is loosely-coupled, the outages used have complete blockage. Ten simulated GPS outages of 120 seconds duration each (shown as circles overlaid on the map in FIG. 10) were introduced such that they encompass all conditions of a typical trip including straight portions, turns, slopes, high speed, slow speeds and stops.

The trajectory uses the NovAtel OEM4 GPS receiver and the inertial sensors from the MEMS-based Crossbow IMU300CC-100 (see Table 15). As mentioned earlier the speed readings are collected from the vehicle odometer through OBD-II. The reference solution used for assessment of the results is a commercially available solution made by NovAtel, it is a SPAN unit integrating the high cost high end tactical grade Honeywell HG1700 IMU (see Table 17) and the NovAtel OEM4 dual frequency receiver.

Tables 5 and 6 show the root mean square (RMS) error and the maximum error in the estimated 2D horizontal position during the ten GPS outages for the four compared solutions. Tables 7 and 8 show the RMS and maximum errors in the estimated altitude during these outages for the four solutions.

The results for horizontal position errors (Tables 5 and 6) show that the KF without any updates during GPS outages has very poor performance because the compensation of the stochastic biases of the accelerometers and gyroscopes are not perfect. As discussed earlier any uncompensated bias in one of the accelerometers will lead to position error proportional to the square of the outage duration. Moreover, any uncompensated bias in one of the two horizontal gyroscopes will lead to a positional error proportional to the cube of the outage duration. Despite the fact that KF tries to compensate for these biases, the residuals of this compensation still have a big influence, especially since the outage duration used in this trajectory is 120 seconds. The KF with velocity update from odometer-derived speed performs much better than the KF without any updates during GPS outages. This is because of the velocity update that bounds the growth of velocity errors in the KF and hence position errors due to velocity. Furthermore, this velocity update which includes the non-holonomic constraints on land vehicles, benefits to a certain extent the pitch and roll errors, and hence enhances somewhat the position error due to these attitude errors.

These results also show that the KF with velocity update from odometer-derived speed, and pitch and roll update from accelerometers and odometer outperforms the KF with only velocity update from odometer-derived speed during GPS outages. This is because the accelerometer-derived pitch and roll involve no integration operations and thus their errors do not grow with time, so the position error depending on these attitude errors is enhanced. Furthermore, velocity updates from odometer-derived speed used the transformation from body frame velocities to local-level frame, which involves the pitch and azimuth angels. So better pitch estimates lead to better transformation and therefore better velocity updates. All of this leads to an enhanced position estimate.

The results demonstrate that the Mixture PF with velocity update from odometer-derived speed, and pitch and roll update from the accelerometers and odometer performs better than the KF with exactly the same updates and consequently outperforms all the other compared solutions. This may be because of the ability of Mixture PF to use nonlinear system and measurement models without any approximation compared to the linearized models used by KF.

Tables 7 and 8 show that the KF without any updates during GPS outages has a very bad altitude estimate, mainly because of uncompensated residuals in the stochastic bias of the vertical accelerometer. The KF with velocity update from odometer-derived speed largely enhances the altitude estimate because it bounds the error growth in the vertical component of velocity and hence the altitude error. The KF with velocity update from odometer-derived speed, and pitch and roll update from the accelerometers and odometer further enhances the altitude estimate because it has a better pitch estimate from accelerometer which leads to a better transformation of velocity from body frame to local-level frame and thus to better upward velocity update and a better altitude. Mixture PF with velocity update from odometer-derived speed, and pitch and roll update from the accelerometers and odometer has a better altitude estimate than the KF with exactly the same updates, which may be due, at least in part to the use of nonlinear models in PF in contrast with the linearized models used by KF. Furthermore this Mixture PF solution outperforms all the other compared solutions.

All these horizontal position and altitude results demonstrate that the present navigation module is capable of utilizing a Mixture PF solution to achieve good results for a MEMS-based INS/GPS navigation solution.

Figure 11:
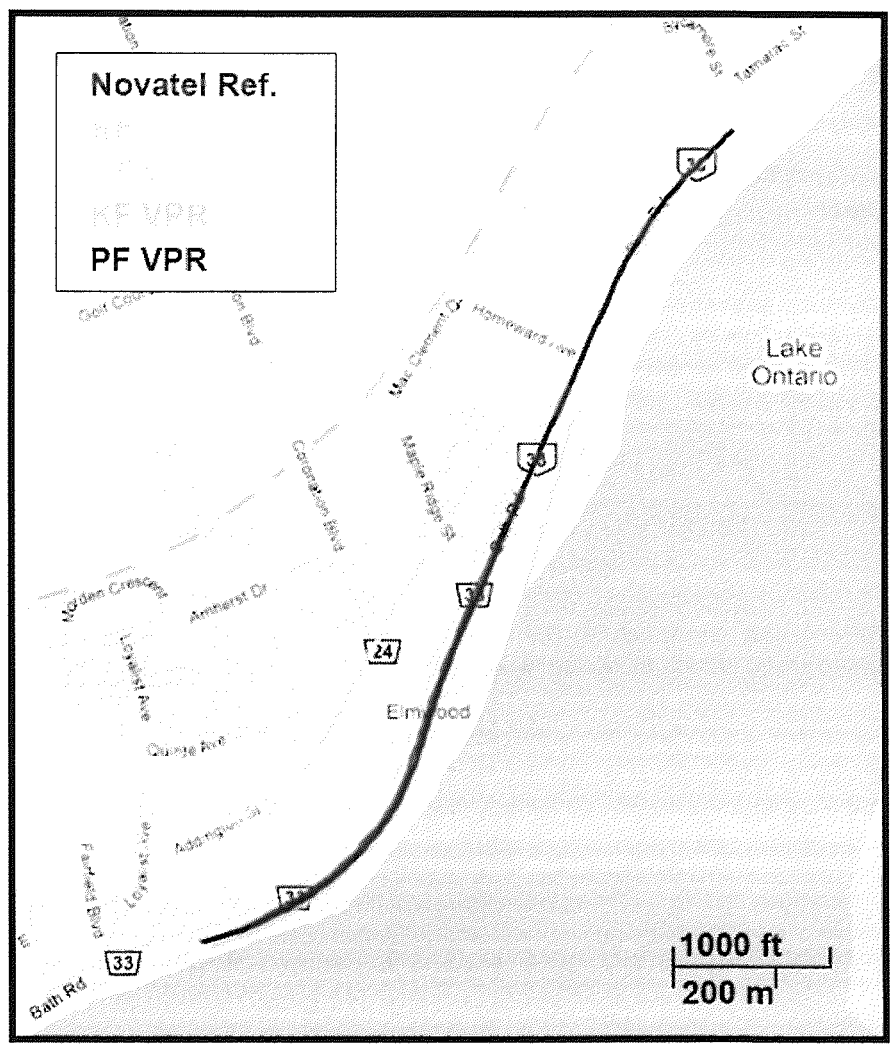
FIG. 11: Performance during GPS outage #3 as shown in FIG. 10.
Figure 12:
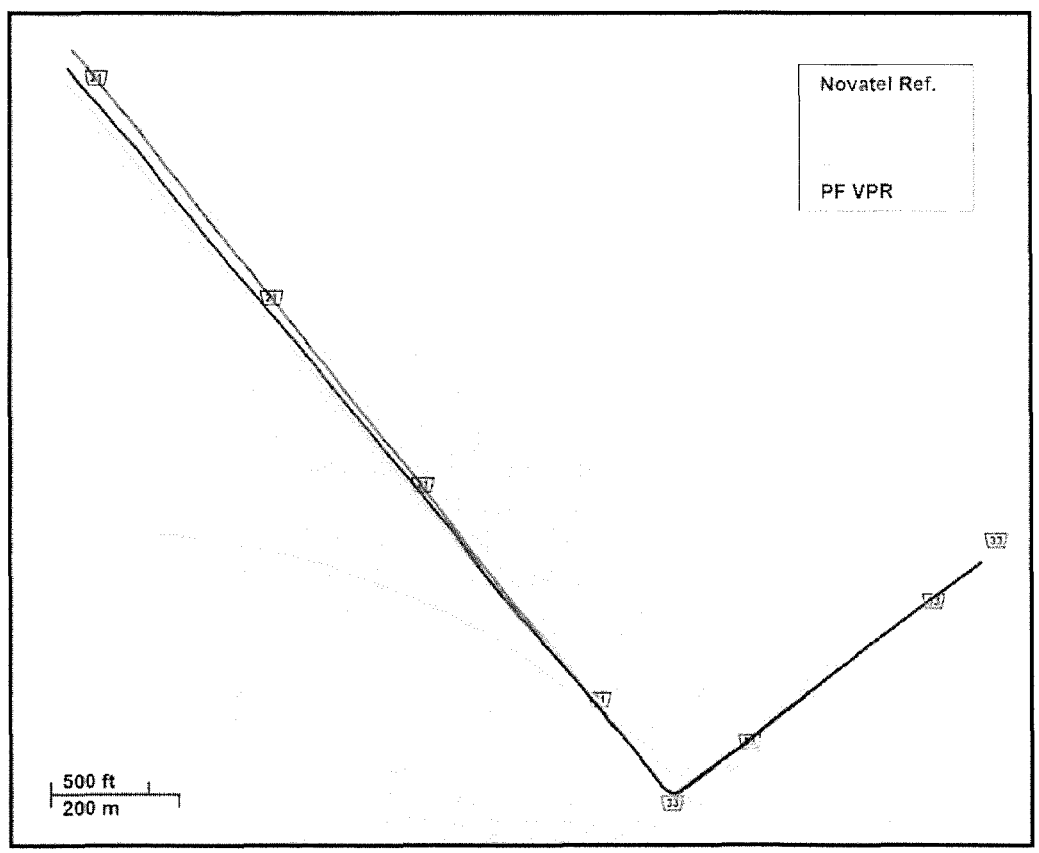
FIG. 12: Performance during GPS outage #5 as shown in FIG. 10.
Figure 13:
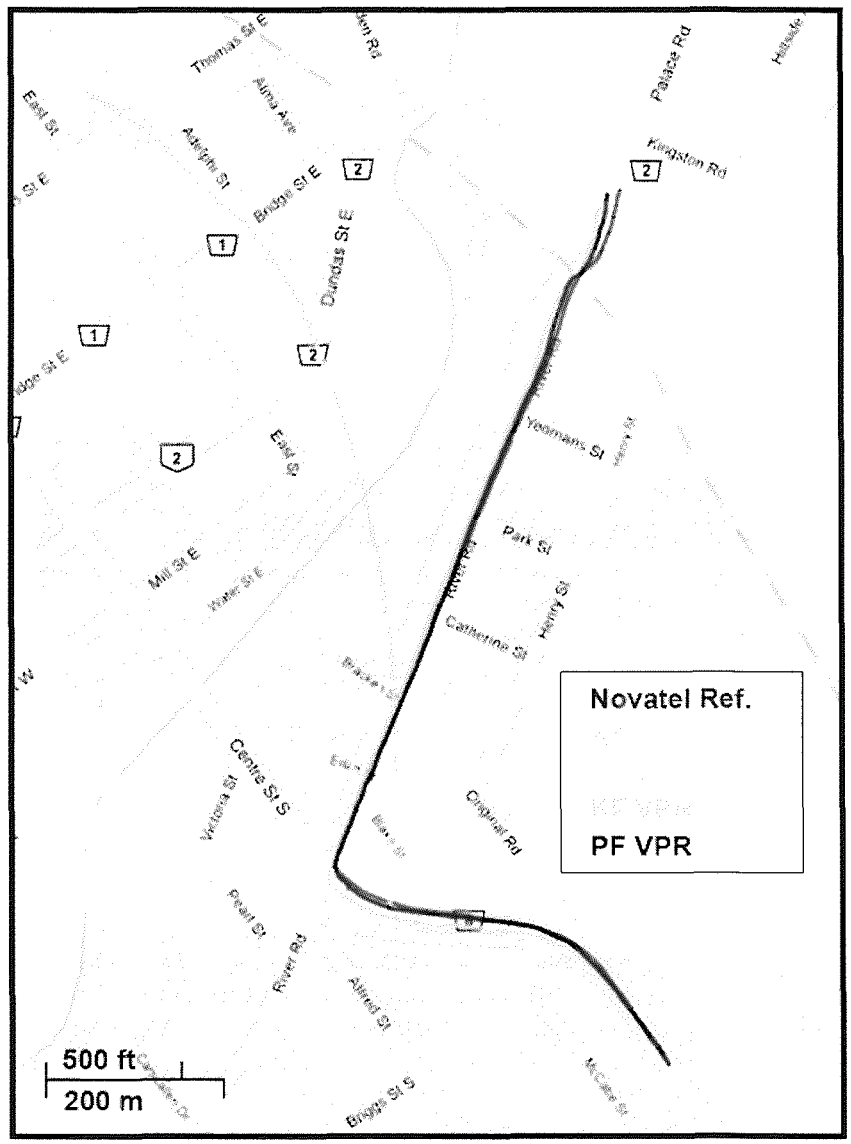
FIG. 13: Performance during GPS outage #8 as shown in FIG. 10.
Figure 14:
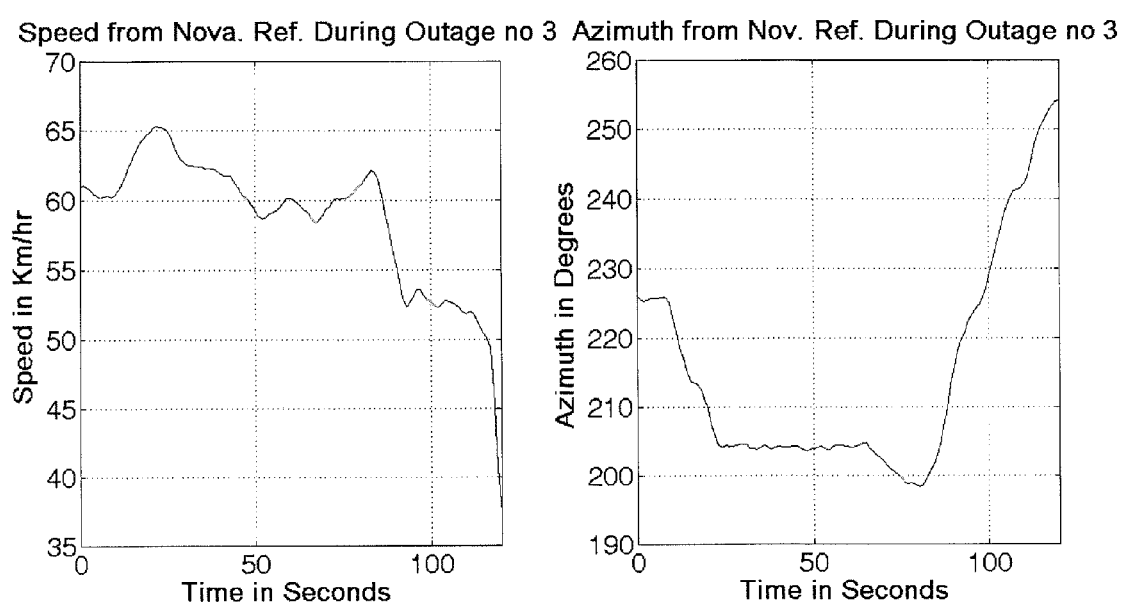
FIG. 14: Forward speed and azimuth from NovAtel reference during GPS outage #3 of FIGS. 10 and 11.

FIGS. 11, 12 and 13 show the sections of the trajectory during the GPS outages number 3, 5, and 8, respectively. To give an idea about the vehicle dynamics during these three outages respectively, FIGS. 14, 15 and 16 show the forward speed of the vehicle and its azimuth angle, both from the NovAtel reference solution.

To examine the performance during slight turns, the $3^{rd}$ outage (FIG. 11) is examined. It consists of two slight turns the first is approximately 20° with a speed of about 60 km/hr and the second is approximately 55° with a speed decelerating from about 60 km/hr to 40 km/hr (see FIG. 14). The maximum horizontal position error for Mixture PF with velocity, pitch and roll updates during GPS outages is 11.95 meters, while for KF velocity, pitch and roll updates is 26.86 meters, for KF with velocity updates is 272.96 meters, and for KF without any updates during GPS outages is 444.7 meters.

Figure 15:
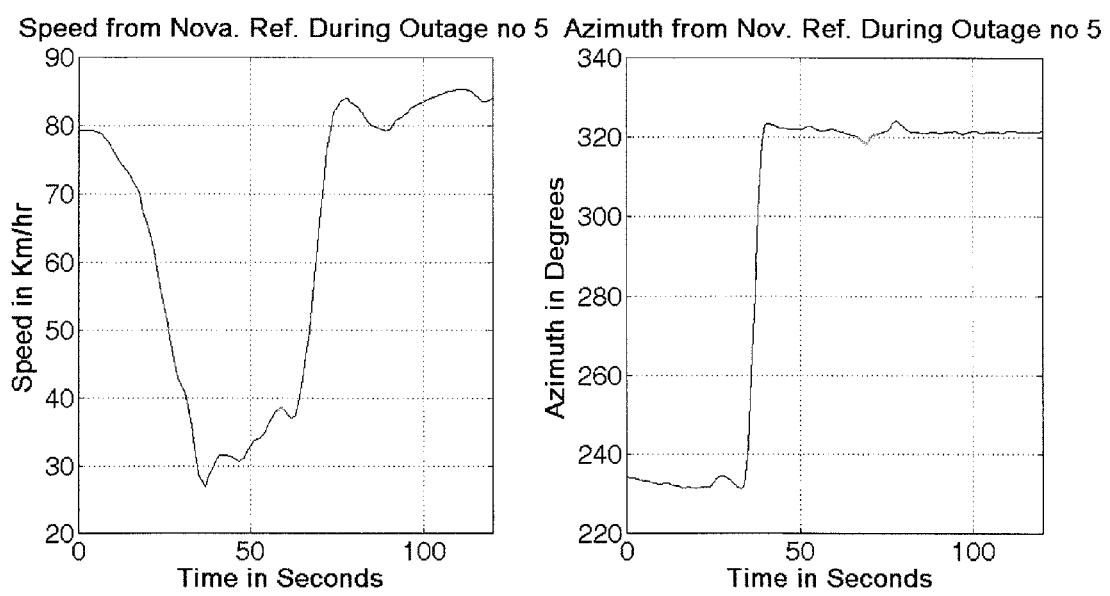
FIG. 15: Forward speed and azimuth from NovAtel reference during GPS outage #5 of FIGS. 10 and 12.
Figure 16:
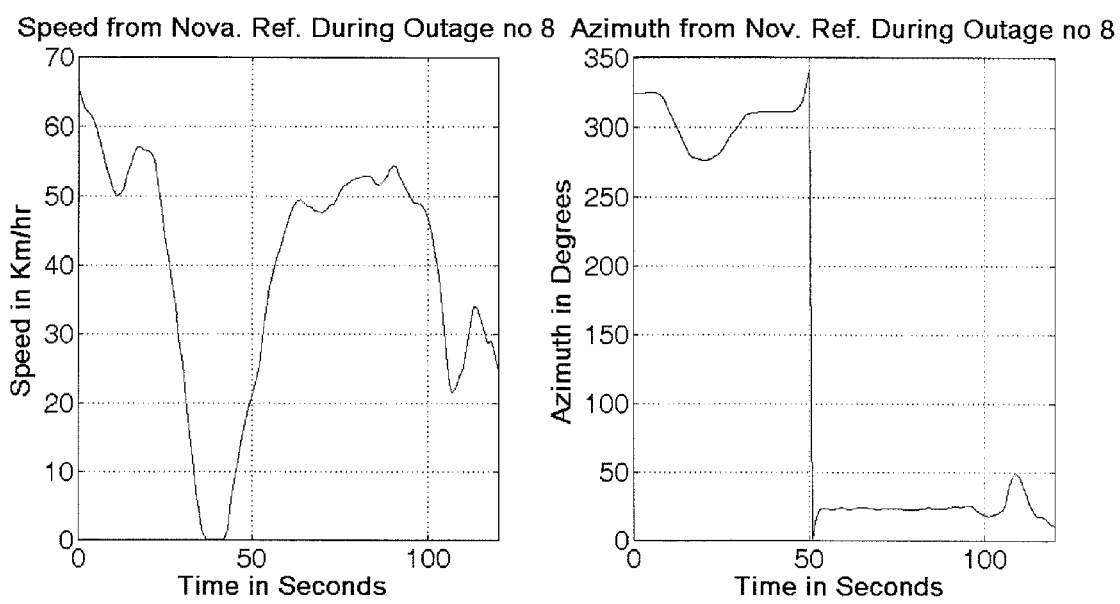
FIG. 16: Forward speed and azimuth from NovAtel reference during GPS outage #8 of FIGS. 10 and 13.

To examine the performance during turns, the $5^{th}$, and $8^{th}$ GPS outages are examined The $5^{th}$ outage (FIG. 12) is during a sharp 90° turn and the speed of the vehicle is about 80 km/h before the turn, about 30 km/hr during the turn, and then back again to about 80 km/hr after the turn (see FIG. 15). The maximum horizontal position error for Mixture PF with velocity, pitch and roll updates during GPS outages is 30.19 meters, while for KF velocity, pitch and roll updates is 47.57 meters, for KF with velocity updates is 52.69 meters, and for KF without any updates during GPS outages is 745.7 meters. The $8^{th}$ outage (FIG. 13) is during a double turn and it involves a stop. The first turn is about 50°, the second is about 80°. The speed changes as seen in FIG. 16. It should be noted that the discontinuity in the azimuth in FIG. 16, near the 50th second, is only a plotting discontinuity because the azimuth angle there exceeds 360°, so it cycles back to 0°. The maximum horizontal position error for Mixture PF with velocity, pitch and roll updates during GPS outages is 13.07 meters, while for KF with velocity, pitch and roll updates is 28.16 meters, for KF with velocity updates is 69.6 meters, and for KF without any updates during GPS outages is 599.2 meters.

The $9^{th}$ GPS outage shows the performance during a straight portion of the trajectory where the vehicle's speed is about 83 km/h, and the traveled distance is nearly 2.78 km. The maximum horizontal position error for Mixture PF with velocity, pitch and roll updates during GPS outages is 9.68 meters, while for KF velocity, pitch and roll updates is 11.77 meters, for KF with velocity updates is 321.87 meters, and for KF without any updates during GPS outages is 487.1 meters.

For MEMS-based inertial sensors, these results show that the proposed Mixture PF solution has a good performance during long GPS outages encompassing either straight portions or turns, at different speeds including stops.

Summary of the Results

The results show that the KF without any updates during GPS outages has very poor performance. The KF with velocity update from odometer-derived speed outperforms the KF without any updates during GPS outages. These results also demonstrate that the KF with velocity update from odometer-derived speed and pitch and roll updates from both accelerometers and odometer performs better than the KF with only velocity updates during GPS outages. This elucidates the benefit of the accelerometer-derived pitch and roll updates to enhance these angle estimates and thus the velocity projection which leads to a better position estimate. The results also demonstrate that the Mixture PF with velocity update from odometer-derived speed and pitch and roll update from accelerometers and odometer performs better than the KF with exactly the same updates and consequently improves upon all the other compared solutions. This is primarily because of the approximation during linearization of the models used by the KF.

Having run the compared solutions on several trajectories and considering the maximum error in horizontal positioning, the KF with velocity updates during GPS outages achieved an average improvement of approximately 73% over KF without any update during GPS outages. The KF with velocity, pitch and roll updates during GPS outages achieved an average improvement of approximately 58% over KF with velocity update only during GPS outages. The Mixture PF with velocity, pitch and roll updates during GPS outages achieved an average improvement of approximately 64% over KF with the same updates, of approximately 85% over KF with velocity updates only, and of approximately 95% over KF without any updates during GPS outages.

The proposed Mixture PF solution improved upon all the other solutions in the comparison, and showed stable and good performance (compared to general MEMS-based inertial sensors/GPS integration performance during GPS outages), even for long GPS outage durations. Moreover, with the low number of samples used and the presented running times, the Mixture PF algorithm can work in real-time.

Example 3

Optional Enhancements for Inertial Sensors/GPS Integration

Background

One remaining main source of error in the "reduced number of inertial sensors with speed readings" is the azimuth error, which is mainly due to the vertically aligned gyroscope (this error is also present in the case of a full-IMU or 2D dead reckoning solutions). Any residual uncompensated bias in the vertical gyroscope will cause an error in the azimuth proportional to the duration of the GNSS outage. The position error because of this azimuth error will be proportional to vehicle speed, the duration of the GNSS outage, and azimuth error (in turn proportional to the duration of the GNSS outage and the uncompensated bias). Thus, the position error because of the residual uncompensated bias in the vertical gyroscope will be proportional to the square of the duration of the GNSS outage.

Accordingly, the present Example targets improved modeling of the stochastic drift of the MEMS-based gyroscope (used in the proposed reduced systems") to enhance the positioning accuracy of Mixture PF for 2D dead reckoning/GPS and 3D "reduced number of inertial sensors with speed readings"/GPS integration. In this Example, the known Parallel Cascade Identification (PCI) was used as a nonlinear system identification technique for modeling the stochastic gyroscope drift. The use of this technique exploits the fact that PF is a nonlinear filtering technique that can accommodate nonlinear models. By examining the characteristics of the generated model for the gyroscope drift using PCI, it was found that the identified model was near linear, but of high order (i.e. long memory length). These observations led to the further testing of higher order Auto-Regressive (AR) models for modeling the gyroscope drift. Such higher order models are difficult to use with KF since the size of the state vector and consequently the size of the dynamic matrix and error covariance matrix become very large and complicates the KF operation.

Modeling the Stochastic Gyroscope Drift Using Parallel Cascade Identification

Two different datasets were recorded from the vertical gyroscope of the Crossbow IMU300CC-100 where the IMU is stationary. Each dataset was obtained over more than 4 hours. First, the bias offset of the gyroscope reading is removed for each dataset (the offset is obtained as the mean of the gyro reading during the first 100 seconds of the dataset). The first dataset is used to build the model of the gyroscope drift, the second dataset is used for testing the obtained model to examine its suitability and ability to generalize for a different dataset. In the present Example, the gyroscope data is down-sampled to 1 Hz and its units are radians/second. The length of the data used is 16001 seconds (i.e. 16001 records).

The gyroscope readings of the first dataset (after removing the initial offset) from record 1 to 16000 are used as the input used to build the PCI model, the readings from record 2 to 16001 are used as the output. Since PCI builds the parallel cascade based on input/output data, several PCI models are built as a one-ahead predictor using this input/output data, covering a wide range of values for the maximum lag R and the degree of polynomial D. These different PCI models were tested on the second dataset (not used for building the models) to choose the model with the best values of R and D, so that it can generalize on the other dataset and not just fit the training data. The best PCI model found has maximum lag R=120 and the degree of polynomial D=1. It consists of 5 parallel branches. The number of parameters in the model might be thought to be 5×(120+2)=610, but actually the number of parameter is 122. This is because the order of the polynomial terms D=1 and all the cascades outputs are summed to provide the output, so mathematical manipulation shows that the actual number of parameters is 122. On the other hand, the two datasets used for training and testing have 16001 records each. Moreover, the road-test results presented later for different MEMS-based inertial sensors show the ability of the obtained model to generalize and determine the stochastic drift of the two different gyroscopes used in different trajectories.

Figure 17:
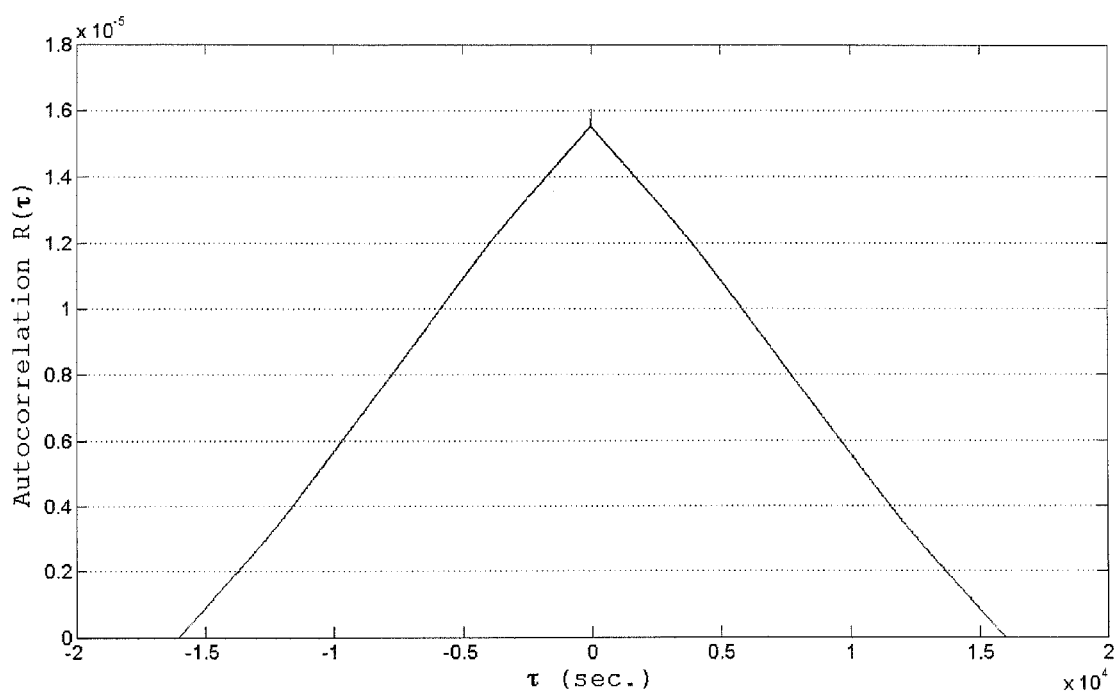
FIG. 17: The autocorrelation of gyroscope reading of the second stationary dataset.
Figure 18:
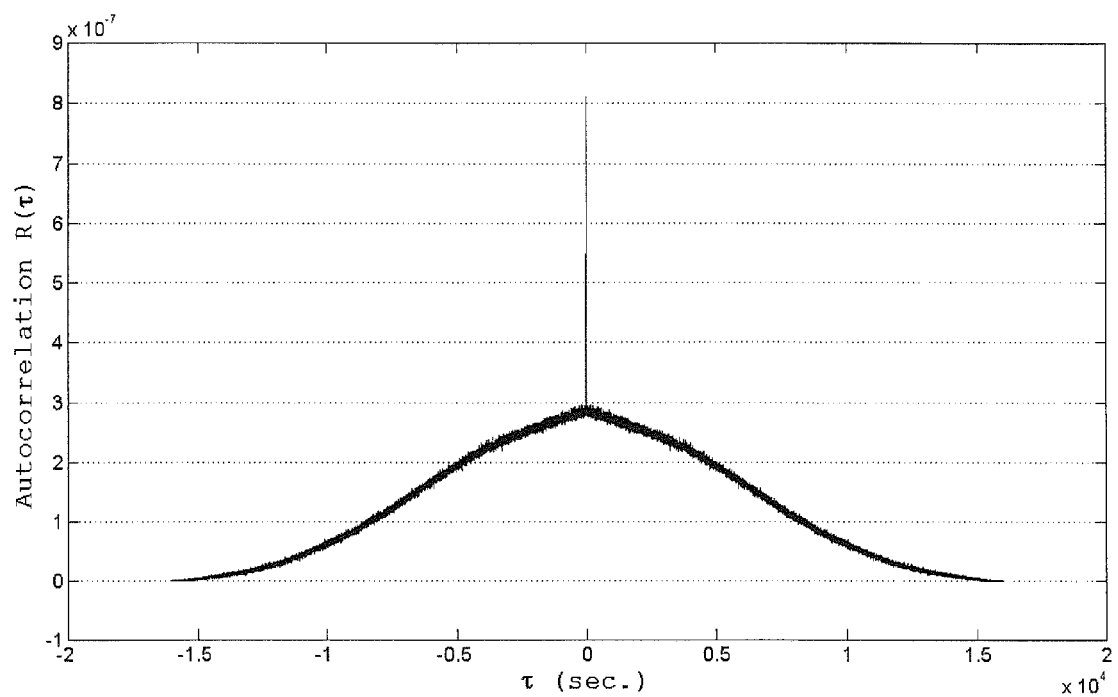
FIG. 18: The autocorrelation of gyroscope reading of the second stationary dataset after removing the initial bias offset.
Figure 19:
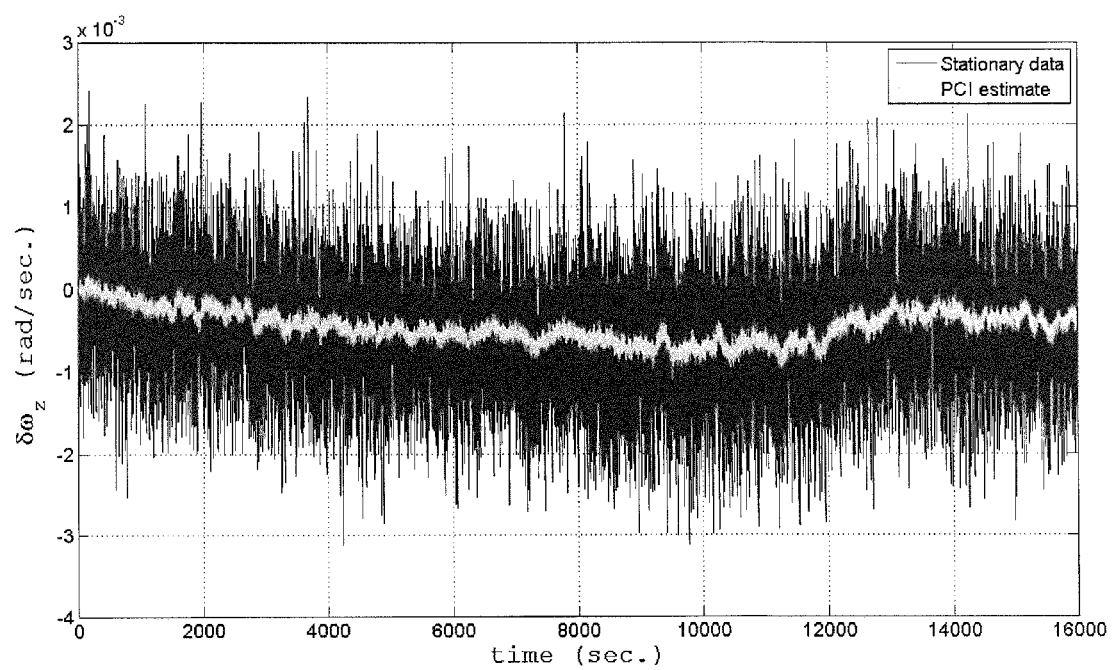
FIG. 19: The gyroscope reading of the second stationary dataset after removing the initial bias offset versus the PCI prediction of the drift.
Figure 20:
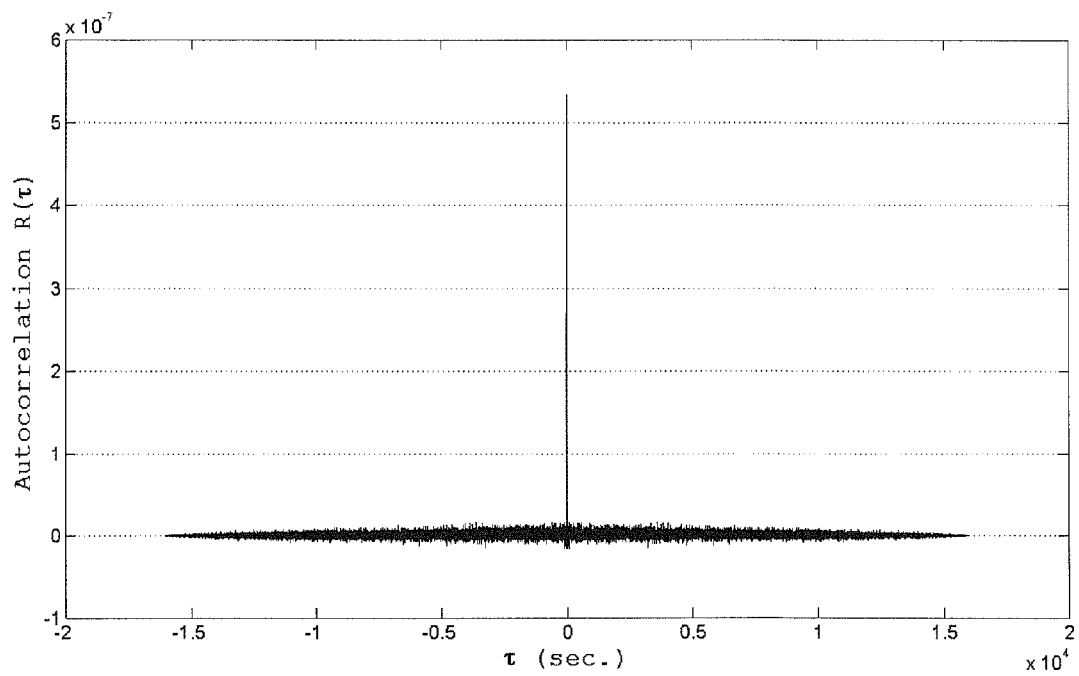
FIG. 20: The autocorrelation of gyroscope reading of the second stationary dataset after removing the initial bias offset and the PCI predicted drift.

FIGS. 17, 18, 19 and 20 are for the second stationary dataset, which was not used for building the PCI model. FIG. 17 shows the autocorrelation of the stationary $\omega_z$ gyroscope reading. FIG. 18 gives the autocorrelation of the stationary $\omega_z$ gyroscope reading after removing the initial bias offset. According to this autocorrelation, it can be seen that the traditional Gauss-Markov (GM) model is not the most suitable model for this MEMS-based gyroscope drift. FIG. 19 presents the stationary $\omega_z$ gyroscope reading (after removing the initial bias offset) from 2 to 16001 together with the estimated drift by the PCI model that has as input the readings from 1 to 16000. This figure shows how well the PCI model can predict the stochastic drift in gyroscope reading. FIG. 20 shows the autocorrelation of the stationary $\omega_z$ gyroscope reading after removing the initial bias offset and the drift estimated by the PCI model. This autocorrelation function shows that after removing the estimated drift, the remaining signal is mainly white noise. The use of the PCI model in the integration filter during a trajectory and how it is updated so that it can get the actual drift is presented.

Modeling the Stochastic Gyroscope Drift Using Higher Order AR

The best PCI model used to model the gyroscope drift under consideration had maximum lag R=120 and the degree of polynomial D=1. Since the order of the polynomial terms D=1 and all the cascades outputs are summed to provide the overall system output, the mathematical manipulation can show that all the parallel cascades can collapse to one cascade consisting of a dynamic linear element with maximum lag of 120 followed by a first order polynomial (linear term and a constant term). Consequently, this system is like an AR system with a sole difference that the polynomial has a constant term as well. However, by examining its value, it was very small compared to the linear term. Thus, it was interesting to see how well a higher order AR model would do in modeling this gyroscope drift. The equation of the AR model of order p is in the form $$y_k = -\sum_{n=1}^{p} \alpha_n y_{k-n} + \beta_0 \omega_k$$

where $\omega_k$ is white noise which is the input to the AR model, $y_k$ is the output of the AR model, the $\alpha$'s and $\beta$ are the parameters of the model.

The first dataset was used to obtain the AR parameters using the Yule-Walker method. For the stationary readings down-sampled at 1 Hz, an AR model whose order is 120 was obtained to model the drift. The model was tested using the second dataset to validate its capability to generalize and not just fit the training data. Also, theoretically, it is expected that there is no over-fitting because the number of parameters of the model is 121 while the two datasets used for training and testing have 16001 records each. Furthermore, the road-test results presented later for different inertial sensors show the capability of the obtained models to generalize and get the stochastic drift of the different gyroscopes used.

In the following presented discussion, the AR model is used without the white noise input to show the ability of the model to get the drift of the readings. The white noise input will be added later on when the model is used in the integration filter.

Figure 21:
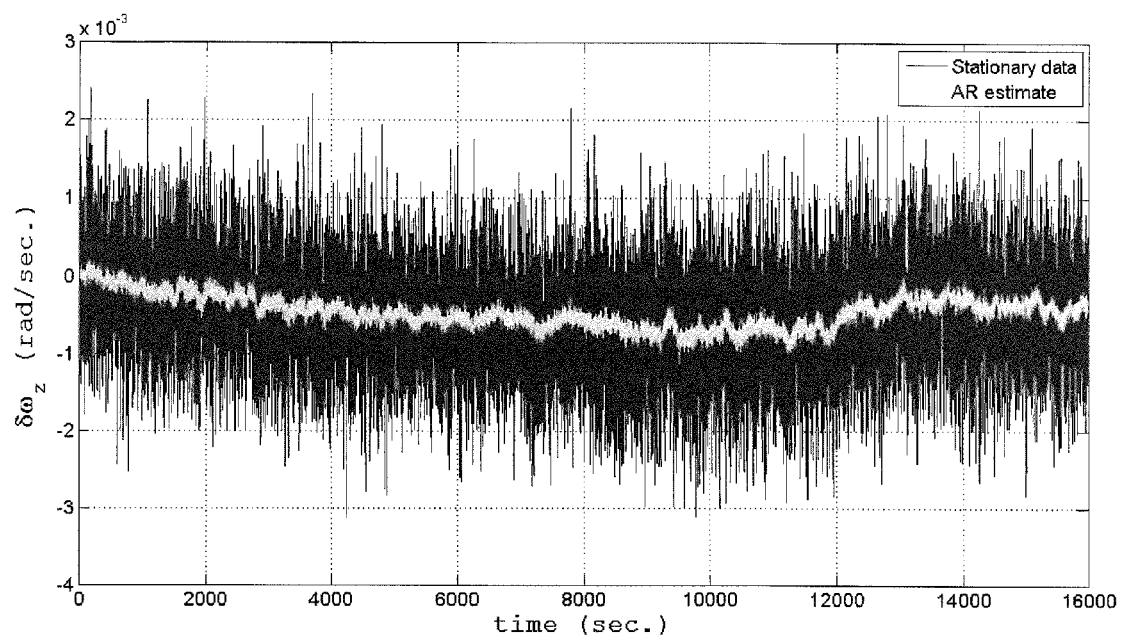
FIG. 21: The gyroscope reading of the second stationary dataset after removing the initial bias offset versus the AR prediction of the drift.
Figure 22:
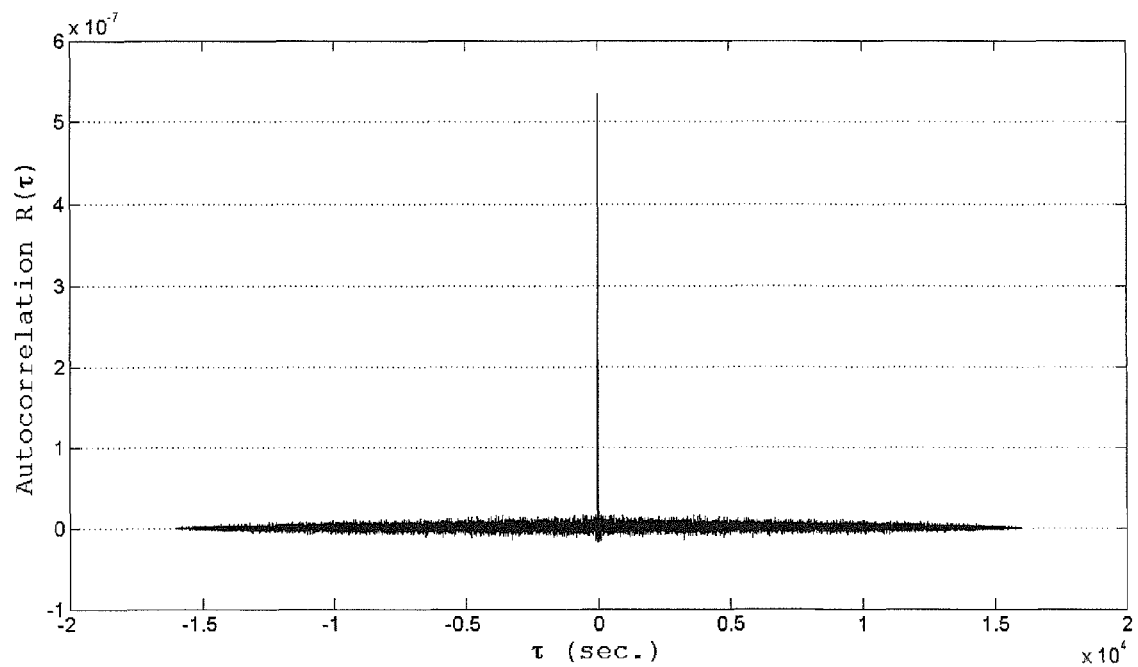
FIG. 22: The autocorrelation of gyroscope reading of the second stationary dataset after removing the initial bias offset and the AR predicted drift.

FIGS. 21 and 22 are for the second stationary dataset, which was not used for building the AR model. FIG. 21 presents the stationary $\omega_z$ gyroscope reading (after removing the initial bias offset) from record 2 to 16001 together with the one-ahead predicted drift by the AR model (without the white noise input) that uses the values of the respective previous gyroscope readings, from record 1 to 16000, assuming the initial conditions before reading record 1 are zeros. FIG. 22 shows the autocorrelation of the stationary $\omega_z$ gyroscope reading after removing the initial bias offset and the drift estimated by the AR model. This autocorrelation function shows that after removing the estimated drift, the remaining signal is mainly white noise.

It should be noted that such a higher order AR model is difficult to use with KF, despite the fact that it is a linear model. This is because for each inertial sensor error to be modeled the state vector has to be augmented with a number of elements equal to the order of the AR model (which is 120). Consequently, the covariance matrix, and other matrices used by the KF will increase drastically in size (an increase of 120 in rows and an increase of 120 in columns for each inertial sensor), which make this difficult to realize.

If the stochastic gyroscope drift is modeled by either GM, or AR, or PCI in the system model, the state vector has to be augmented accordingly. The normal way of doing this augmentation will lead to, for example in the case of AR with order 120, the addition of 120 states to the state vector. Since this will introduce a lot of computational overhead and will require an increase in the number of used particles, another approach is used in this work. The flexibility of the models used by PF was exploited together with an approximation that experimentally proved to work well. The state vector in PF is augmented by only one state for the gyroscope drift. So at the k-th iteration, all the values of the gyroscope drift state in the particle population of iteration k−1 will be propagated as usual, but for the other previous drift values from k−120 to k−2, only the mean of the estimated drift will be used and propagated. This implementation makes the use of higher order models possible without adding a lot of computational overhead. The experiments with Mixture PF demonstrated that this approximation is valid.

If 120 states were added to the state vector, i.e. all the previous gyroscope drift states in all the particles of the population of iteration k−120 to k−1 were to be used in the k-th iteration, then the computational overhead would have been very high. Furthermore, when the state vector is large PF computational load is badly affected because a larger number of particles may be used. But this is not the case in this implementation because of the approximation discussed above.

Updating the Gyroscope Drift Using GPS

For the solution proposed in this Example, when a system model is used for the gyroscope drift (i.e. the state vector is augmented with a state for the gyroscope drift), the procedure undertaken to have a measurement update for this state is described in the following discussion. The update for the gyroscope drift is carried out when two conditions are satisfied: when there is no GPS outage and the vehicle is in motion. The fact that the vehicle is in motion is detected through the speed readings (in this example it is the speed derived from the odometer). The Azimuth calculated from GPS is obtained as follows $$A_k^{GPS} = \tan^{-1}\left(v_k^{E,GPS} / v_k^{N,GPS}\right).$$

This GPS-derived Azimuth is compared to another one computed from unaided mechanization of the reduced multi-sensor system. For this purpose, another version of the motion model is run independently outside the PF without the process noise term, (the process noise term is for example $w_{k-1} = [\delta v_{k-1}^{od} \; \delta \omega_{k-1}^z]^T = [0\; 0]^T$ in the case of 2D dead reckoning, and in case of the 3D reduced system of Example 1 it was described earlier). $A_k^{Mech}$ is the azimuth calculated from this unaided mechanization. It is to be noted that the unaided mechanization is a 2D one in case of 2D dead reckoning and a 3D one in the case of reduced system from Example 1.

For 2D Dead Reckoning/GPS Integration

For 2D dead reckoning, the update value for the gyroscope drift is derived from the following equations. We have $$\frac{dA^{Mech}}{dt} = -\left(\omega^{z,Mech} - \omega^e \sin\varphi^{Mech} - \frac{v^{f,Mech}\sin A^{Mech}\tan\varphi^{Mech}}{(R_N + h)}\right)$$

According to the mechanization output, the gyroscope reading that should have been associated with the motion between time steps k−1 and k (where the index k here is not the same as the one used for the gyroscope rate but for the GPS rate) is $$\omega_{k-1}^{z,Mech} = -\frac{A_k^{Mech} - A_{k-1}^{Mech}}{\Delta t} + \omega^e \sin\varphi_{k-1}^{Mech} + \frac{v_{k-1}^{f,Mech}\sin A_{k-1}^{Mech}\tan\varphi_{k-1}^{Mech}}{(R_N + h)}$$

Similarly, according to GPS readings, the gyroscope reading that should have been associated with the motion between time steps k−1 and k is $$\omega_{k-1}^{z,GPS} = -\frac{A_k^{GPS} - A_{k-1}^{GPS}}{\Delta t} + \omega^e \sin\varphi_{k-1}^{GPS} + \frac{v_{k-1}^{f,GPS}\sin A_{k-1}^{GPS}\tan\varphi_{k-1}^{GPS}}{(R_N + h)}$$

where $v_{k-1}^{f,GPS} = \sqrt{(v_{k-1}^{E,GPS})^2 + (v_{k-1}^{N,GPS})^2}$.

For 2D dead reckoning, the update value for the gyroscope drift to be used at the k-th GPS update is $$\delta\omega_{k-1}^{z,Update} = \omega_{k-1}^{z,Mech} - \omega_{k-1}^{z,GPS} =$$
$$-\frac{(A_k^{Mech} - A_k^{GPS}) - (A_{k-1}^{Mech} - A_{k-1}^{GPS})}{\Delta t} + \omega^e(\sin\varphi_{k-1}^{Mech} - \sin\varphi_{k-1}^{GPS}) +$$
$$\left(\frac{v_{k-1}^{f,Mech}\sin A_{k-1}^{Mech}\tan\varphi_{k-1}^{Mech}}{(R_N + h)} - \frac{v_{k-1}^{f,GPS}\sin A_{k-1}^{GPS}\tan\varphi_{k-1}^{GPS}}{(R_N + h)}\right)$$

For 3D "Reduced Number of Inertial Sensors with Speed Readings"/GPS Integration

For 3D "reduced number of inertial sensors with speed readings", the update value for the gyroscope drift is derived from the following equations. From the Azimuth equation in the 3D "reduced number of inertial sensors with speed readings" system model in Example 1, one have $$\left.\frac{dA}{dt}\right|_k = \left.\frac{d}{dt}\left(\tan^{-1}\left(\frac{U^E}{U^N}\right)\right)\right|_k + \omega^e\sin\varphi_{k-1} + \frac{v_{k-1}^f \sin A_{k-1} \cos p_{k-1} \tan\varphi_{k-1}}{(R_N + h_{k-1})}$$

Since $$\frac{d}{dx}(\tan^{-1} x) = \frac{1}{1 + x^2}$$

one have $$\frac{d}{dt}\left(\tan^{-1}\left(\frac{U^E}{U^N}\right)\right) = \frac{1}{1 + \left(\frac{U^E}{U^N}\right)^2} * \frac{d}{dt}\left(\frac{U^E}{U^N}\right) =$$
$$\frac{(U^N)^2}{(U^N)^2 + (U^E)^2} * \frac{d}{dt}\left(\frac{U^E}{U^N}\right) = \frac{(U_N)^2}{1 - (U^U)^2} * \frac{d}{dt}\left(\frac{U^E}{U^N}\right)$$

-continued $$\frac{d}{dt}\left(\frac{U^E}{U^N}\right) = \frac{1}{(U^N)^2}\left(U^N \frac{dU^E}{dt} - U^E \frac{dU^N}{dt}\right)$$

$$\frac{d}{dt}\left(\tan^{-1}\left(\frac{U^E}{U^N}\right)\right) = \frac{1}{1 - (U^U)^2}\left(U^N \frac{dU^E}{dt} - U^E \frac{dU^N}{dt}\right)$$

$$U_k^E = \sin A_{k-1}\cos p_{k-1}\cos\gamma_{k-1}^z -$$
$$(\cos A_{k-1}\cos r_{k-1} + \sin A_{k-1}\sin p_{k-1}\sin r_{k-1})\sin\gamma_{k-1}^z$$

$$U_k^N = \cos A_{k-1}\cos p_{k-1}\cos\gamma_{k-1}^z -$$
$$(-\sin A_{k-1}\cos r_{k-1} + \cos A_{k-1}\sin p_{k-1}\sin r_{k-1})\sin\gamma_{k-1}^z$$

$$U_k^U = \cos p_{k-1}\sin r_{k-1}\sin\gamma_{k-1}^z + \sin p_{k-1}\cos\gamma_{k-1}^z$$

$$\left.\frac{dU^E}{dt}\right|_k = \left.\frac{d\gamma^z}{dt}\right|_{k-1}[-\sin A_{k-1}\cos p_{k-1}\sin\gamma_{k-1}^z -$$
$$(\cos A_{k-1}\cos r_{k-1} + \sin A_{k-1}\sin p_{k-1}\sin r_{k-1})\cos\gamma_{k-1}^z] + \left.\frac{dp}{dt}\right|_{k-1}$$
$$[-\sin A_{k-1}\sin p_{k-1}\cos\gamma_{k-1}^z - \sin A_{k-1}\cos p_{k-1}\sin r_{k-1}\sin\gamma_{k-1}^z] + \left.\frac{dr}{dt}\right|_{k-1}$$
$$[\cos A_{k-1}\sin r_{k-1}\sin\gamma_{k-1}^z - \sin A_{k-1}\sin p_{k-1}\cos r_{k-1}\sin\gamma_{k-1}^z] +$$
$$\left.\frac{dA}{dt}\right|_{k-1}[\cos A_{k-1}\cos p_{k-1}\cos\gamma_{k-1}^z +$$
$$(\sin A_{k-1}\cos r_{k-1} - \cos A_{k-1}\sin p_{k-1}\sin r_{k-1})\sin\gamma_{k-1}^z]$$

$$\left.\frac{dU^N}{dt}\right|_k = \left.\frac{d\gamma^z}{dt}\right|_{k-1}[-\cos A_{k-1}\cos p_{k-1}\sin\gamma_{k-1}^z -$$
$$(-\sin A_{k-1}\cos r_{k-1} + \cos A_{k-1}\sin p_{k-1}\sin r_{k-1})\cos\gamma_{k-1}^z] +$$
$$\left.\frac{dp}{dt}\right|_{k-1}[-\cos A_{k-1}\sin p_{k-1}\cos\gamma_{k-1}^z -$$
$$\cos A_{k-1}\cos p_{k-1}\sin r_{k-1}\sin\gamma_{k-1}^z] + \left.\frac{dr}{dt}\right|_{k-1}$$
$$[-\sin A_{k-1}\sin r_{k-1}\sin\gamma_{k-1}^z - \cos A_{k-1}\sin p_{k-1}\cos r_{k-1}\sin\gamma_{k-1}^z] +$$
$$\left.\frac{dA}{dt}\right|_{k-1}[-\sin A_{k-1}\cos p_{k-1}\cos\gamma_{k-1}^z +$$
$$(\cos A_{k-1}\cos r_{k-1} + \sin A_{k-1}\sin p_{k-1}\sin r_{k-1})\sin\gamma_{k-1}^z]$$

$$\left.\frac{d}{dt}\left(\tan^{-1}\left(\frac{U^E}{U^N}\right)\right)\right|_k = \frac{1}{1 - (U^U)^2}\left[-\cos p_{k-1}\cos r_{k-1}\left.\frac{d\gamma^z}{dt}\right|_{k-1} +$$
$$\{(\cos p_{k-1}\cos\gamma_{k-1}^z - \sin p_{k-1}\sin r_{k-1}\sin\gamma_{k-1}^z)^2 +$$
$$\cos^2 r_{k-1}\sin^2\gamma_{k-1}^z\}$$

$$\left.\frac{dA}{dt}\right|_{k-1} - (\sin p_{k-1}\cos r_{k-1}\sin\gamma_{k-1}^z\cos\gamma_{k-1}^z +$$
$$\cos p_{k-1}\sin r_{k-1}\cos r_{k-1}\sin^2\gamma_{k-1}^z)\left.\frac{dp}{dt}\right|_{k-1} +$$
$$(\cos p_{k-1}\sin r_{k-1}\sin\gamma_{k-1}^z\cos\gamma_{k-1}^z -$$
$$\sin p_{k-1}\sin^2\gamma_{k-1}^z)\left.\frac{dr}{dt}\right|_{k-1}\right]$$

Further mathematical manipulation of trigonometric functions shows that:

$$\left.\frac{d}{dt}\left(\tan^{-1}\left(\frac{U^E}{U^N}\right)\right)\right|_k = \frac{1}{1 - (U^U)^2}\left[-\cos p_{k-1}\cos r_{k-1}\left.\frac{d\gamma^z}{dt}\right|_{k-1} + \{1 - (U^U)^2\}\right.$$
$$\left.\frac{dA}{dt}\right|_{k-1} - (\sin p_{k-1}\cos r_{k-1}\sin\gamma_{k-1}^z\cos\gamma_{k-1}^z +$$
$$\cos p_{k-1}\sin r_{k-1}\cos r_{k-1}\sin^2\gamma_{k-1}^z)$$

-continued $$\left. \frac{dp}{dt}\right|_{k-1} + (\cos p_{k-1}\sin r_{k-1}\sin\gamma^z_{k-1}\cos^z_{k-1} - \sin p_{k-1}\sin^2\gamma^z_{k-1})\left.\frac{dr}{dt}\right|_{k-1}\right]$$

$$\omega^z_{k-1} = \left.\frac{d\gamma^z}{dt}\right|_{k-1} = \frac{1}{-\cos p_{k-1}\cos r_{k-1}}\left[\{1-(U^U)^2\}\right.$$

$$\left.\frac{d}{dt}\left(\tan^{-1}\left(\frac{U^E}{U^N}\right)\right)\right|_k - \{1-(U^U)^2\}$$

$$\left.\frac{dA}{dt}\right|_{k-1} + (\sin p_{k-1}\cos r_{k-1}\sin\gamma^z_{k-1}\cos\gamma^z_{k-1} + \cos p_{k-1}\sin r_{k-1}\cos r_{k-1}\sin^2\gamma^z_{k-1})\left.\frac{dp}{dt}\right|_{k-1} -$$

$$(\cos p_{k-1}\sin r_{k-1}\sin\gamma^z_{k-1}\cos\gamma^z_{k-1} - \sin p_{k-1}\sin^2\gamma^z_{k-1})$$

$$\left.\frac{dr}{dt}\right|_{k-1}\right]$$

According to the mechanization output, the gyroscope reading that should have been associated with the motion between time steps k−1 and k (where the index k here is not the same as the one used for the gyroscope rate but for the GPS rate) is $\omega_{k-1}^{z,Mech}$. According to GPS readings, the gyroscope reading that should have been associated with the motion between time steps k−1 and k is $\omega_{k-1}^{z,GPS}$. The update value of the gyroscope drift (to be used at the k-th GPS update) is $\delta\omega_{k-1}^{z,Update} = \omega_{k-1}^{z,Mech} - \omega_{k-1}^{z,GPS}$. It should be noted that the calculation of pitch $p_{k-1}$ and roll $r_{k-1}$ depend only on the accelerometers and odometer in the reduced system, so these values are the same for the expressions of $\omega_{k-1}^{z,Mech}$ and $\omega_{k-1}^{z,GPS}$. Thus the terms in the above equation, which involve $$\left.\frac{dp}{dt}\right|_{k-1} \text{ and } \left.\frac{dp}{dt}\right|_{k-1}$$

are nearly the same for both $\omega_{k-1}^{z,Mech}$ and $\omega_{k-1}^{z,GPS}$ and will be cancelled together when calculating their difference.

Thus, For 3D "reduced number of inertial sensors with speed readings", the update value of the gyroscope drift (to be used at the k-th GPS update) is $$\delta\omega_{k-1}^{z,Update} = \omega_{k-1}^{z,Mech} - \omega_{k-1}^{z,GPS} =$$

$$\frac{1}{-\cos p_{k-1}\cos r_{k-1}}\left[\{1-(U^{U,Mech})^2\}\frac{d}{dt}\left(\tan^{-1}\left(\frac{U^{E,Mech}}{U^{N,Mech}}\right)\right)\right|_k - \{1-$$

$$(U^{U,Mech})^2\}\left.\frac{dA^{Mech}}{dt}\right|_{k-1} - \{1-U^{U,GPS})^2\}$$

$$\frac{d}{dt}\left(\tan^{-1}\left(\frac{U^{E,GPS}}{U^{N,GPS}}\right)\right)\right|_k \{1-(U^{U,GPS})^2\}\left.\frac{dA^{GPS}}{dt}\right|_{k-1}\right]$$

One have $$\left.\frac{d}{dt}\left(\tan^{-1}\left(\frac{U^{E,Mech}}{U^{N,Mech}}\right)\right)\right|_k = \left.\frac{dA^{Mech}}{dt}\right|_k - \omega^e\sin\varphi_{k-1}^{Mech} -$$

$$\frac{v_{k-1}^{f,Mech}\sin A_{k-1}^{Mech}\cos p_{k-1}\tan\varphi_{k-1}^{Mech}}{(R_N + h_{k-1}^{Mech})}\frac{d}{dt}\left(\tan^{-1}\left(\frac{U^{E,GPS}}{U^{N,GPS}}\right)\right)\right|_k =$$

$$\left.\frac{dA^{GPS}}{dt}\right|_k - \omega^e\sin\varphi_{k-1}^{GPS} - \frac{v_{k-1}^{f,GPS}\sin A_{k-1}^{GPS}\cos p_{k-1}\tan\varphi_{k-1}^{GPS}}{(R_N + h_{k-1}^{GPS})}$$

Thus $$\delta\omega_{k-1}^{z,Update} =$$

$$\frac{1}{-\cos p_{k-1}\cos r_{k-1}}\left[\{1-(U^{U,Mech})^2\}\left\{\frac{A_k^{Mech} - 2A_{k-1}^{Mech} + A_{k-2}^{Mech}}{\Delta t} - \right.\right.$$

$$\left.\omega^e\sin\varphi_{k-1}^{Mech} - \frac{v_{k-1}^{f,Mech}\sin A_{k-1}^{Mech}\cos p_{k-1}\tan\varphi_{k-1}^{Mech}}{(R_N + h_{k-1}^{Mech})}\right\} -$$

$$\{1-U^{U,GPS})^2\}\left\{\frac{A_k^{GPS} - 2A_{k-1}^{GPS} + A_{k-2}^{GPS}}{\Delta t} - \omega^e\sin\varphi_{k-1}^{GPS} - \right.$$

$$\left.\left.\frac{v_{k-1}^{f,GPS}\sin A_{k-1}^{GPS}\cos p_{k-1}\tan\varphi_{k-1}^{GPS}}{(R_N + h_{k-1}^{Mech})}\right\}\right]$$

Experimental Results

The aim of the presented trajectory is to examine the performance of the proposed 2D Navigation solution using Mixture PF with both PCI and higher order AR. The two proposed combinations are compared to four other 2D solutions:
 1. Mixture PF with Gauss-Markov (GM) model for the gyro drift,
 2. Mixture PF with only white Gaussian noise (WGN) for the stochastic gyro errors, and
 3. two different KF with GM model for the gyro drift.

All the PF solutions, except the one that uses WGN, use the idea of updating the gyroscope drift from GPS data when appropriate, one of the KF solutions uses this same idea of update, while the other does not benefit from it. The errors in all the estimated solutions are calculated with respect to the NovAtel reference solution.

The PF presented results are achieved with the number of samples equal to 100. Using 100 samples with 20 samples predicted from observation likelihood, one iteration of the Mixture PF for 2D dead reckoning (with the AR model for gyroscope drift) takes 0.00323 seconds (average of all iterations) using MATLAB 2007 on an Intel Core 2 Duo T7100 1.8 GHz processor with 2 GB RAM. One iteration of the Mixture PF for 2D dead reckoning (with the PCI model for gyroscope drift) takes 0.004 seconds on the same machine. So the algorithm can work in real-time.

Road Trajectory

Figure 23:
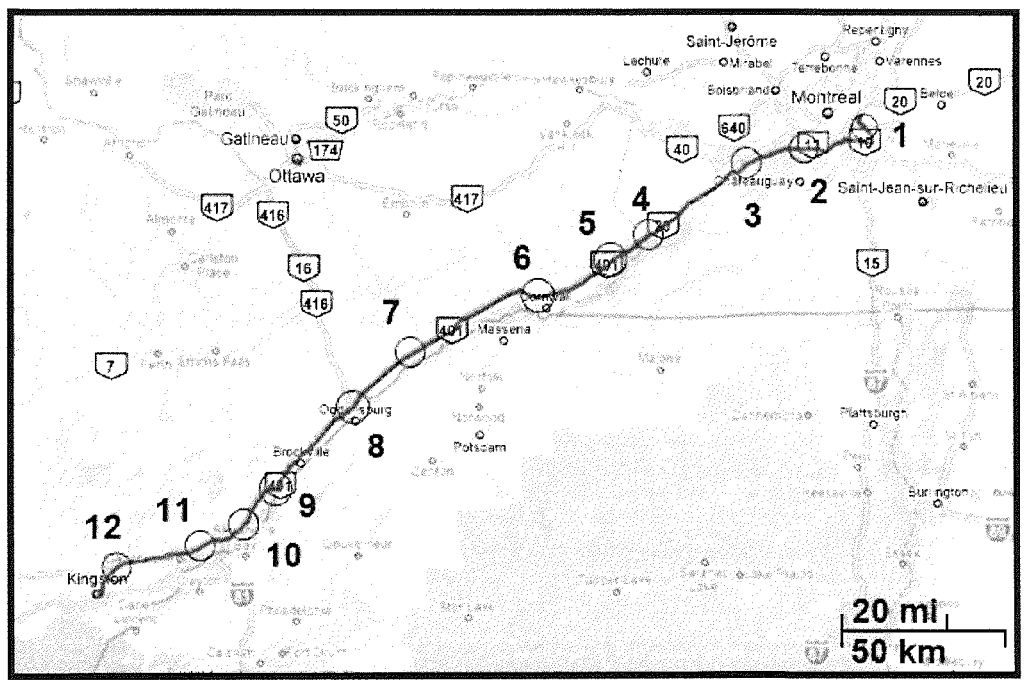
FIG. 23: Road Test Trajectory from Montreal to Kingston. Circles indicate the locations of GPS outages.

FIG. 23 shows the road test trajectory, which starts in Montreal, Quebec, Canada and ends in Kingston, Ontario, Canada. This trajectory has some urban roadways in Montreal, and then it is on the highway from Montreal to Kingston. This road test was performed for nearly 190 minutes of continuous vehicle navigation and a distance of around 303 km. The ultimate check for the proposed system's accuracy is during GPS signal blockage, which can be intentionally introduced in post processing. Since the presented solution is loosely-coupled, the outages used have complete blockage. Twelve outages are used (shown as circles overlaid on the map in FIG. 23), they are simulated GPS outages. The trajectory is used twice, once with 60-second outages and once with 180-second outages. The simulated outages were chosen such that they encompass straight portions and turns, the majority of which are at high speeds. Since outages of fixed durations are used, testing high speed cases shows the robustness of the proposed solutions because higher speeds will cause more position errors due to azimuth errors.

The trajectory uses the NovAtel OEM4 GPS receiver and the inertial sensors from the MEMS-based Crossbow IMU300CC-100 (see Table 15). As mentioned earlier the speed readings are collected from the vehicle odometer through OBD-II. The reference solution used for assessment of the results is a commercially available solution made by NovAtel, it is a SPAN unit integrating the high cost high end tactical grade Honeywell HG1700 IMU (see Table 17) and the NovAtel OEM4 dual frequency receiver.

The Case with 60-Second GPS Outages

Tables 9 and 10 show the root mean square (RMS) error and the maximum error in the estimated 2D horizontal position during the twelve introduced 60-second GPS outages for the six compared solutions. One benefit of the technique for updating the gyroscope stochastic drift from GPS (when appropriate) and mechanization can be seen by comparing the two KFs with GM models. The KF that uses the proposed measurement update for gyroscope drift performs much better than the one without updates for this drift. The results also show that the Mixture PF with GM outperforms the KF with GM. This is due to the ability of PF to deal with nonlinear system and measurement models, while the KF uses linearized error models. Furthermore, the Mixture PF with GM outperforms the Mixture PF with WGN because of the modeling of the stochastic drift of the gyroscope using GM, while the WGN solution assumes there is no stochastic drift (the stochastic error is only WGN). Except for a few cases, the performance of Mixture PF with WGN generally degrades with time because there is no modeling for the stochastic drift that generally increases with time. This fact will be more apparent when 180-second outages are examined.

The average performance of PF with WGN is better than the KF with GM because of the first 7 outages (except outage number 4) where the influence of the drift is still small. Another reason for the comparable results of PF with WGN and KF with GM, despite the fact that the former assumes there is no drift, is the better estimate for the Azimuth angle before the outage in the PF because of the nonlinear measurement model presented in the previous chapter for the RISS, in which the Azimuth angle can benefit from GPS updates. Moreover, these results demonstrate that the Mixture PF with PCI and the Mixture PF with AR have approximately similar performance and they outperform the other solutions. This may be because of both the nonlinear filtering and the use of more sophisticated models for the stochastic gyroscope drift. Comparing the PCI, higher order AR, and $1^{st}$ order GM (all used with PF) shows that the traditional GM model may not be the most adequate model for the stochastic drift of MEMS-based gyroscopes.

For MEMS-based sensors integrated with GPS, these results demonstrate the good performance of the two proposed navigation solutions. It should be noted also that these outages are mostly high speed ones, so the traveled distance during outages is a large distance (as seen in Tables 9 and 10) and any Azimuth errors will be more influential in position errors. In average, the maximum position error for the two proposed solutions is about 7 meters in 1.8 kilometers.

The Case with 180 Seconds GPS Outages

Tables 11 and 12 show the RMS error and the maximum error in the estimated 2D horizontal position during the twelve simulated 180-second outages for the six solutions. The KF with measurement update for the gyroscope stochastic drift outperforms the KF without update for the drift. This may be because a compensated gyroscope drift that is not well compensated for may lead to an Azimuth error (proportional to outage duration) that in turn leads to a greater error in position proportional to outage duration, azimuth error and the vehicle's velocity. Thus the position error due to uncompensated gyroscope drift is proportional to both the velocity and the square of outage duration. The effect of the measurement update for the gyroscope drift is much more apparent in the 180-second case.

As in the 60-second case, these 180-second results show that the Mixture PF with GM performs better than KF with GM, but that their performance difference is not as much as in the 60-second case. This may be because a mis-modeled gyroscope drift error will lead to an Azimuth error that in turn leads to a greater error in position. So in 180-second outages, the mis-modelling of the $1^{st}$ order GM is a major factor. Furthermore, the Mixture PF with GM outperforms the Mixture PF with WGN because of the modeling of the stochastic drift of the gyroscope (even using GM), while the WGN solution assumes there is no stochastic drift. The performance of Mixture PF with WGN is generally degrading with time because there is no modeling for the stochastic drift that generally increases with time; this fact is more obvious here because of the 180-second outages. The average performance of PF with WGN is now less than the KF with GM despite the fact that it is better in some of the early outages where the influence of the stochastic drift is smaller.

Again, it can be seen that the Mixture PF with PCI and the Mixture PF with AR have very similar performance and they greatly outperform the other solutions. While in the 60-second case the ratio between the average of maximum errors for these 2 solutions and the other solutions (except KF without measurement update for the gyroscope drift) were about 1:2 or 1:3, these ratios are 1:5 and 1:6 in the 180 seconds outages. This greater difference in performance may be because of the better modeling of the stochastic gyroscope drift, which becomes more drastic when the outage duration increases. These results provides further evidence that the traditional $1^{st}$ order GM process is not the most suitable for modeling the stochastic drift of MEMS-based gyroscopes. On average, the maximum position error for the two proposed solutions is about 28 meters in 5.3 kilometers.

Figure 24:
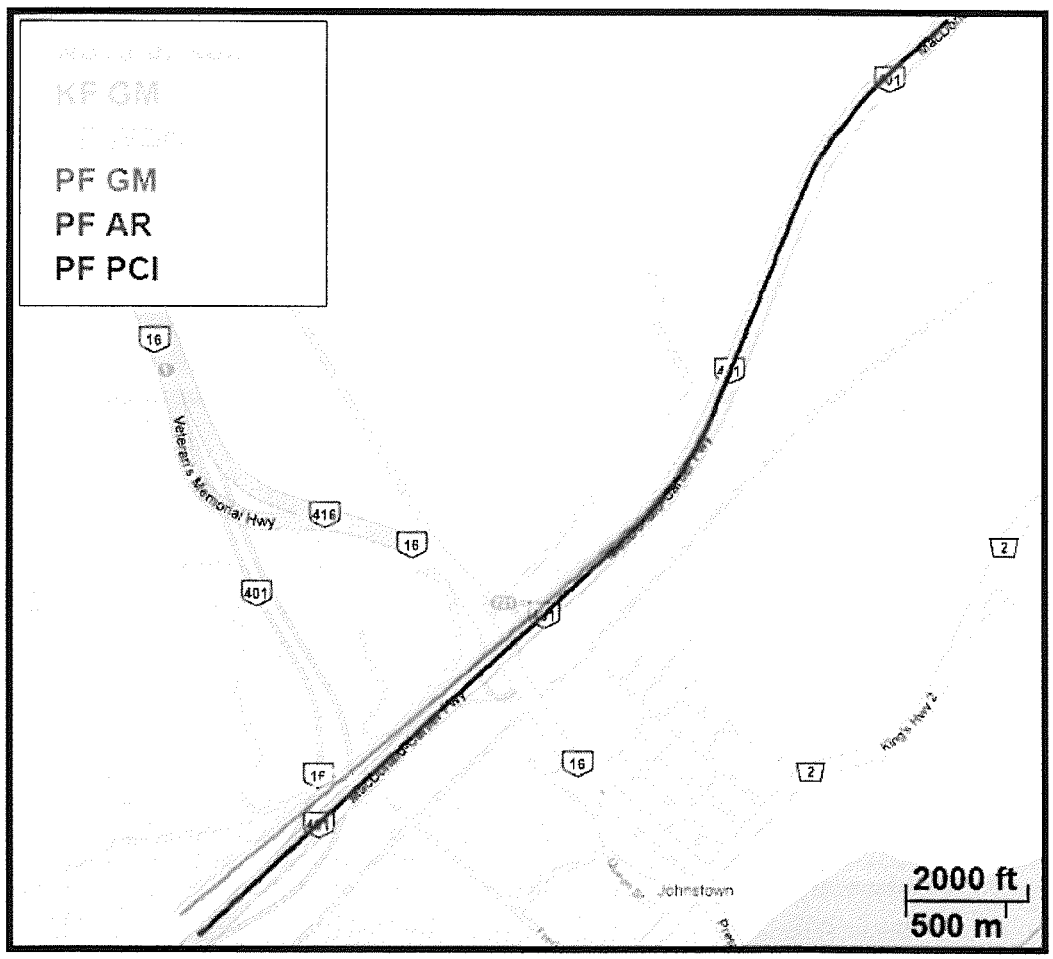
FIG. 24: Performance during GPS outage #8 shown in FIG. 23.
Figure 25:
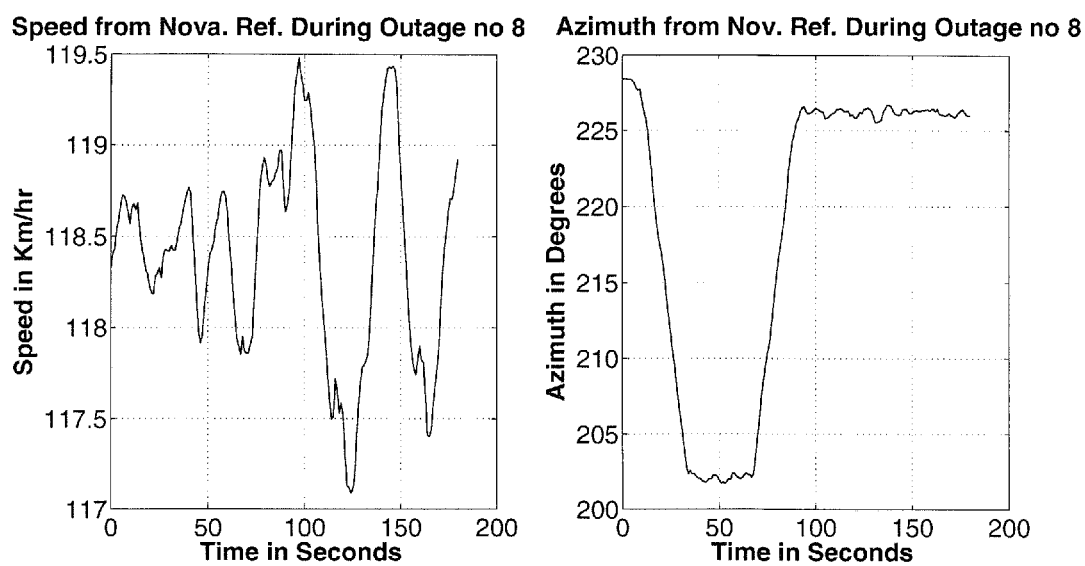
FIG. 25: Forward speed and azimuth from Novatel reference during GPS outage #8 shown in FIGS. 23 and 24.
Figure 26:
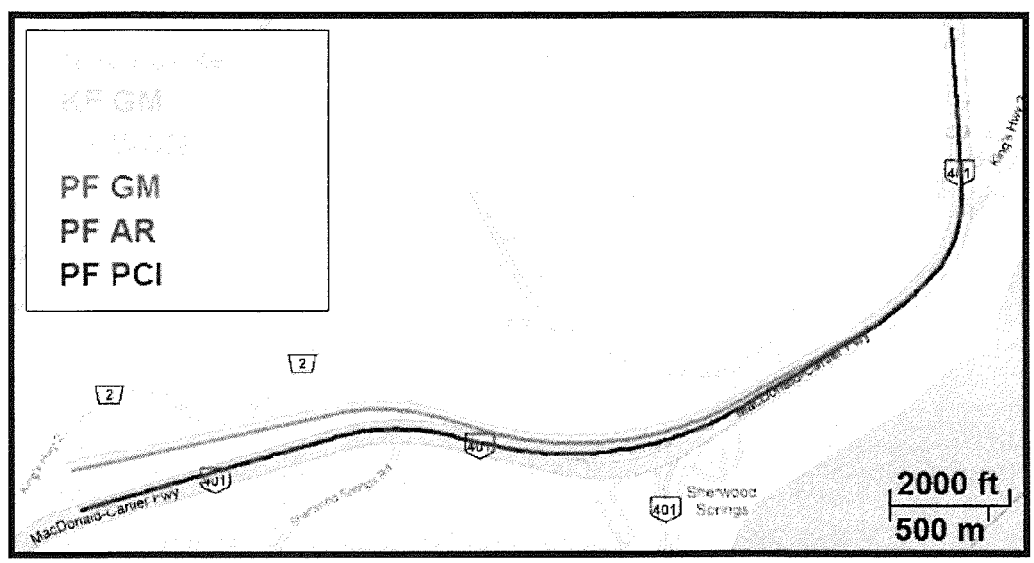
FIG. 26: Performance during GPS outage #9 shown in FIG. 23.
Figure 27:
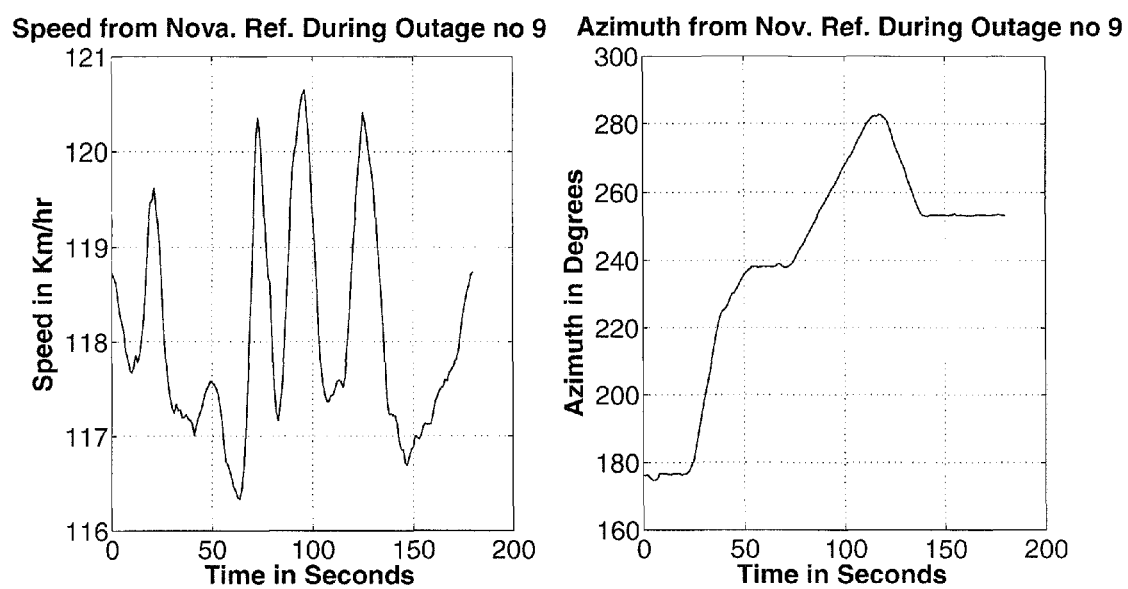
FIG. 27: Forward speed and azimuth from Novatel reference during GPS outage #9 shown in FIGS. 23 and 26.
Figure 28:
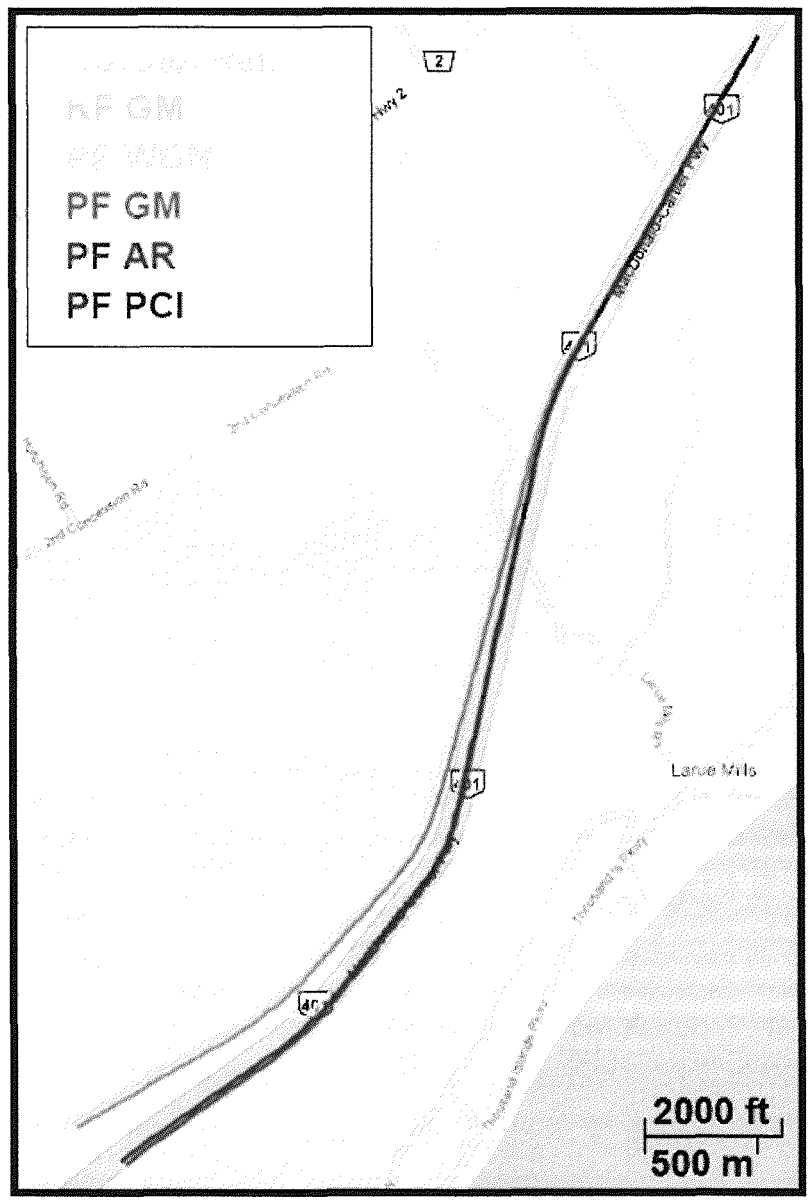
FIG. 28: Performance during GPS outage #10 shown in FIG. 23.
Figure 29:
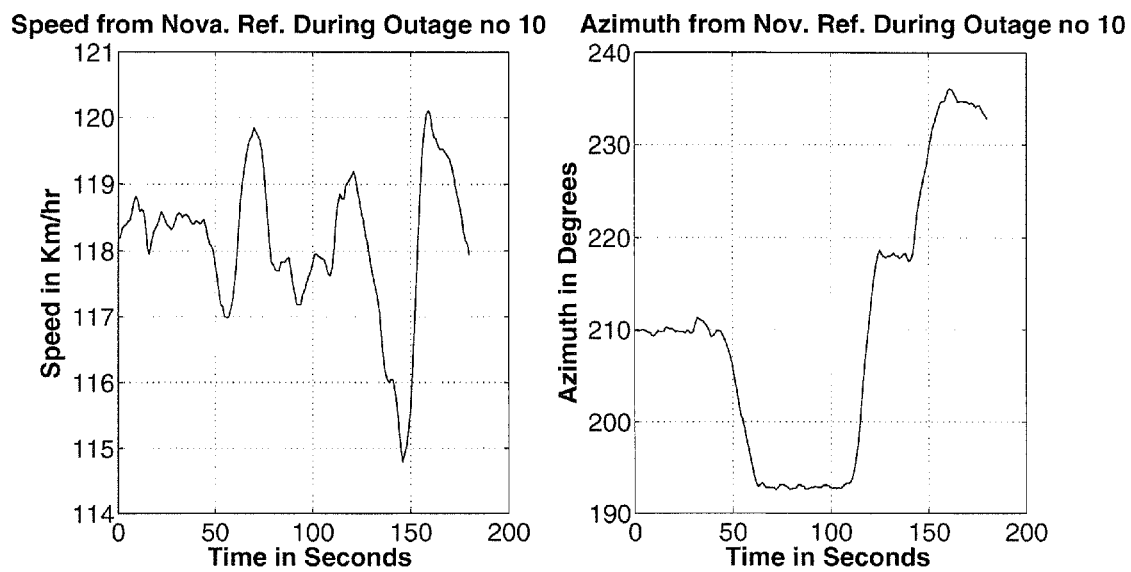
FIG. 29: Forward speed and azimuth from Novatel reference during GPS outage #10 shown in FIGS. 23 and 28.

FIGS. 24, 26 and 28 show the sections of the trajectory during the 180 seconds GPS outages numbers 8, 9, and 10, respectively. These figures show the reference solution and all the solutions except the KF without measurement update for the gyroscope drift (the worst solution). To illustrate the vehicle dynamics during these three outages FIGS. 25, 27 and 29, respectively, show the forward speed of the vehicle and its azimuth angle, both from the NovAtel reference solution.

To examine the performance during turns, the $8^{th}$, $9^{th}$ and $10^{th}$ GPS outages are examined The $8^{th}$ outage, which starts at the $125^{th}$ minute from the beginning of the trajectory, is during a couple of small turns of about 25° each and the speed of the vehicle is about 118 km/h. The maximum horizontal position error for PF with PCI is 15.4 meters, while for PF with AR is 15.02 meters, for PF with GM is 145.63 meters, for PF with WGN is 220.75, and for KF with GM and gyroscope drift measurement update is 183.4 meters. These results conform to the previous discussion on the performance of the different solutions. The $9^{th}$ outage, which starts at about the $144^{th}$ minute of the trajectory, involves a 60° turn followed by a 45° one then another of 30° and the vehicle speed is about 118 km/h. The maximum horizontal position error for PF with PCI is 27.14 meters, while for PF with AR is 25.17 meters, for PF with GM is 229.6 meters, for PF with WGN is 252.54, and for KF with GM and gyroscope drift update is 276.62 meters. This outage is the only exception, in the last five outages of the trajectory, where the result of PF with WGN is better than KF with GM and gyroscope drift update. The $10^{th}$ GPS outage, which starts at the $150^{th}$ minute of the trajectory, is during a sequence of slight turns of about 17°, 25°, and 17°. The speed is about 118 km/h. The maximum horizontal position error for PF with PCI is 34.2 meters, while for PF with AR is 59.54 meters, for PF with GM is 208.81 meters, for PF with WGN is 269.03, and for KF with GM and gyroscope drift update is 238.22 meters.

To show the performance during straight portions of the trajectory, the 7th GPS outage is an example, where the vehicle's speed is about 115 km/h. This outage starts at the 111th minute from the beginning of the trajectory, and the traveled distance during this outage is nearly 5.75 km. The maximum horizontal position error for PF with PCI is 15.72 meters, while for PF with AR is 13.5 meters, for PF with GM is 147.57 meters, for PF with WGN is 164.15, and for KF with GM and gyroscope drift measurement update is 180.4 meters.

The advantage of suitable modeling of the MEMS-based gyroscope stochastic drift is apparent from these results. For MEMS-based inertial sensors, these results show that the two proposed solutions (PF with either PCI or higher order AR) have improved performance during long GPS outages encompassing either straight portions or turns, even at high speeds.

Summary of the Results

The results emphasized the benefit of the proposed technique for obtaining measurement updates for the stochastic drift of the gyroscope from both mechanization and GPS (when appropriate), which can be seen by comparing the results of the two KFs, with and without the use of these updates. The results also demonstrated that Mixture PF improved upon KF for this integration problem, due to the use of nonlinear system and measurement models instead of linearized models. Furthermore, the results showed that the Mixture PF with GM model for the stochastic drift has a better performance than Mixture PF with WGN, because the latter assumes that there is no drift and the stochastic error is only white noise. Moreover, the results demonstrated that the 1st order GM process is not the most suitable model for this MEMS-based gyroscope drift, and that more sophisticated models can give far better performance especially in long GPS outages where the gyroscope error is more influential.

Having run the compared solutions on several trajectories and considering the maximum error in horizontal positioning, the KF with measurement update for the gyroscope stochastic drift achieved an average improvement of approximately 64% over KF without this update for the drift in the case with 60-second outages, and an improvement of 62% in the case with 180-second outages. Mixture PF with PCI achieved an average improvement of approximately 47% over Mixture PF with GM in the case with 60-second outages, and an improvement of 78% in the case with 180-second outages. Furthermore, Mixture PF with PCI achieved an average improvement of approximately 63% over Mixture PF with WGN in the case with 60-second outages, and an improvement of 83% in the case with 180-second outages. Moreover, Mixture PF with PCI achieved an average improvement of approximately 72% over KF with GM and measurement updates for the gyroscope drift in the case with 60-second outages, and an improvement of 82% in the case with 180-second outages. Finally, Mixture PF with PCI achieved an average improvement of approximately 90% over KF with GM and without updates for the gyroscope drift in the case with 60-second outages, and an improvement of 93% in the case with 180-second outages.

The results showed that the proposed navigation solution using Mixture PF with PCI and the one with higher order AR outperformed all the other solutions in the comparison and showed similar, consistent and good performance for MEMS-based inertial sensors/GPS integration during GPS outages even for prolonged durations. Moreover, with the low number of samples used and the presented running times, the Mixture PF algorithm can work in real-time.

The use of Mixture PF with higher order AR is recommended because it is simpler, its running time is less, and it can provide similar performance to PCI. PCI is reported in this work as it was the general nonlinear system identification technique that led to the finding that the drift model had a maximum lag of 120 and degree of polynomial equal to 1, which subsequently led to trying a linear AR model with order 120.

Example 4

Automatic Detection of GNSS Degraded Performance

This example presents the technique used for automatic assessment of GNSS information and detection of degraded performance. One of the criteria used in the checking of GNSS degraded performance is the number of satellites. If the number of satellites visible to receiver is four or more, the GPS reading passes the first check. The second check is using the dilution of precision (DOP) of the calculated position solution by the GNSS receiver. Both the horizontal DOP (HDOP) and vertical DOP (VDOP) are used. Despite these two checks, some GNSS readings with degraded performance (especially because of some reflected signals reaching the receiver and not the original signal because of loss of direct line-of-sight between some satellites and the receiver) may still find their way to update the filter and can jeopardize its performance. Thus further checks have to be used.

Since this is an integrated solution, and since Mixture PF with the solution in the former examples and a robust model for gyroscope drift provide very good position and attitude calculations, even for long periods of unaided operation, these facts are exploited to assess GNSS position and velocity observations. Furthermore motion constraints on land vehicles are exploited as well, in connection with the speed and sensors readings.

1. The first check is based on assessing the new GNSS horizontal position reading and subtracting from it the current estimate of position. If this difference is much higher than what it should be when compared to the vehicle speed obtained from OBD II which is an accurate quantity, then this indicates the presence of degradation and the new GNSS update is discarded.

2. The second check for GNSS position is concerned with the altitude component. The 3D solutions in either Example 1 or Example 2 provide very good altitude estimates even during very long durations of unaided performance, this fact is used together with the non-holonomic constraint of no perpendicular vertical motion for land vehicles to assess the GNSS altitude of the new reading. Since altitude is a weak component in GNSS, this check helps in detecting GNSS degraded performance and discarding the update. The barometer calculated altitude can also be used to assess the GNSS altitude.

3. The third check is for azimuth update from GNSS velocities. This update is not used unless the vehicle is in motion, which is very well detected through the OBD II speed readings. Furthermore, to have an azimuth update, the HDOP is checked for a lower threshold than the one used for position update. This last check is because the azimuth calculated from GNSS is a sensitive quantity. If the check is not met, azimuth update from GNSS is not performed.

4. The fourth check is again for azimuth update from GNSS. This check exploits the motion constraints on land vehicles. The current azimuth calculated from GNSS is compared to the previous one which is 1 sec before while taking care of the angle circularity. A large difference which can't correspond to land vehicle motion indicate erroneous update from GNSS. Furthermore, the current azimuth obtained from GNSS is as well compared to the current estimate of the vehicle azimuth, this also shows the validity of this azimuth update.

5. The fifth check concerns the update of the gyroscope drift. If the vehicle is in motion detected through OBD II readings, GNSS might be used for this update depending on further checks; if the vehicle is stationary, this fact is also exploited to update the gyroscope drift without GNSS. Since this gyroscope drift update from GNSS is sensitive, the HDOP is checked for a lower threshold than the one used for position update in order to enable this drift update.

A trajectory in downtown Toronto was collected, that suffered from degraded GNSS performance (either multipath, reflections with loss of direct line-of-sight, or complete blockage).

The proposed navigation solution using Mixture PF for 3D "reduced number of inertial sensors with speed readings"/GPS integration and using the higher order AR model (AR120) to model the stochastic drift of the MEMS-based gyroscope are the one used in all the following results reported herein.

Downtown Toronto Trajectory

Figure 30:
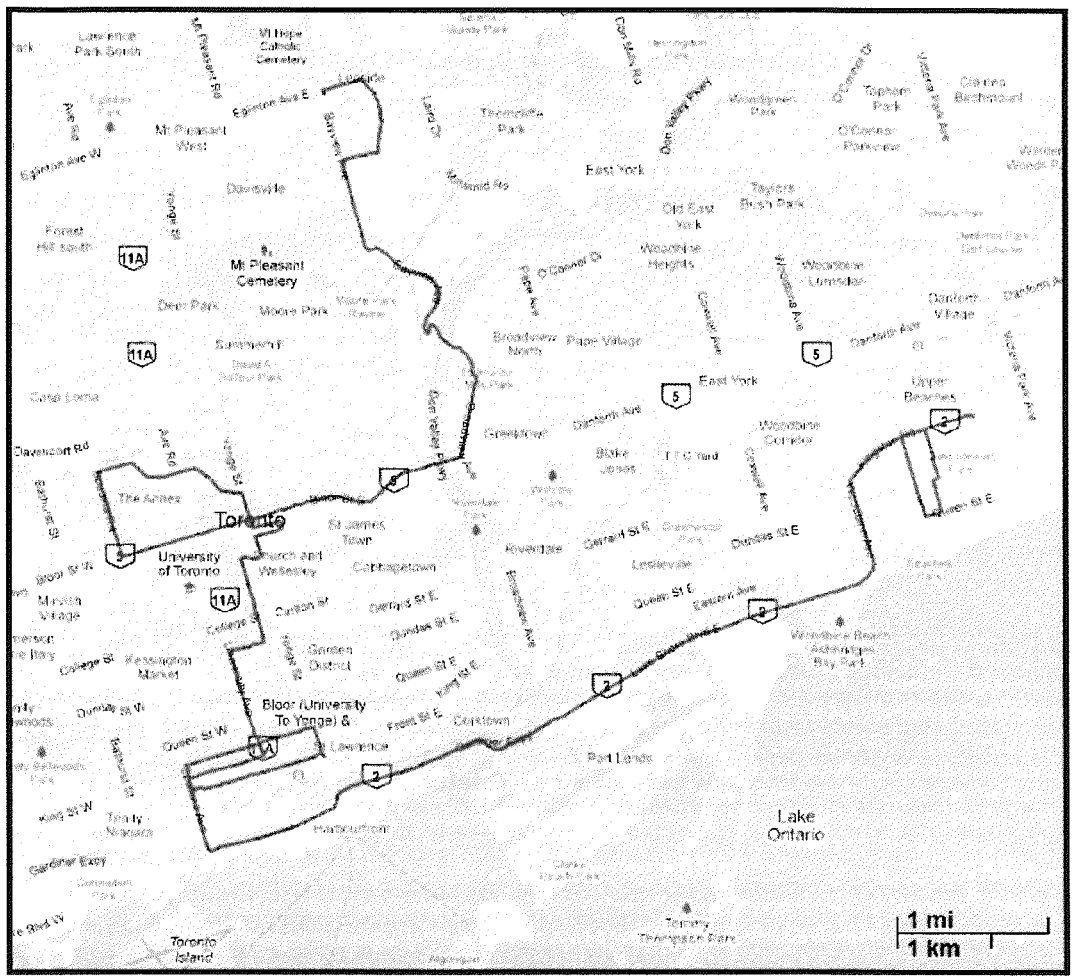
FIG. 30: Road Test Trajectory in Toronto, Coming from North to South into downtown then leaving from the South-East.

The road test trajectory in downtown Toronto, Ontario, Canada can be seen in FIG. 30. This road test was performed for nearly 128 minutes of continuous vehicle navigation and a distance of around 33.5 km was traveled. This trajectory is in a downtown scenario with urban canyons in some parts, and some under-paths, and it has a lot of degraded GPS performance because of either multipath, severe reflections with loss of direct line-of-sight, or complete blockage. The portions with degraded GPS performance encompass straight portions, turns, and frequent stops.

In this trajectory, the inertial sensors used for 3D "reduced number of inertial sensors with speed readings" are from the Crossbow IMU300CC-100 (see Table 15), the GPS receiver used is the NovAtel OEMV-1G, which is a single frequency receiver. As mentioned earlier the speed readings are collected from the vehicle odometer through OBD-II. The reference solution used for assessment of the results is a commercially available solution made by NovAtel, it is a SPAN unit integrating the high cost high end tactical grade Honeywell HG1700 IMU (see Table 17) and the NovAtel OEM4 dual frequency receiver.

Figure 31:
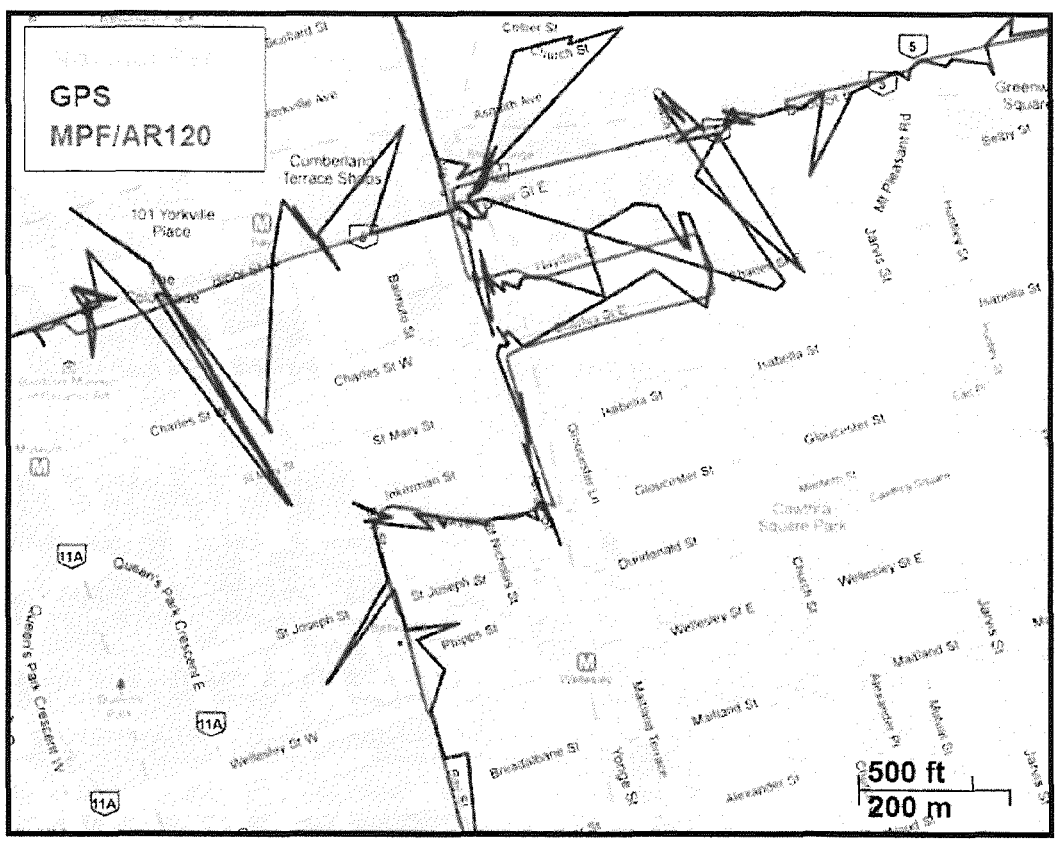
FIG. 31: Zoom-in on first portion of degraded GPS performance in Toronto trajectory of FIG. 30.
Figure 32:
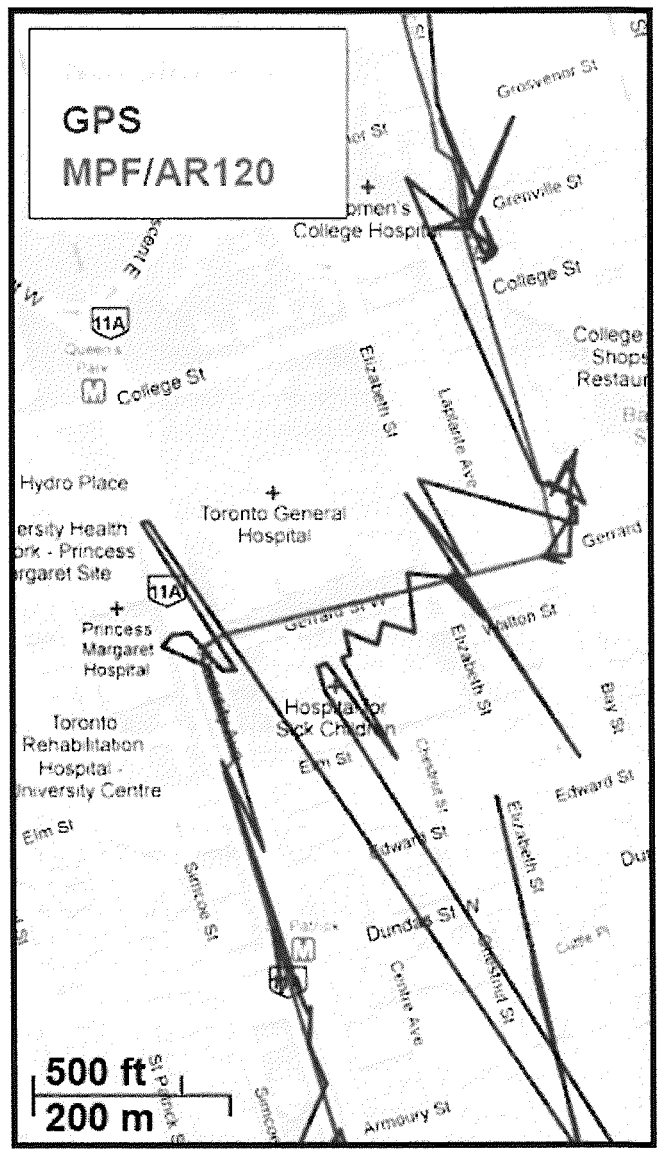
FIG. 32: Zoom-in on second portion of degraded GPS performance in Toronto trajectory of FIG. 30.
Figure 33:
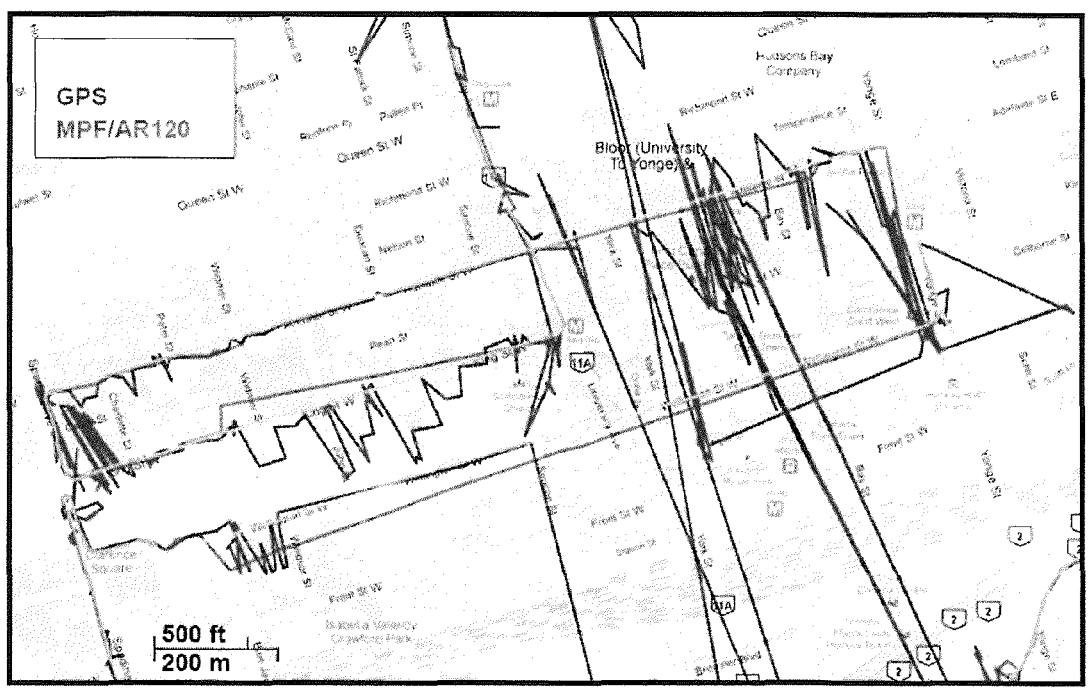
FIG. 33: Zoom-in on third and hardest portion of degraded GPS performance in Toronto trajectory of FIG. 30.
Figure 34:
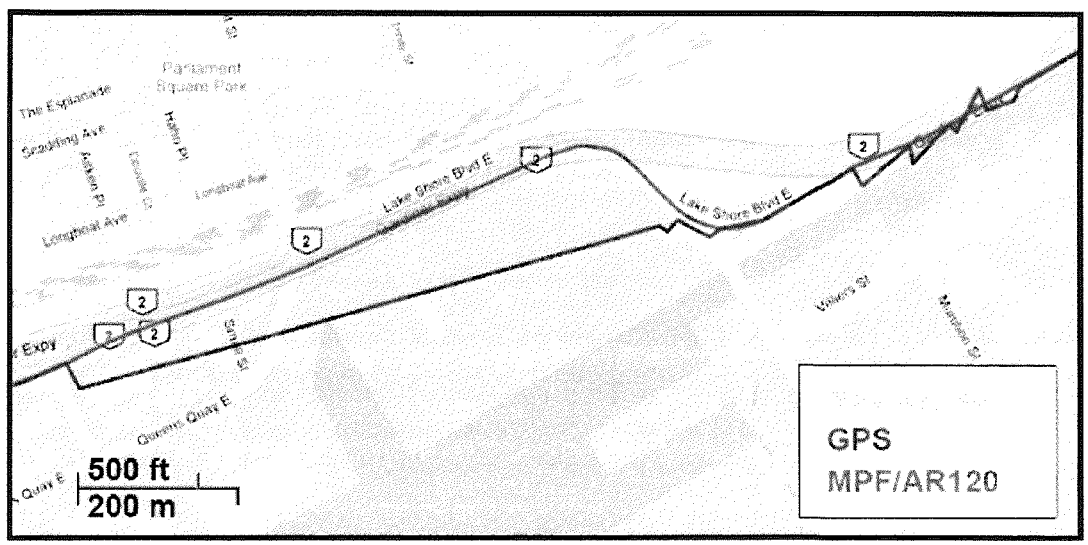
FIG. 34: Zoom-in on a section with complete blockage under the Gardiner Expressway in Toronto trajectory of FIG. 30.

FIGS. 31, 32 and 33 show the reference, GPS, and the proposed solution during sections of this trajectory with urban canyons. The NovAtel OEMV-1G GPS receiver suffered from severe reflections with loss of direct line-of-sight and from some complete blockage during the urban canyons as demonstrated in the figures. FIG. 34 shows the reference, GPS, and the proposed solution during an under-path under the Gardiner Expressway, where the GPS signal suffered from a complete blockage.

Figure 35:
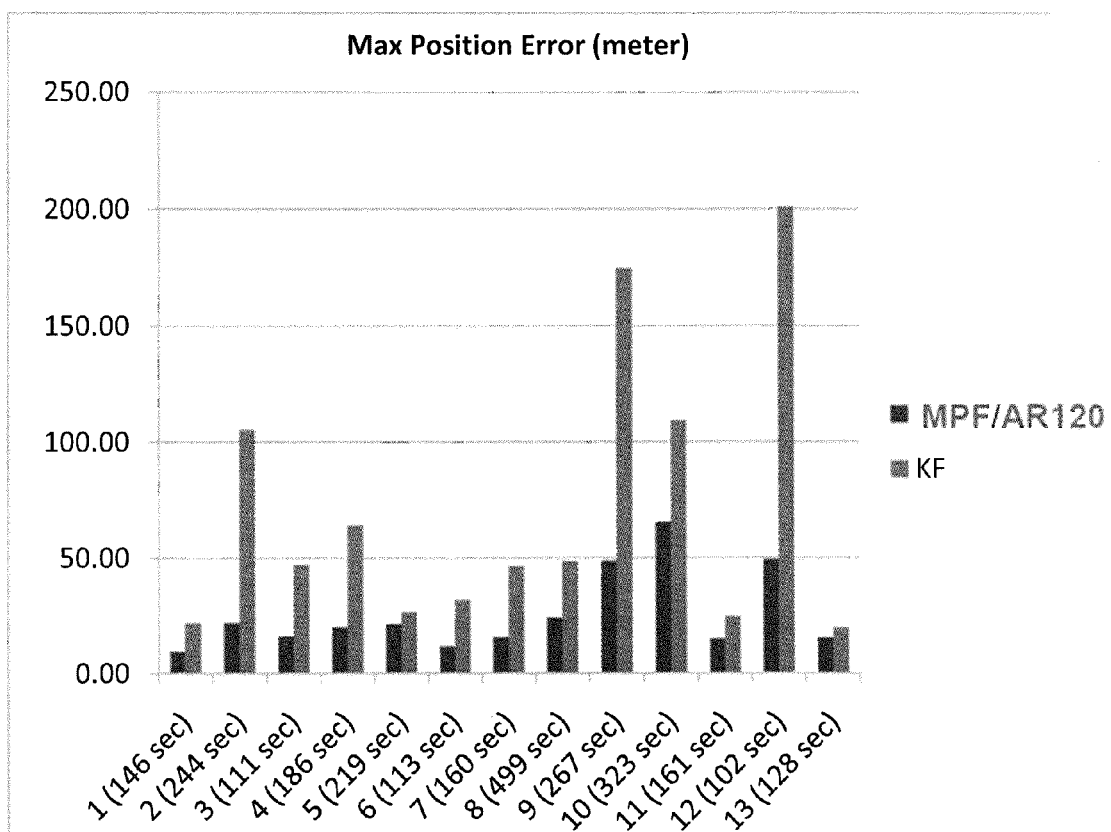
FIG. 35: Comparison between Mixture PF/AR120 and KF/GM both with gyroscope drift update and automatic detection of GPS degraded performance of FIG. 30.

When the GPS quality is extremely low, its readings are discarded completely, and the Mixture PF with 3D "reduced number of inertial sensors with speed readings" operates in prediction mode relying on the higher order AR model correction for the stochastic gyroscope drift. In the following discussion, when GPS readings are discarded, this will be called a GPS outage. The trajectory was full of a very large number of such outages. FIG. 35 show the maximum error in position during only the outages whose duration exceeds 100 seconds. In FIG. 35 a comparison of maximum position error is presented between Mixture PF and KF. The Mixture PF is for 3D "reduced number of inertial sensors with speed readings"/GPS integration with the AR model of order 120 for the gyroscope drift, the update for gyroscope drift explained earlier, and the automatic detection of GPS degraded performance The KF is for 3D "reduced number of inertial sensors with speed readings"/GPS integration with $1^{st}$ order Gauss Markov model for the gyroscope drift, the update for gyroscope drift explained earlier, and the automatic detection of GPS degraded performance. So both share everything except that the first is Mixture PF with the nonlinear models described in Examples 1 and 2 and with AR of order 120 (i.e. options that can't be available for KF), the second is KF with linearized models and $1^{st}$ order Gauss Markov model. Moreover, it should be noted that since the KF uses linearized models, it does not benefit from the corrected azimuth calculation that accounts for the case where the gyroscope is in a tilted plane not in the pure horizontal East-North plane. This is also one of the drawbacks of KF for 3D "reduced number of inertial sensors with speed readings" when compared to the Mixture PF with 3D "reduced number of inertial sensors with speed readings".

From the results in FIG. 35, it can be noted that the overall performance of Mixture PF outperforms that of KF. It should be noted that this trajectory has some portions at low speed and with frequent stops. It can be noted that the difference in performance between the Mixture PF with 3D RISS and KF with 3D "reduced number of inertial sensors with speed readings" is not as big in some GPS outages as compared to other outages. The outages with lower speeds and frequent stops, have less difference between the two compared filters. The reason for this is the good accuracy of the vehicle speed obtained from the OBD II interface; furthermore this speed reading is exactly zero during the frequent stops, which bounds the position error growth. Furthermore, in all the reduced sensors solutions the only remaining main source of error is the vertically aligned gyroscope used for estimating the azimuth angle. Since the non-stationary position errors are related to the azimuth errors modulated by the velocity, lower speeds causes less positional errors due to azimuth errors. Whenever the traveled distance is higher or the vehicle speed is higher, the enhancement provided by Mixture PF will be more apparent.

This example presented results in very challenging GPS environments. These scenarios are encountered in real-life trajectories where accurate navigation is needed to reliably assist and guide the driver to his/her destination. The navigation solution used in these results is Mixture PF for 3D "reduced number of inertial sensors with speed readings"/GPS loosely-coupled integration, with AR of order 120 for modeling the stochastic gyroscope drift as well as the formula derived earlier for providing measurement update for this drift from GPS when adequate, and the technique for automatic detection of GPS degraded performance as discussed above.

The performance of the proposed technique was also tested for different low cost GPS receivers and different low cost MEMS-based inertial sensors (results not shown). The positioning performance was demonstrated in different downtown environments. Furthermore, the repeatability of the technique was also tested by several repeated runs (results not shown).

The proposed navigation solution for land vehicles is continuous, accurate and robust for low cost sensors. It showed consistent levels of accuracy. Keeping in mind that modern land vehicles are already equipped with inertial sensors, GPS receivers, and of course an odometer, this solution can exploit them and provide reliable real-time navigation at nearly no extra cost.

Example 5

Mixture Particle Filter for Tightly-Coupled Inertial Sensors/GNSS Integration The present example attempts to describe the present navigation module programmed to utilize a Mixture PF with the system model of either Example 1 or Example 2, and the higher order AR modeling for the stochastic drift of inertial sensors, as well as the proposed update for this drift from GNSS when adequately available, and from tightly-coupled integration of the speed and the inertial sensors with raw GNSS measurements.

Background

By way of background, in loosely-coupled integration, at least four satellites are needed to provide acceptable GNSS position and velocity, which are used as measurement updates in the integration filter. One advantage of tightly-coupled integration is that it can provide GNSS measurement updates even when the number of visible satellites is three or fewer, thereby improving the operation of the navigation system in degraded GPS environments by providing continuous aiding to the inertial sensors even during limited GNSS satellite availability (like in urban areas and downtown cores).

Tightly-coupled integration takes advantage of the fact that, given the present satellite-rich GPS constellation as well as other GNSS constellations, it is unlikely that all the satellites will be lost in any canyon. Therefore, the tightly coupled scheme of integration uses information from the few available satellites. This is a major advantage over loosely coupled integration with INS, which fails to acquire any aid from GNSS and considers the situation of fewer than four satellites as an outage. Another benefit of working in the tightly coupled scheme is that satellites with bad measurements can be detected and rejected.

In tightly-coupled integration, GNSS raw data is used and is integrated with the inertial sensors. The GNSS raw data used in the present navigation module in this example are pseudoranges and Doppler shifts. From the measured Doppler for each visible satellite, the corresponding pseudorange rate can be calculated. In the update phase of the integration filter the pseudoranges and pseudorange rates can be used as the measurement updates to update the position and velocity states of the vehicle. The measurement model that relates these measurements to the position and velocity states is a nonlinear model.

As is known, the KF integration solutions linearize this model. PF with its ability to deal with nonlinear models better capable of giving improved performance for tightly-coupled integration because it can use the exact nonlinear measurement model, this is in addition to the fact that the system model is always (in tightly or loosely coupled integration) a nonlinear model.

Nonlinear Models for Tightly-Coupled Integration

As mentioned earlier, there are three main observables related to GPS: pseudoranges, Doppler shift (from which pseudorange rates are calculated), and the carrier phase. The present example utilizes only to the first two observables.

Pseudoranges are the raw ranges between satellites and receiver. A pseudorange to a certain satellite is obtained by measuring the time it takes for the GPS signal to propagate from this satellite to the receiver and multiplying it by the speed of light. The pseudorange measurement for the $m^{th}$ satellite is:

$$\rho^m = c(t_r - t_t)$$

where $\rho^m$ is the pseudorange observation from the $m^{th}$ satellite to receiver (in meters), $t_t$ is the transmit time, $t_r$ is the receive time, and c is the speed of light (in meters/sec).

For the GPS errors, the satellite and receiver clocks are not synchronized and each of them has an offset from the GPS system time. Despite the several errors in the pseudorange measurements, the most effective is the offset of the inexpensive clock used inside the receiver from the GPS system time.

The pseudorange measurement for the $m^{th}$ satellite, showing the different errors contaminating it, is given as follows:

$$\rho^m = r^m + c\delta t_r - c\delta t_s + cI^m + cT^m + \epsilon_\rho^m$$

where $r^m$ is the true range between the receiver antenna at time $t_r$ and the satellite antenna at time $t_t$ (in meters), $\delta t_r$ is the receiver clock offset (in seconds), $\delta t_s$ is the satellite clock offset (in seconds), $I^m$ is the ionospheric delay (in seconds), $T^m$ is the tropospheric delay (in seconds), $\epsilon_\rho^m$ is the error in range due to a combination of receiver noise and other errors such as multipath effects and orbit prediction errors (in meters).

The incoming frequency at the GPS receiver is not exactly the L1 or L2 frequency but is shifted from the original value sent by the satellite. This is called the Doppler shift and it is due to relative motion between the satellite and the receiver. The Doppler shift of the $m^{th}$ satellite is the projection of relative velocities (of satellite and receiver) onto the line of sight vector multiplied by the transmitted frequency and divided by the speed of light, and is given by:

$$D^m = \frac{\{(v^m - v) \cdot 1^m\}L_1}{c}$$

where $v^m = [v_x^m, v_y^m, v_z^m]$ is the $m^{th}$ satellite velocity in the ECEF frame, $v = [v_x, v_y, v_z]$ is the true receiver velocity in the ECEF frame, $L_1$ is the satellite transmitted frequency, and $$1^m \frac{[(x-x^m), (y-y^m), (z-z^m)]^T}{\sqrt{(x-x^m)^2 + (y-y^m)^2 + (z-z^m)^2}} = [1_x^m, 1_y^m, 1_z^m]^T$$

is the true line of sight vector from the $m^{th}$ satellite to the receiver.

Given the measured Doppler shift, the pseudorange rate $\dot{\rho}^m$ is calculated as follows:

$$\dot{\rho}^m = -\frac{D^m c}{L_1}$$

Nonlinear Measurement Model

After compensating for the satellite clock bias, Ionospheric and Tropospheric errors, the corrected pseudorange can be written as:

$$\rho_c^m = r^m + c\delta t_r + \tilde{\epsilon}_\rho^m$$

where, $\tilde{\epsilon}_\rho^m$ represents the total effect of residual errors. The true geometric range from $m^{th}$ satellite to receiver is the Euclidean distance and is given as follows:

$$r^m = \sqrt{(x-x^m)^2 + (y-y^m)^2 + (z-z^m)^2} = \|x - x^m\|$$

where $x=[x,y,z]^T$ is the receiver position in ECEF frame, $x^m=[x^m,y^m,z^m]^T$ is the position of the $m^{th}$ satellite at the corrected transmission time but seen in the ECEF frame at the corrected reception time of the signal. Satellite positions are initially calculated at the transmission time in the ECEF frame at transmission time as well not at the frame at the time of receiving the signal. This time difference may be approximately in the range of 70-90 milliseconds, during which the Earth and the ECEF rotate, and this can cause a range error of about 10-20 meters. To correct for this fact, the satellite position at transmission time has to be represented at the ECEF frame at the reception time not the transmission time. One can either do the correction before the measurement model or in the measurement model itself. In the present example, the satellite position correction is done before the integration filter and then passed to the filter, thus the measurement model uses the corrected position reported in the ECEF at reception time.

The details of using Ephemeris data to calculate the satellites' positions and velocities are known, and can subsequently be followed by the correction mentioned above.

In vector form, the equation may be expressed as follows:

$$\rho_c^m = \|x-x^m\| + b_r + \tilde{\epsilon}_\rho^m$$

where $b_r = c\delta t_r$ is the error in range (in meters) due to receiver clock bias. This equation is nonlinear. The traditional techniques relying on KF used to linearize these equations about the pseudorange estimate obtained from the inertial sensors mechanization. PF is suggested in this example to accommodate nonlinear models, thus there is no need for linearizing this equation. The nonlinear pseudorange measurement model for M satellites visible to the receiver is:

$$\begin{bmatrix} \rho_c^1 \\ \vdots \\ \rho_c^M \end{bmatrix} = \begin{bmatrix} \|x-x^1\| + b_r + \tilde{\epsilon}_\rho^1 \\ \vdots \\ \|x-x^M\| + b_r + \tilde{\epsilon}_\rho^M \end{bmatrix} = \begin{bmatrix} \sqrt{(x-x^1)^2 + (y-y^1)^2 + (z-z^1)^2} + b_r + \tilde{\epsilon}_\rho^1 \\ \vdots \\ \sqrt{(x-x^M)^2 + (y-y^M)^2 + (z-z^M)^2} + b_r + \tilde{\epsilon}_\rho^M \end{bmatrix}$$

But the position state x here is in ECEF rectangular coordinates, it should be in Geodetic coordinates which is part of the state vector used in the Mixture PF. The relationship between the Geodetic and Cartesian coordinates is given by:

$$\begin{bmatrix} x \\ y \\ z \end{bmatrix} = \begin{bmatrix} (R_N+h)\cos\varphi\cos\lambda \\ (R_N+h)\cos\varphi\sin\lambda \\ \{R_N(1-e^2)+h\}\sin\varphi \end{bmatrix}$$

Where $R_N$ is the normal radius of curvature of the Earth's ellipsoid and e is the eccentricity of the Meridian ellipse. Thus the pseudorange measurement model is:

$$\begin{bmatrix} \rho_c^1 \\ \vdots \\ \rho_c^M \end{bmatrix} = \begin{bmatrix} \sqrt{((R_N+h)\cos\varphi\cos\lambda - x^1)^2 + ((R_N+h)\cos\varphi\sin\lambda - y^1)^2 + (\{R_N(1-e^2)+h\}\sin\varphi - z^1)^2} + b_r + \tilde{\epsilon}_\rho^1 \\ \vdots \\ \sqrt{((R_N+h)\cos\varphi\cos\lambda - x^M)^2 + ((R_N+h)\cos\varphi\sin\lambda - y^M)^2 + (\{R_N(1-e^2)+h\}\sin\varphi - z^M)^2} + b_r + \tilde{\epsilon}_\rho^M \end{bmatrix}$$

The true pseudorange rate between the $m^{th}$ satellite and receiver is expressed as $$\dot{r}^m = 1_x^m(v_x - v_x^m) + 1_y^m(v_y - v_y^m) + 1_z^m(v_z - v_z^m)$$

The pseudorange rate for the $m^{th}$ satellite can be modeled as follows:

$$\dot{\rho}^M = 1_x^m(v_x - v_x^m) + 1_y^m(v_y - v_y^m) + 1_z^m(v_z - v_z^m) + c\delta \dot{t}_r + \varepsilon_{\dot{\rho}}^m$$
$$= 1_x^m(v_x - v_x^m) + 1_y^m(v_y - v_y^m) + 1_z^m(v_z - v_z^m) + d_r + \varepsilon_{\dot{\rho}}^m$$

where $\delta \dot{t}_r$ is the receiver clock drift (unit-less), $d_r$ is the receiver clock drift (in meters/sec), $\epsilon_{\dot{\rho}}^m$ is the error in observation (in meters/sec).

This last equation is linear in velocities, but it is nonlinear in position. This can be seen by examining the expression for the line of sight unit vector above. Again, there is no need for linearization because of the nonlinear capabilities of PF. The nonlinear measurement model for pseudorange rates of M satellites, again in ECEF rectangular coordinates is:

$$\begin{bmatrix} \dot{\rho}^1 \\ \vdots \\ \dot{\rho}^M \end{bmatrix} = \begin{bmatrix} 1_x^1(v_x - v_x^1) + 1_y^1(v_y - v_y^1) + 1_z^1(v_z - v_z^1) + d_r + \varepsilon_{\dot{\rho}}^1 \\ \vdots \\ 1_x^M(v_x - v_x^M) + 1_y^M(v_y - v_y^M) + 1_z^M(v_z - v_z^M) + d_r + \varepsilon_{\dot{\rho}}^M \end{bmatrix}$$

The velocities here are in ECEF and need to be in local-level frame because this is part of the state vector in Mixture PF. The transformation uses the rotation matrix from the local-level frame to ECEF ($R_l^e$) and is as follows:

$$\begin{bmatrix} v_x \\ v_y \\ v_z \end{bmatrix} = R_l^e \begin{bmatrix} v_e \\ v_n \\ v_u \end{bmatrix} = \begin{bmatrix} -\sin\lambda & -\sin\varphi\cos\lambda & \cos\varphi\cos\lambda \\ \cos\lambda & -\sin\varphi\sin\lambda & \cos\varphi\sin\lambda \\ 0 & \cos\varphi & \sin\varphi \end{bmatrix} \begin{bmatrix} v_e \\ v_n \\ v_u \end{bmatrix}$$

Furthermore, the line of sight unit vector from $m^{th}$ satellite to receiver will be expressed as follows:

$$1^m = \frac{[((R_N+h)\cos\varphi\cos\lambda - x^m), ((R_N+h)\cos\varphi\sin\lambda - y^m), (\{R_N(1-e^2)+h\}\sin\varphi - z^m)]^T}{\sqrt{((R_N+h)\cos\varphi\cos\lambda - x^m)^2 + ((R_N+h)\cos\varphi\sin\lambda - y^m)^2 + (\{R_N(1-e^2)+h\}\sin\varphi - z^m)^2}}$$

$$= [1_x^m, 1_y^m, 1_z^m]^T$$

The foregoing combined equations constitute the overall nonlinear measurement model for M visible satellites used in the present example for tightly-coupled integration using Mixture PF.

Augmenting the System Model

The system model can be augmented with two states, namely: the bias of the GPS receiver clock $b_r$ and its drift $d_r$. These two are included as states and the state vector can be augmented with these two quantities. Both of these are modeled as follows:

$$\begin{bmatrix} \dot{b}_r \\ \dot{d}_r \end{bmatrix} = \begin{bmatrix} d_r + w_b \\ w_d \end{bmatrix}$$

where $w_b$ and $w_d$ are the noise terms In discrete form it can be written as:

$$\begin{bmatrix} b_{r,k} \\ d_{r,k} \end{bmatrix} = \begin{bmatrix} b_{r,k-1} + (d_{r,k-1} + w_{b,k-1})\Delta t \\ d_{r,k-1} + w_{d,k-1}\Delta t \end{bmatrix}$$

where $\Delta t$ is the sampling time. This model is used as part of either the system model described in Example 1 or the system model described in Example 2.

Mixture PF for Tightly-Coupled 3D "Reduced Number of Inertial Sensors with Speed Readings"/GPS Integration The present example attempts to describe the present navigation module programmed to utilize a Mixture PF for 3D "reduced number of inertial sensors with speed readings"/ GNSS integration with a higher order AR model for the stochastic drift of the vertical gyroscope, as well as the proposed update for this drift from GNSS when adequately available, and from tightly-coupled integration of 3D "reduced number of inertial sensors with speed readings" with raw GNSS measurements.

As discussed, the measurement model in the case of tightly-coupled integration is a nonlinear model that relates the GPS raw measurements (pseudorange measurements and pseudorange rates) at a time epoch k, $z_k$, to the states at time k, $x_k$, and the measurement noise $\epsilon_k$. The nonlinear measurement model for tightly-coupled integration can be in the form:

$$z_k = h(x_k, \epsilon_k)$$

where $$z_k = [\rho_k^1 \ldots \rho_k^M \dot{\rho}_k^1 \ldots \dot{\rho}_k^M]^T$$

$$\epsilon_k = [\tilde{\epsilon}_{\rho,k}^1 \ldots \tilde{\epsilon}_{\rho,k}^M \tilde{\epsilon}_{\dot{\rho},k}^1 \ldots \tilde{\epsilon}_{\dot{\rho},k}^M]^T$$

For 3D "reduced number of inertial sensors with speed readings", together with modeling the stochastic drift of the vertical gyroscope using a higher order AR model, and with the addition of the two states for GPS receiver clock bias and drift, the state vector is:

$$x_k = [\phi_k, \lambda_k, h_k, v_k^f, p_k, r_k, A_k, \delta\omega_k^z, b_{r,k}, d_{r,k}]^T$$

where $\phi_k$ is the latitude, $\lambda_k$ is the longitude, $h_k$ is the altitude, $v_k^f$ is the forward velocity, $p_k$ is the pitch angle, $r_k$ is the roll angle, $A_k$ is the azimuth angle, $\delta\omega_k^z$ is the stochastic drift of the gyroscope, $b_{r,k}$ is the bias of the GPS receiver clock, and $d_{r,k}$ is its drift.

Thus, the system model can be formulated, in the case of using the two horizontal accelerometers, as:

$$x_k = \begin{bmatrix} \varphi_k \\ \lambda_k \\ h_k \\ v_k^f \\ p_k \\ r_k \\ A_k \\ \delta\omega_{z,k} \\ b_{r,k} \\ d_{r,k} \end{bmatrix}$$

$$= f(x_{k-1}, u_{k-1}, w_{k-1})$$

$$= \begin{bmatrix} \varphi_{k-1} + \frac{v_{k-1}^f \cos A_{k-1} \cos p_{k-1}}{R_M + h_{k-1}}\Delta t \\ \lambda_{k-1} + \frac{v_{k-1}^f \sin A_{k-1} \cos p_{k-1}}{(R_N + h_{k-1})\cos\varphi_{k-1}}\Delta t \\ h_{k-1} + v_{k-1}^f \sin p_{k-1}\Delta t \\ v_{k-1}^{od} - \delta v_{k-1}^{od} \\ \sin^{-1}\left(\frac{(f_{k-1}^y - \delta f_{k-1}^y) - (a_{k-1}^{od} - \delta a_{k-1}^{od})}{g}\right) \\ -\sin^{-1}\left(\frac{(f_{k-1}^x - \delta f_{k-1}^x) + (v_{k-1}^{od} - \delta v_{k-1}^{od})(\omega_{k-1}^z - \delta\omega_{k-1}^z)}{g\cos p_k}\right) \\ \tan^{-1}\left(\frac{U^E}{U^N}\right) + \omega^e \sin\varphi_{k-1}\Delta t + \\ \frac{v_{k-1}^f \sin A_{k-1} \cos p_{k-1} \tan\varphi_{k-1}}{(R_N + h_{k-1})}\Delta t \\ -\sum_{n=1}^{120} \alpha_n \delta\omega_{k-n}^z + \beta_0 \omega_{k-1}^\delta \\ b_{r,k-1} + (d_{r,k-1} + w_{b,k-1})\Delta t \\ d_{r,k-1} + w_{d,k-1}\Delta t \end{bmatrix}$$

or, in the case of using three accelerometers, as:

$$x_k = \begin{bmatrix} \varphi_k \\ \lambda_k \\ h_k \\ v_k^f \\ p_k \\ r_k \\ A_k \\ \delta\omega_k^z \\ b_{r,k} \\ d_{r,k} \end{bmatrix}$$

$$= f(x_{k-1}, u_{k-1}, w_{k-1})$$

$$= \begin{bmatrix} \varphi_{k-1} + \dfrac{v_{k-1}^f \cos A_{k-1} \cos p_{k-1}}{R_M + h_{k-1}} \Delta t \\ \lambda_{k-1} + \dfrac{v_{k-1}^f \sin A_{k-1} \cos p_{k-1}}{(R_N + h_{k-1}) \cos\varphi_{k-1}} \Delta t \\ h_{k-1} + v_{k-1}^f \sin p_{k-1} \Delta t \\ v_{k-1}^{od} - \delta v_{k-1}^{od} \\ \tan^{-1}\left( \dfrac{(f_{k-1}^y - \delta f_{k-1}^y) - (a_{k-1}^{od} - \delta a_{k-1}^{od})}{\sqrt{[(f_{k-1}^x - \delta f_{k-1}^x) + (v_{k-1}^{od} - \delta v_{k-1}^{od}) + (\omega_{k-1}^z - \delta\omega_{k-1}^z)]^2 + [(f_{k-1}^z - \delta f_{k-1}^z)]^2}} \right) \\ -\tan^{-1}\left( \dfrac{(f_{k-1}^x - \delta f_{k-1}^x) + (v_{k-1}^{od} - \delta v_{k-1}^{od})(\omega_{k-1}^z - \delta\omega_{k-1}^z)}{(f_{k-1}^z - \delta f_{k-1}^z)} \right) \\ \tan^{-1}\left( \dfrac{U^E}{U^N} \right) + \omega^e \sin\varphi_{k-1} \Delta t + \dfrac{v_{k-1}^f \sin A_{k-1} \cos p_k \tan\varphi_{k-1}}{(R_N + h_{k-1})} \Delta t \\ -\sum_{n=1}^{120} \alpha_n \delta\omega_{k-n}^z + \beta_0 \omega_{k-1}^\delta \\ b_{r,k-1} + (d_{r,k-1} + w_{b,k-1}) \Delta t \\ d_{r,k-1} + w_{d,k-1} \Delta t \end{bmatrix}$$

where $U^E = \sin A_{k-1} \cos p_{k-1} \cos \gamma_{k-1}^z - (\cos A_{k-1} \cos r_{k-1} + \sin A_{k-1} \sin p_{k-1} \sin r_{k-1}) \sin \gamma_{k-1}^z$ $U^N = \cos A_{k-1} \cos p_{k-1} \cos \gamma_{k-1}^z - (-\sin A_{k-1} \cos r_{k-1} + \cos A_{k-1} \sin p_{k-1} \sin r_{k-1}) \sin \gamma_{k-1}^z$ $\gamma_{k-1}^z = (\omega_{k-1}^z - \delta\omega_{k-1}^z) \Delta t$ And all the other variables are as explained in Example 1.

In order to relate this state to the measurement model mentioned in previous section, the following velocity transformation from body frame to local-level frame is needed:

$$\begin{bmatrix} v_k^e \\ v_k^n \\ v_k^u \end{bmatrix} = R_{b,k}^l \begin{bmatrix} 0 \\ v_k^f \\ 0 \end{bmatrix} = \begin{bmatrix} v_k^f \sin A_k \cos p_k \\ v_k^f \cos A_k \cos p_k \\ v_x^f \sin p_k \end{bmatrix}$$

Hybrid Loosely/Tightly Coupled Scheme

The proposed navigation module can be a hybrid solution and attempts to take advantage of the superior performance for low cost MEMS-based inertial sensors (which relies on azimuth update from the GNSS when adequate and update of the gyroscope drift from GNSS when suitable), as well as the benefits of tightly-coupled integration.

To give more insight about some of the factors that make such a hybrid scheme needed, a brief description follows. As described in earlier Examples, measurements updates for the stochastic gyroscope drift are used. In order to benefit from these updates, which are loosely-coupled updates (since they rely on their calculations on GNSS position and velocity readings), in addition to the benefits of tightly-coupled integration, a hybrid loosely/tightly coupled solution is proposed. This solution is suitable for downtown environments because of the long natural outages or degradation of GNSS. The longer the outage, the benefit of the advanced modeling of the gyroscope drift and its measurement update is influential as demonstrated in Example 3 and Example 4.

When the availability and the quality of GNSS position and velocity readings passes an assessment, loosely-coupled measurement update is performed for position, velocity, azimuth, and gyroscope drift. Each update can be performed according to its own quality assessment of the update. Whenever the testing procedure detects degraded GNSS performance either because the visible satellite number falls below four or because the GPS quality examination failed, the filter can switch to a tightly-coupled update mode. Furthermore, each satellite can be assessed independently of the others to check whether it is adequate to use it for update. This check again may exploit improved performance of the Mixture PF with the ideas from Example 1 or Example 2, together with the higher order AR modeling of the inertial sensors' drift, since these solutions may work unaided for elongated periods with small degradation of performance. Thus the pseudorange estimate for each visible satellite to the receiver position estimated from the prediction phase of the Mixture PF can compared to the measured one. If the measured pseudorange of a certain satellite is too far off, this is an indication of degradation (e.g. the presence of reflections with loss of direct line-of-sight), and this satellite's measurements can be discarded, while other satellites can be used for the update.

Kingston Trajectory

A trajectory in Kingston area is presented in this Example to demonstrate the performance of the proposed navigation solution in environments encompassing several different conditions, i.e. nearly open sky with some highway sections, some rural sections, and an urban section but with open sky. The road test was examined by testing simulated partial outages. The used NovAtel OEM4 GPS receiver estimates and provide the Ionospheric delay, the Tropospheric delay, and the satellite clock correction. These corrections were used to correct the pseudorange measurement before using it in the measurement model. Furthermore, the receiver provided the corrected satellite positions at its transmission time, but seen at the ECEF frame at the receive time, so no further corrections need to be implemented. These corrected satellite positions were used in the measurement model.

In this trajectory, the inertial sensors used are from the Crossbow IMU300CC-100 (see Table 15), the GPS receiver used is the NovAtel OEM4. As mentioned earlier the speed readings are collected from the vehicle odometer through OBD-II. The reference solution used for assessment of the results is a commercially available solution made by NovAtel, it is a SPAN unit integrating the high cost high end tactical grade Honeywell HG1700 IMU (see Table 17) and the NovAtel OEM4 dual frequency receiver.

The aim of the trajectory is to examine the performance of the proposed navigation module utilizing a Mixture PF for tightly-coupled 3D "reduced number of inertial sensors with speed readings"/GPS integration and to compare it to KF for tightly-coupled 3D "reduced number of inertial sensors with speed readings"/GPS integration. This is achieved by introducing simulated partial GPS outages in post-processing during portions of coverage with more than three satellites, by removing some satellites. Each of these outages is used four times with each of the two compared solutions, once with 3 satellites visible, once with 2, then 1, then 0. Having outages with 0 satellites visible is similar to what happens in loosely-coupled integration. The errors in both estimated solutions are calculated with respect to the NovAtel reference solution.

Figure 36:
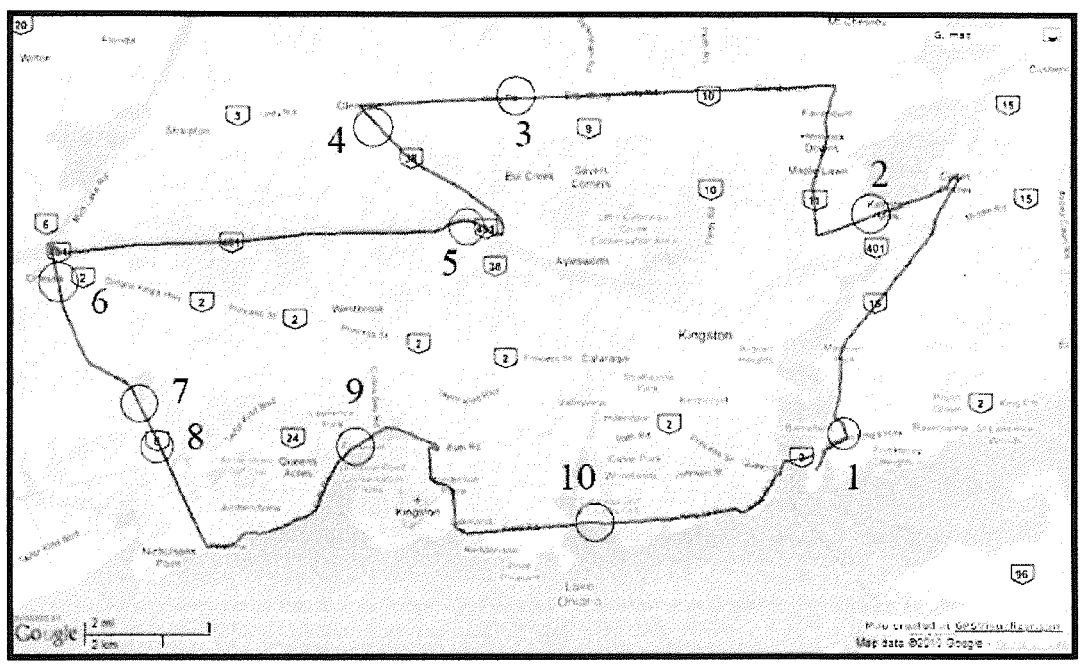
FIG. 36: Road Test Trajectory around Kingston, Ontario, Canada area. Circles indicate the locations of GPS outages.

FIG. 36 demonstrates the road test trajectory around the Kingston area in Ontario, Canada. This trajectory has some highway sections, as well as some rural and urban roadways. In addition, the terrain varies with many hills and winding turns. This road test was performed for nearly 75 minutes of continuous vehicle navigation and a distance of around 77 km. Ten simulated GPS outages of 60 seconds each (shown as circles overlaid on the map in FIG. 36) were introduced such that they encompass all conditions of a typical trip including straight portions, turns, slopes, high and slow speeds.

Figure 37:
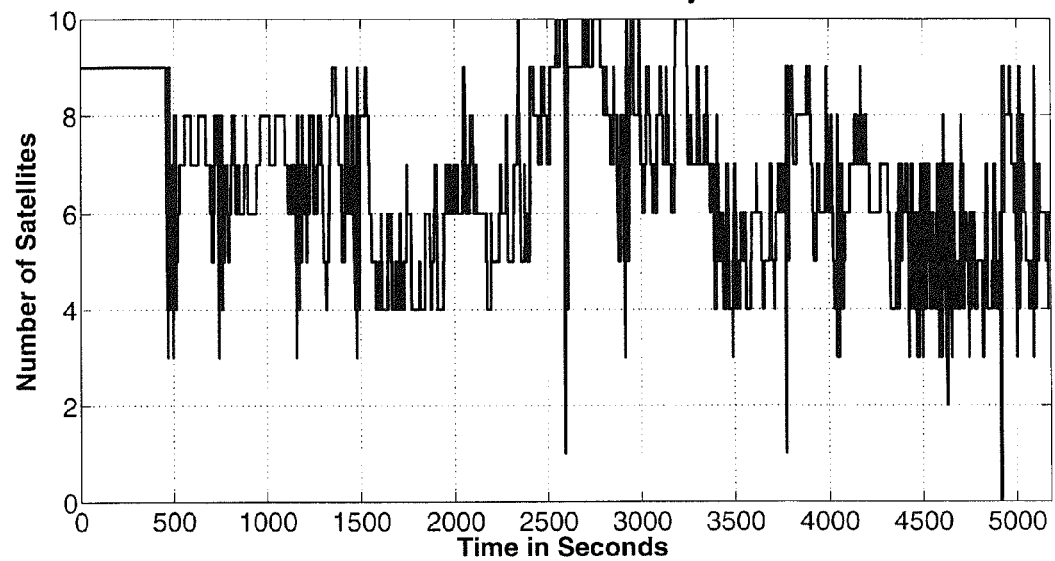
FIG. 37: Number of satellites visible to the NovAtel OEM4 receiver during the Kingston Trajectory.
Figure 38:
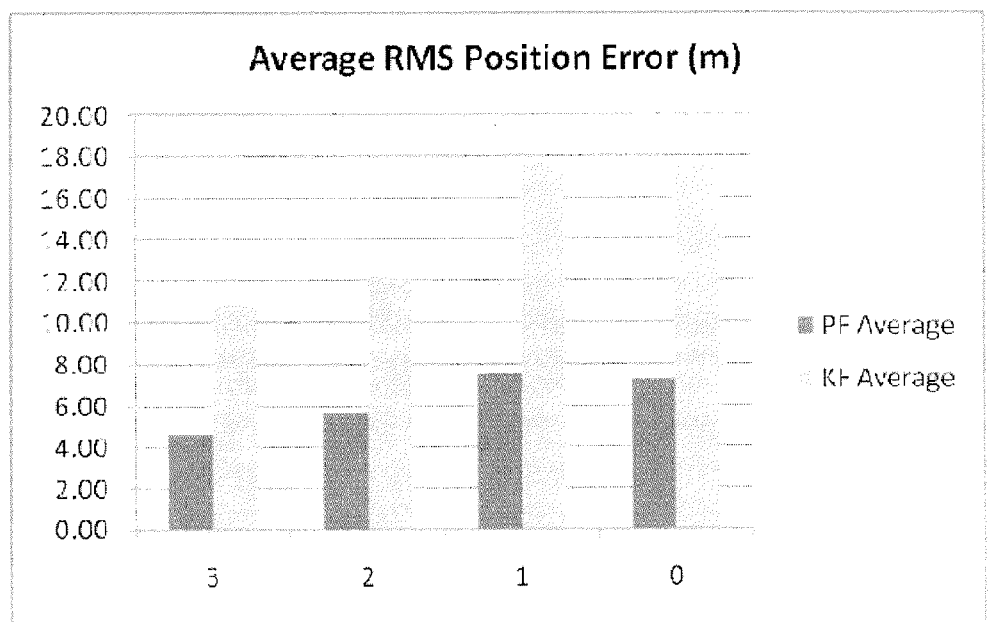
FIG. 38: Average RMS position error over the ten 60-second outages in Kingston trajectory with different numbers of satellites visible (3, 2, 1, and 0).
Figure 39:
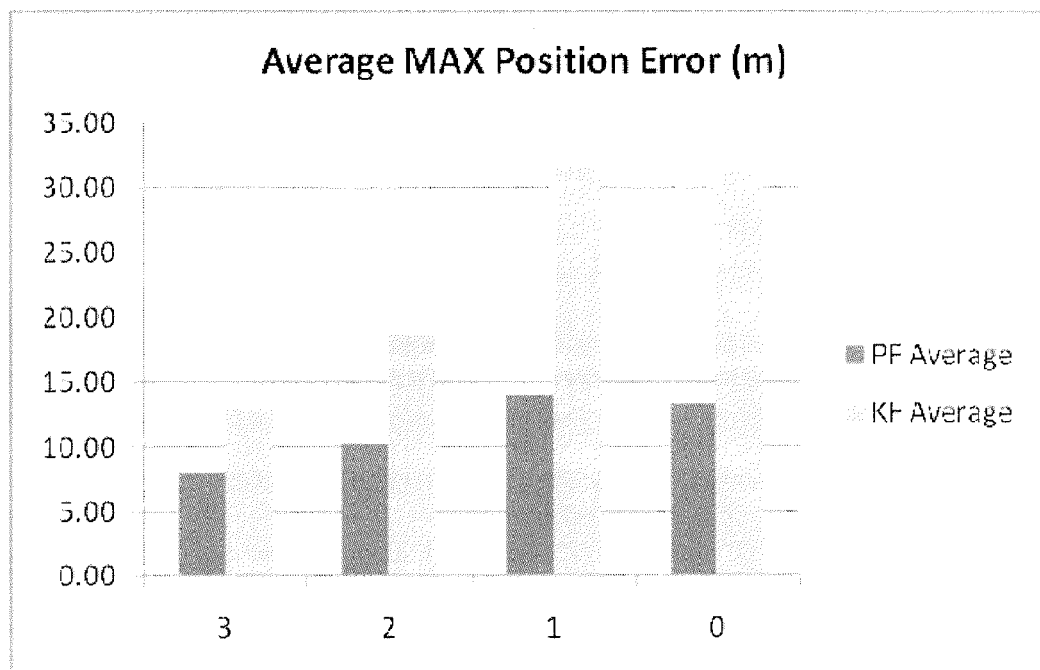
FIG. 39: Average maximum position error over the ten 60-second outages in Kingston trajectory with different numbers of satellites visible (3, 2, 1, and 0).

The number of GPS satellites visible to the receiver all over the trajectory is illustrated in FIG. 37.

Experimental Results

Table 13 demonstrates the maximum position error during the 10 simulated outages with the number of satellites varying from 3 to 1 for the two compared solutions (i.e. Mixture PF with 3D "reduced number of inertial sensors with speed readings" and KF with 3D "reduced number of inertial sensors with speed readings"). FIGS. 19 and 20 illustrate the average RMS and maximum position errors, respectively, over the 10 simulated outages in each case (i.e. for number of satellite visible equals 3, 2, 1, and 0).

The results in Table 13, as well as those in FIGS. 19 and 20 demonstrate the improved performance of Mixture PF over KF in this integration problem. The main reason for this are mainly because of the nonlinear capabilities of PF, which enabled the use of a nonlinear system model including advanced modeling of the gyroscope drift as well as the nonlinear measurement model of the raw GPS measurements without the need for approximations during linearization. The enhancement of benefiting from more satellite availability can also be seen from these results. The general trend is that having three satellites visible is better than two better than one and zero case. However, it should be noted that when there is only one satellite available the results are near (even sometimes worse) than the case with no satellites available. This could be because of two combined reasons: (i) the good performance of the 3D "reduced number of inertial sensors with speed readings" solution even if it works unaided for a period of time; and (ii) consequently the uncertainty added by having one satellite available is sometimes worse than the 3D "reduced number of inertial sensors with speed readings" performance, thus it cannot provide as much aid to enhance the integrated performance but it rather sometimes make it slightly worse.

These results also show that the improvement of performance, due, in part, to the presence of three or two satellites visible to the receiver over the scenarios where one or zero satellites are available in the case of Mixture PF, may not be as much as the improvement in the case of KF. This could be because the 3D "reduced number of inertial sensors with speed readings" solution with the Mixture PF and higher order AR model for the stochastic drift of the gyroscope already has a very good performance even if it works unaided (i.e. the case of loosely-coupled or zero satellites visible).

Figure 40:
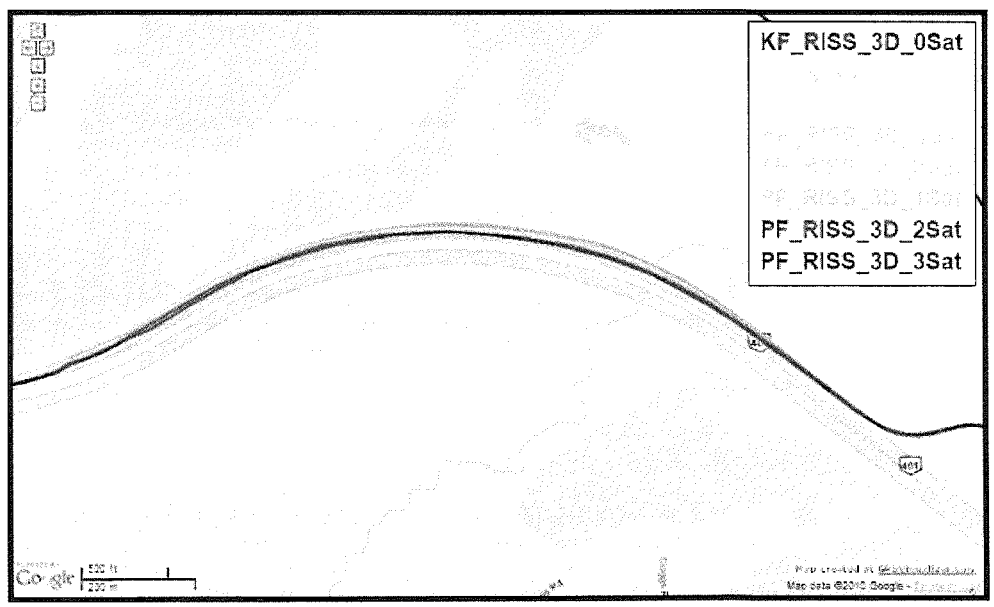
FIG. 40: Performance during GPS outage #5 as shown in FIG. 36.
Figure 41:
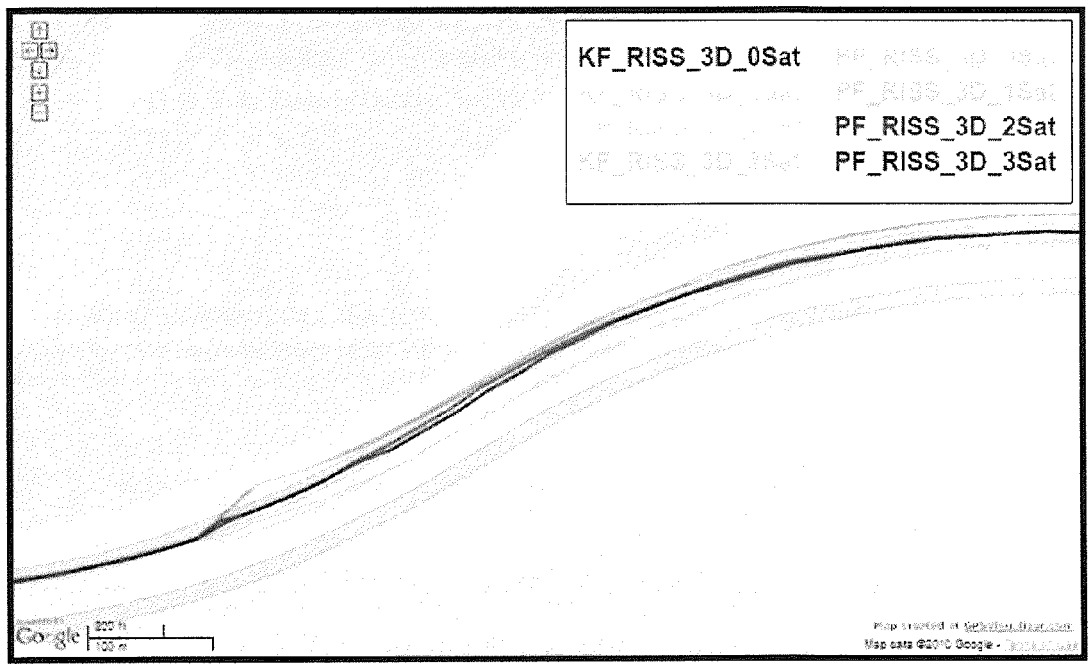
FIG. 41: Performance towards the end of GPS outage #5 as shown in FIG. 36.
Figure 43:
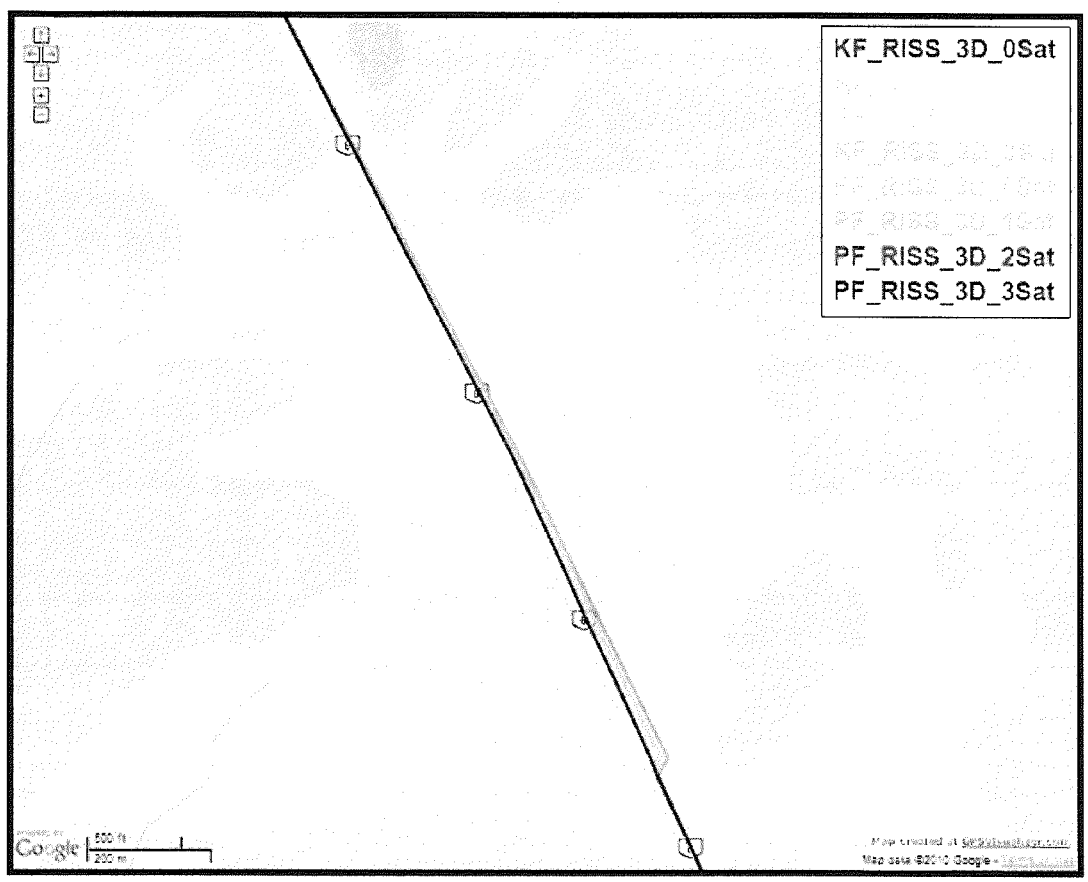
FIG. 43: Performance during GPS outage #7 as shown in FIG. 36.
Figure 44:
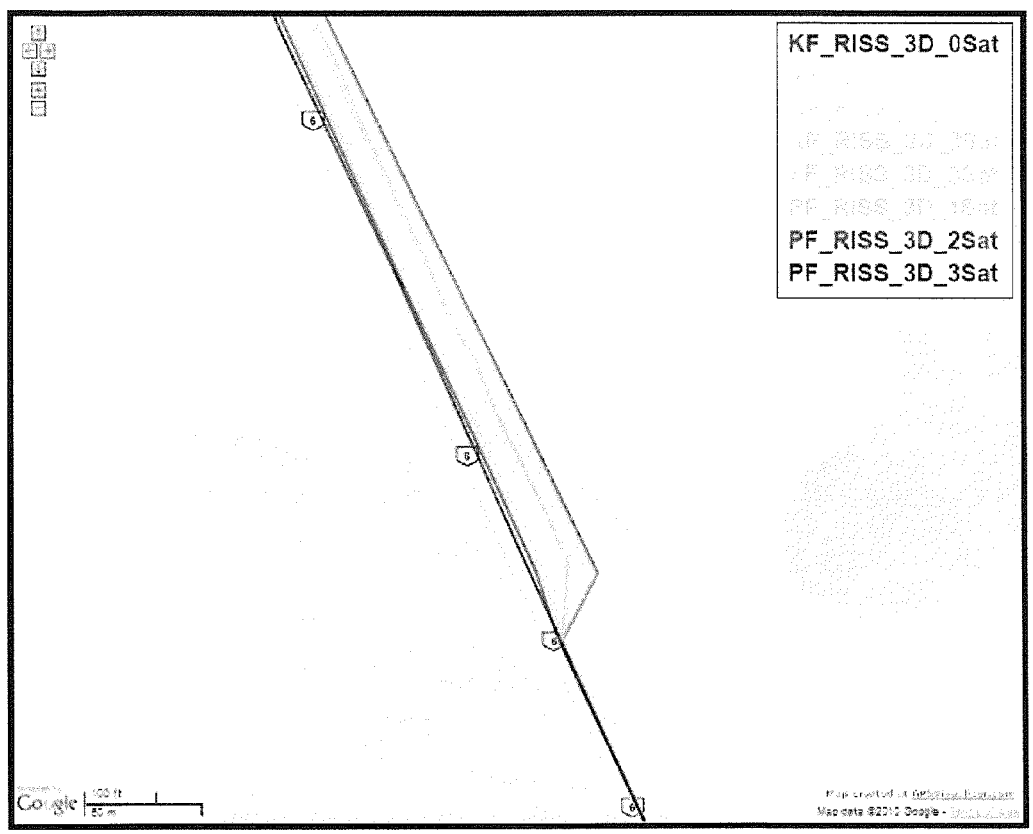
FIG. 44: Performance towards the end of GPS outage #7 as shown in FIG. 43.

To gain more insight about the performance of the two compared filters as well as the different scenarios with different numbers of satellites visible to the receiver, the details of two of these outages are discussed. FIGS. 40 and 43 show maps featuring the different compared solutions in the portions of the trajectory during outages number 5 and 7, respectively. FIGS. 41 and 44 provide a zoom-in on the maps towards the end of these outages, where the position error is largest as compared to the whole outage duration. To assess the vehicle dynamics during these two outages, FIGS. 23 and 26 illustrate the forward speed of the vehicle as well as its azimuth angle both from the NovAtel reference solution for the two outages discussed.

Figure 42:
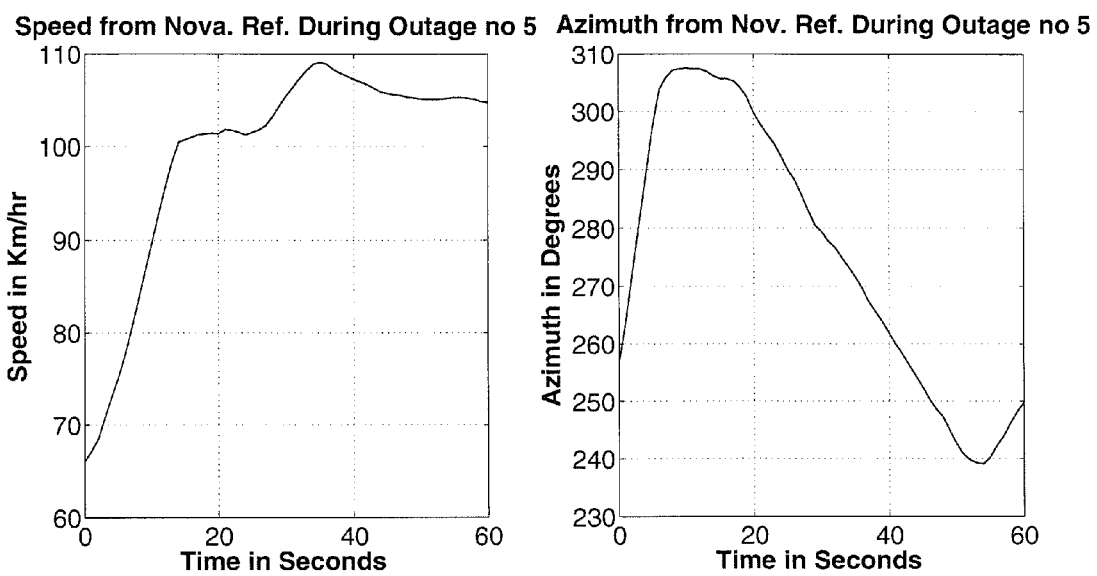
FIG. 42: Forward speed and azimuth from Novatel reference during GPS outage #5 as shown in FIGS. 36 and 40.

Outage 5 is an example of an outage with turns. As can be seen from FIG. 42, it has a 50° turn followed by an elongated curved road with azimuth change of about 70°. During the first turn the vehicle is accelerating from a speed of about 65 km/h to a speed of 100 km/h, during the curved highway section, the vehicle speeds varies between 100 and 110 km/h. Examining the maximum position error of the different solutions during this outage, it can be seen that Mixture PF had a 10 m error when three satellites where visible, 13.1 m for two satellites, 17.8 m for one satellite, and 15.5 m for no satellites seen. KF had 13.75 m of error when three satellites where visible, 19.4 m for two satellites, 56.3 m for one satellite, and 57.5 m for no satellites seen. The KF solution during this outage was worst when one or zero satellites are visible to the receiver because of the high speed and thus longer distance traveled, and as discussed in earlier chapters any azimuth error is modulated by the speed when contributing to the position error or in other words any azimuth error will give more position error if the traversed distance is more.

Figure 45:
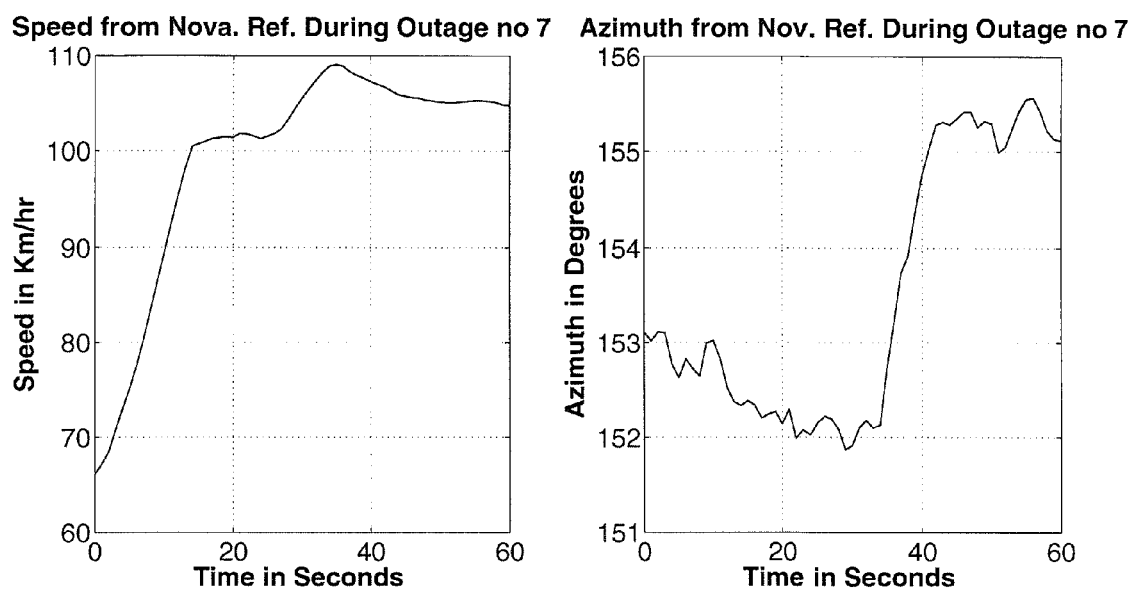
FIG. 45: Forward speed and azimuth from Novatel reference during GPS outage #7 as shown in FIGS. 36 and 43.

Outage 7 is an example of outages in a nearly straight road with azimuth variation of only 3° as seen in FIG. 45, while the forward speed varies between 81 and 88 km/h. Examining the maximum position error of the different solutions during this outage, it can be seen that Mixture PF had a 4.9 m error when three satellites where visible, 10.3 m for two satellites, 18.5 m for one satellite, and 18.45 m for no satellites seen. KF had a 9.4 m error when three satellites were visible, 10.24 m for two satellites, 33.4 m for one satellite, and 33.6 m for no satellites seen. Again these results show the benefit of having more satellites seen in a partial outage over having no satellites at all as is the case of loosely coupled integration.

Summary of the Results

The proposed navigation solution was tested with several real road-test trajectories (one of which was presented above) having open sky and 10 simulated GPS partial outages of 60-second duration (which was repeated four different times with intentionally limiting the satellites availability once to 3 satellites visible, once to 2 satellites, 1 satellite, and 0 satellites). The proposed solution based on Mixture PF was compared to KF-based solution for the same integration problem.

Results of the different trajectories tested demonstrate that the average maximum error in horizontal positioning, the Mixture PF solution achieved 47% improvement over KF when three satellites are visible to the receiver, 57% improvement when two satellites are visible, 67% improvement when one satellite is visible, and 60% improvement when no satellite is visible (which like the loosely-coupled outages). Thus, the proposed navigation module programmed to use Mixture PF provides enhanced performance when compared to its KF counterpart and showed good performance for low cost MEMS-based inertial sensors/GPS integration during GPS outages.

Toronto Trajectory

Figure 46:
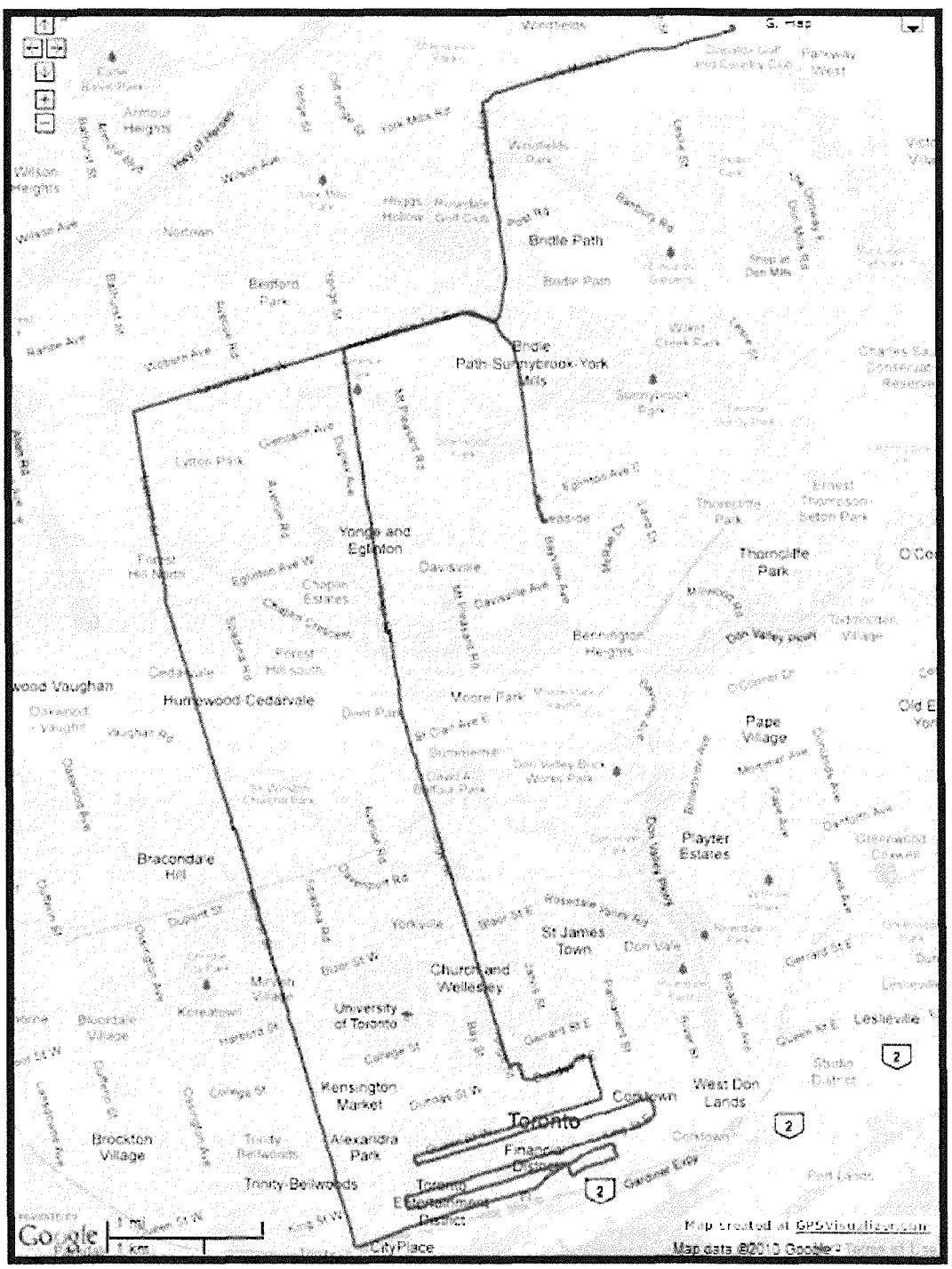
FIG. 46: Road Test Trajectory in Toronto that starts and ends in the North, having the downtown area in the south of the trajectory.
Figure 47:
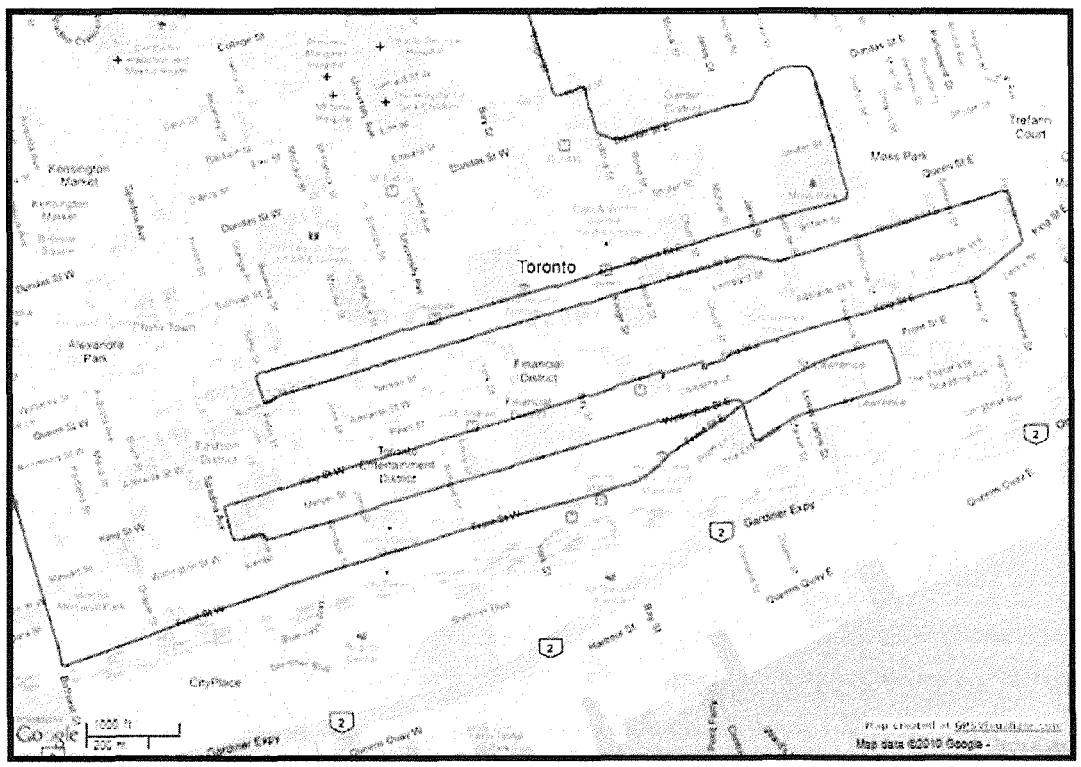
FIG. 47: Zoom in on the downtown portion of the Toronto trajectory shown in FIG. 46.

A further road test trajectory in downtown Toronto, Ontario, Canada presented here can be seen in FIG. 46. This road test was performed for nearly 158 minutes of continuous vehicle navigation and a distance of around 43.8 km was traveled. This trajectory, which is in a downtown scenario with urban canyons in some parts (this part of the trajectory is shown in FIG. 47), has a lot of degraded GPS performance because of either multipath, reflections with loss of direct line-of-sight, or complete blockage. The portions with degraded GPS performance encompass straight portions, turns, and frequent stops.

Figure 48:
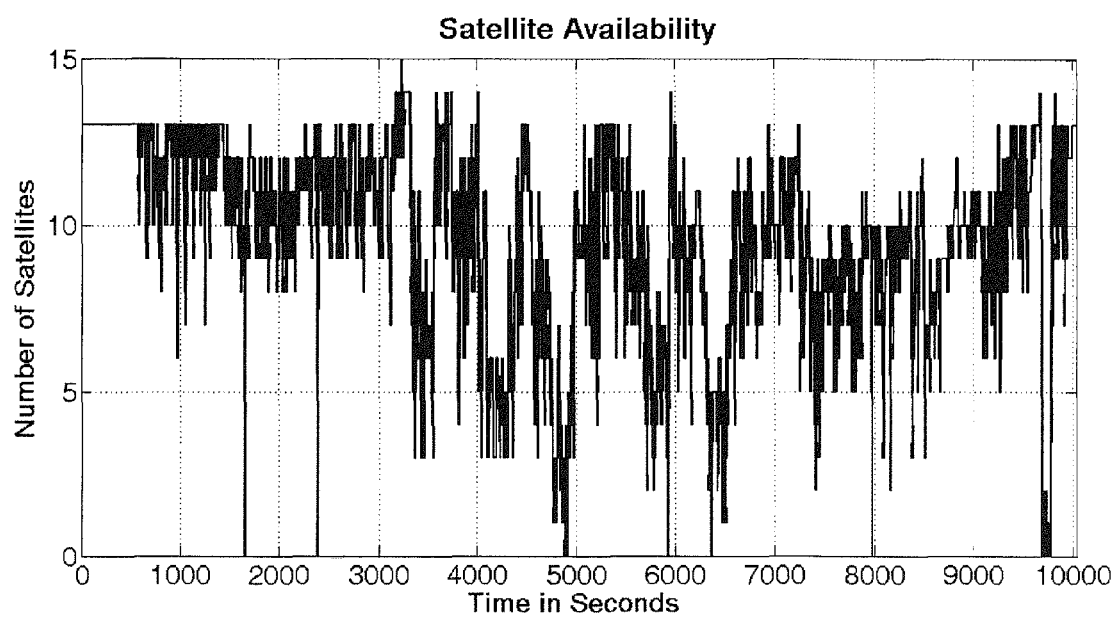
FIG. 48: Number of GNSS satellites (GPS+GLONASS) visible to the NovAtel OEMV-1G receiver during the Toronto trajectory shown in FIG. 46.
Figure 49:
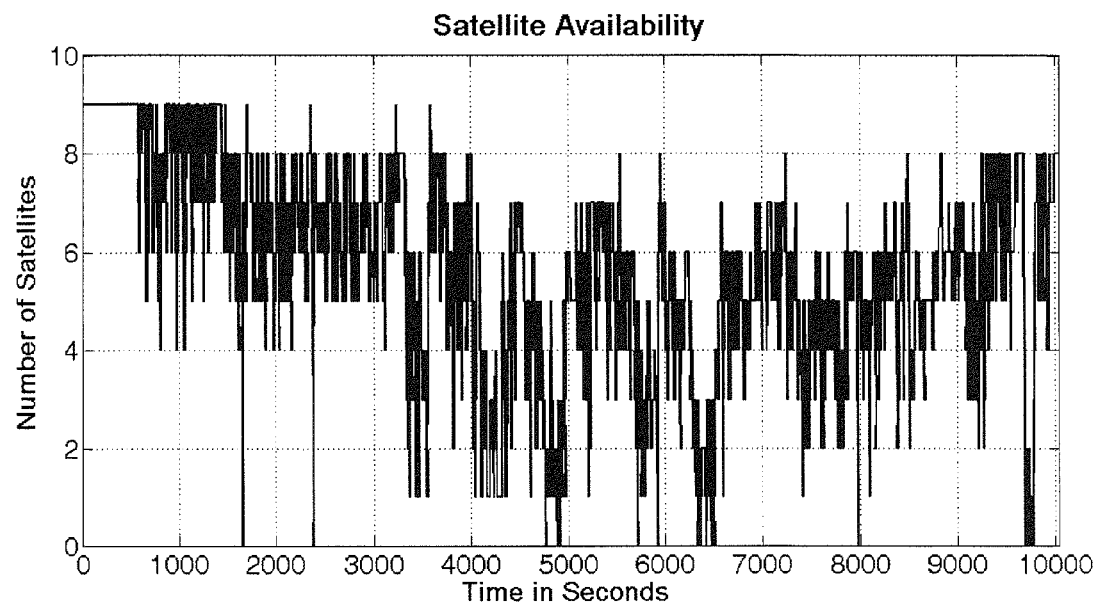
FIG. 49: Number of GPS-only satellites visible to the NovAtel OEMV-1G receiver during the Toronto trajectory shown in FIG. 46.

In this trajectory, the inertial sensors used are from the Crossbow IMU300CC-100, the GPS receiver used is the NovAtel OEMV-1G, which is a single frequency receiver. As mentioned earlier, this receiver tracks both GPS and GLO-NASS satellites, but the work presented in this section used only the GPS satellites. The number of all the satellites and the GPS-only satellites visible to the receiver over the whole trajectory duration are illustrated in FIG. 48 and FIG. 49, respectively. Even though the availability of the total number of satellites visible to the receiver does not seem to be very bad, these readings are contaminated with severe effects of reflections with loss of direct line-of-sight in the urban canyons. The specific satellites with bad measurements are detected by the checking routine, as mentioned earlier, and they are rejected from being used to update the filter. Furthermore, GPS satellites are the only ones used in this work, thus the availability of satellites is not very high in canyons in the downtown area.

Figure 50:
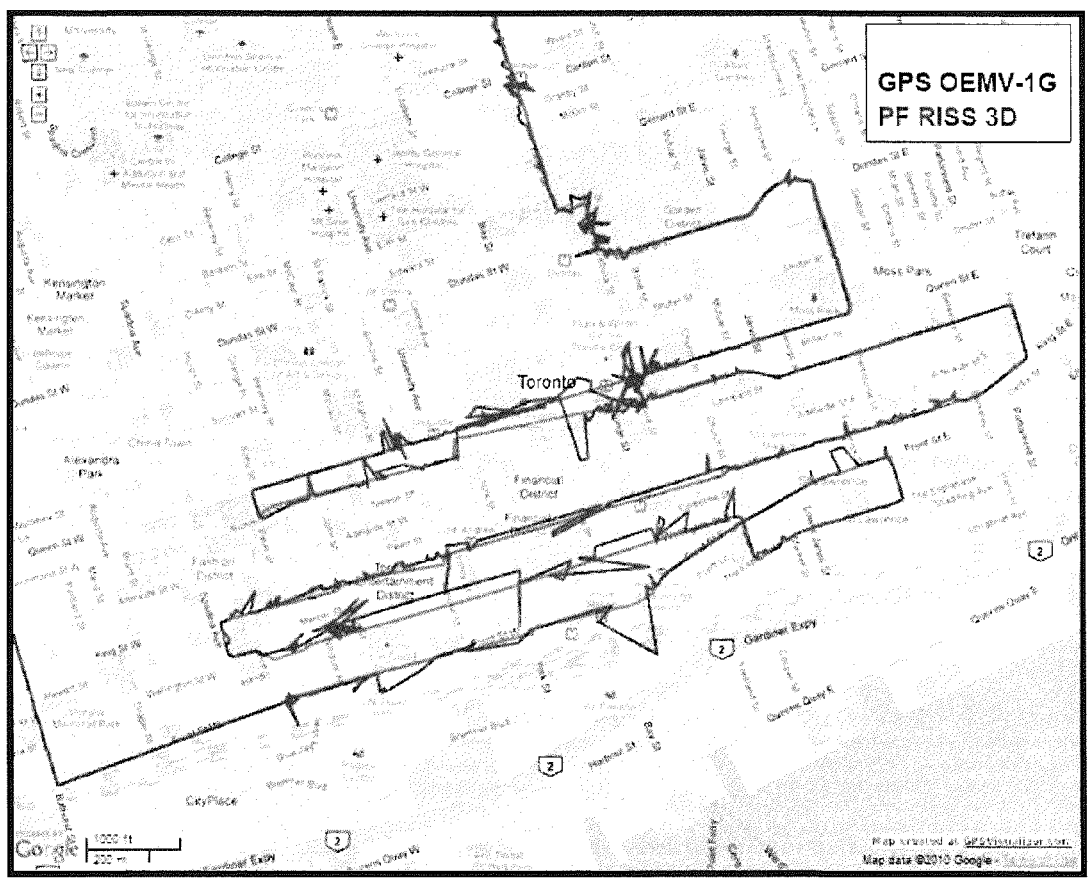
FIG. 50: Zoom in on the downtown portion of the Toronto trajectory shown in FIG. 46 showing the degraded GPS performance and the performance of the proposed navigation solution.

FIG. 50 show the receiver positioning results with its degraded performance, the reference solution, and the proposed navigation solution using Mixture PF for 3D "reduced number of inertial sensors with speed readings"/GPS integration with higher order AR modeling of the gyroscope stochastic drift, automatic detection of GPS degraded performance, switching between loosely and tightly coupled schemes, and rejection of individual satellites when working in tightly-coupled mode.

Figure 51:
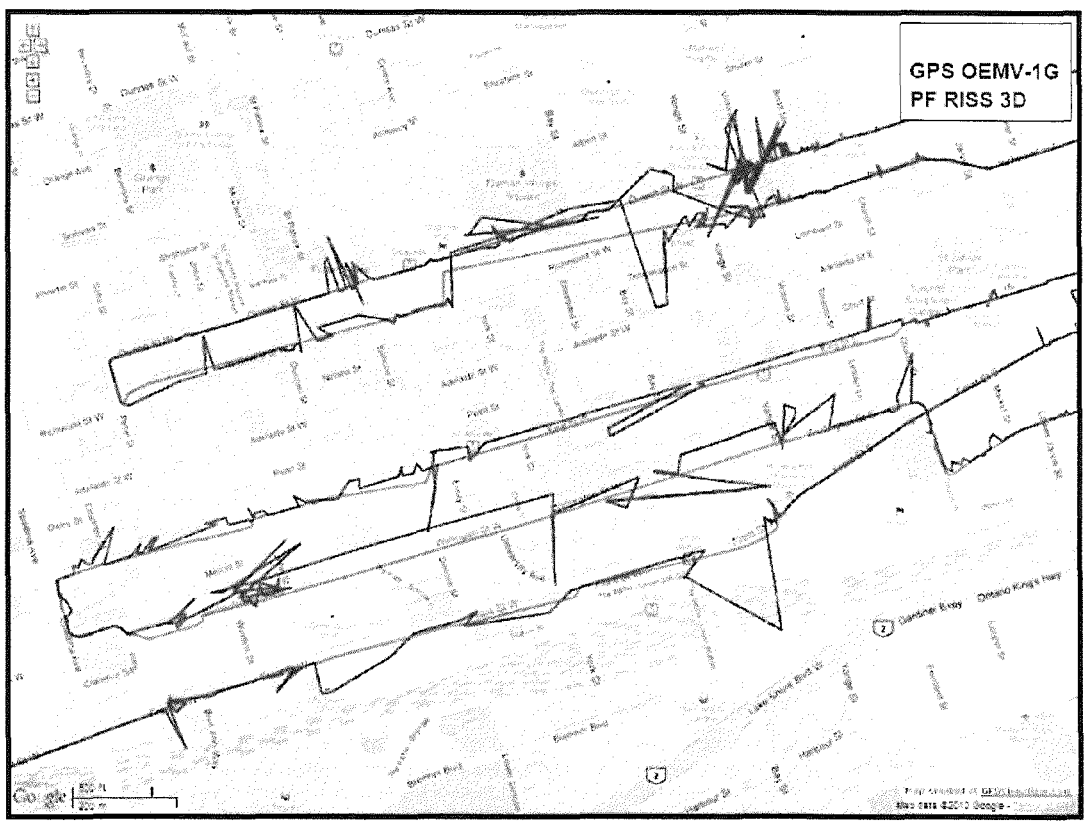
FIG. 51: More detailed view on the downtown portion of the Toronto trajectory shown in FIG. 46 showing the degraded GPS performance and the performance of the proposed navigation solution.

Although the trajectory has a large number of natural GPS outages (partial or complete), Table 14 shows the RMS and maximum position error during the long natural outages whose duration exceeds 100 seconds for the Mixture PF with 3D "reduced number of inertial sensors with speed readings" solution. There are too many smaller natural outages, but for the readability of the results only the longer ones are presented. The performance during these worst outages in the trajectory can be seen in FIG. 51. These results show the performance of the proposed navigation solution in a harsh environment with degraded GPS performance in deep urban canyons because of either severe effect of reflections with loss of direct line-of-sight or complete blockage. There was only one outage that showed an unusual performance worse than all the others; it can be seen in the upper half of FIG. 51. But still all these results are very competitive for low cost MEMS-based inertial sensors integrated with GPS.

Example 6

Backward Smoothed Positioning and Orientation Solution

This Example examines the use of backward smoothing as a means of post-processing which is acceptable for different applications such as mapping applications. Contrary to navigation, which requires a real time solution, the position and orientation of a mobile platform with an imaging device can be achieved in post-processing to further enhance positioning accuracy. The present Example assesses a backward smoothed positioning solution for a moving platform that can be used for applications, such as, for example, mapping system using low-cost MEMS inertial sensors, speed or velocity readings and GNSS.

As is known, not all the positioning techniques that apply to KF-based smoothing apply to nonlinear smoothing. Because a total-state approach can be used with the nonlinear motion model itself as the system model, the appropriate backward smoothing idea proposed in the present Example is the known "TFS" approach. The forward filter is the nonlinear filter that can be applied as detailed the previous Examples. The backward filter proposed is not based on using the inverse of the dynamic model to get the backward transition, which is commonly done in existing smoothing techniques. Exploiting the nature of the problem at hand, which is 3D motion, the present navigation module attempts to implement the backward filter through correctly transforming mathematically all the sensor readings to have a problem of a moving platform starting at the end of the trajectory and proceeding towards the original start. Thus, another instance of the forward filter with the same system model (motion model) can be applied to the transformed sensors data to provide the backward solution. The two filters can then be blended together to give the smoothed positioning solution.

The following is a description of the transformation applied to the readings to have a scenario of a moving platform starting at the end of the trajectory and proceeding towards the original start. GNSS position is kept the same, GNSS velocity components along North and East are negated, but the vertical component is kept the same. The platform speed readings derived from odometer or wheel encoders or any other source are kept the same. The two horizontal accelerometer readings are negated, and where a vertical accelerometer is used, its reading is kept the same. The vertical gyroscope reading is compensated for the component of the Earth rotation by subtracting the following ($\omega^e \sin \phi$) where $\omega^e$ is the Earth rotation rate and $\phi$ is the latitude, then it is negated, and this component is added once again. If present, the barometer readings are kept the same. Furthermore, if magnetometer readings are available, the azimuth angle derived from the magnetometer readings is transformed by adding 180 degrees to it. These newly transformed readings are applied to another instance of the program implementing the same forward filter and models, thereby providing a backward filter solution. The backward filter benefits from the information available for the forward filter and then the two solutions are subsequently blended together.

One benefit of the smoothed solution provided herein is during GNSS outages where the positioning error grows. Since the backward filter can make use of all the advantages of the forward filter, the final smoothed solution can improve the forward solution alone and the performance of this low-cost solution is closer to that of higher cost tactical grade IMUs.

Experimental Results

The performance of the proposed backward smoothed Mixture PF with 3D "reduced number of inertial sensors with speed readings"/GPS integration module is examined with a road test experiment in a land platform/vehicle. The inertial sensors used are from two MEMS-grade IMUs: (i) One is from Crossbow, model IMU300CC-100 (specifications of which are shown in Table 15); (ii) the second is from Analog Devices whose model is ADIS16405 (specifications are shown in Table 16). The ADIS16405 IMU has in addition to the three gyroscopes and three accelerometers, three magnetometers which were not used in the results presented in this example, only the inertial sensors were used to generate the presented results. The forward speed derived from the vehicle built-in sensors is collected through the OBD II interface. Two GPS receivers were used in these experiments for integration with the "reduced number of inertial sensors with speed readings", one is higher end and the other is lower end: (i) the first is a high-end dual frequency receiver, the NovAtel OEMV-3; (ii) the second is the NovAtel OEMV-1G single frequency GPS receiver, which is much lower-cost than the OEMV-3.

The specifications of the Honeywell IMU are illustrated in Table 17. These high-end units were integrated using backward smoothing through the Inertial Explorer software by NovAtel, which solution provided the reference to validate the proposed method and to examine the overall performance during different conditions including degraded GPS performance as well as some complete GPS blockages.

Houston Trajectory

Figure 52:
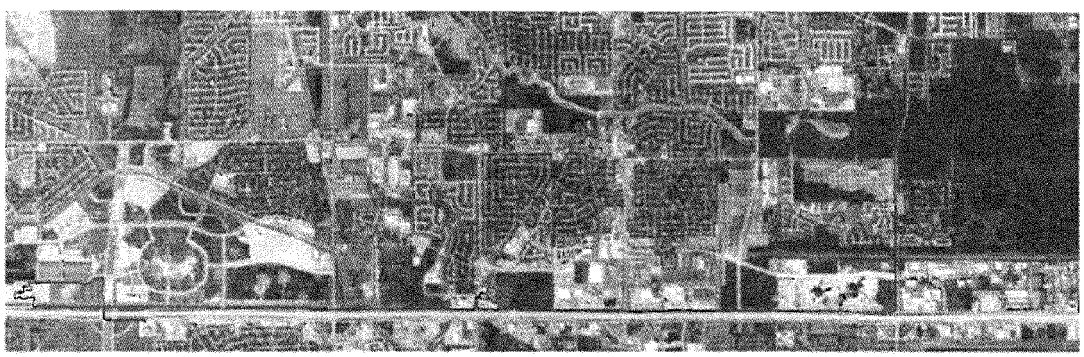
FIG. 52: Road Test Trajectory in Houston, Tex.
Figure 53:
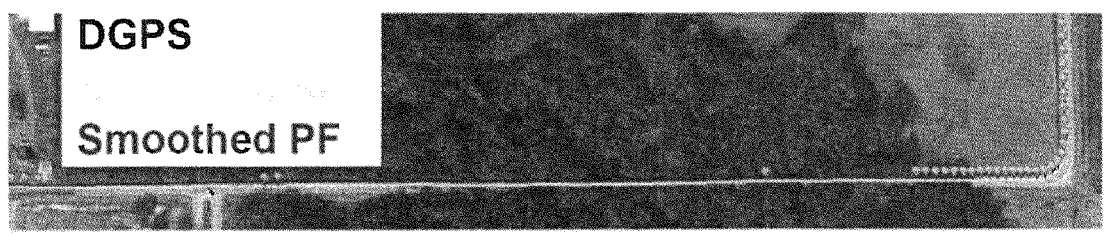
FIG. 53: One outage in a road covered by dense trees during the Houston trajectory of FIG. 52.
Figure 54:
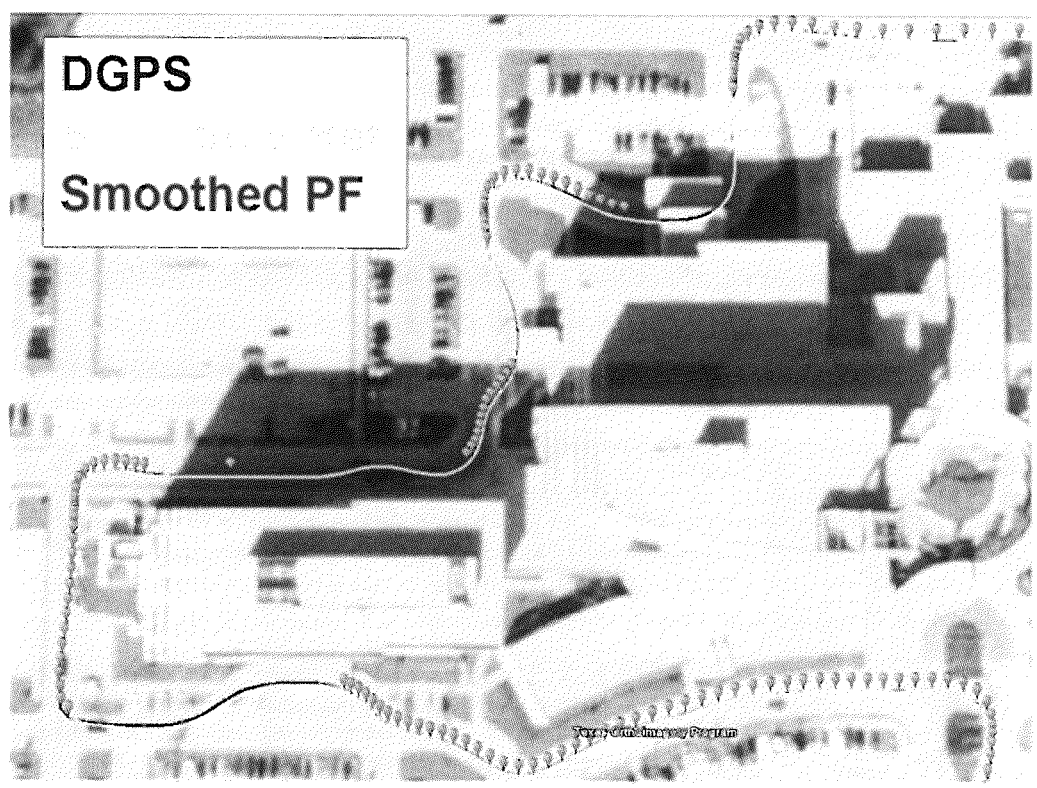
FIG. 54: Different outages when moving at slow speed in the vicinity of a building with some roof top canopies during the Houston trajectory of FIG. 52.
Figure 55:
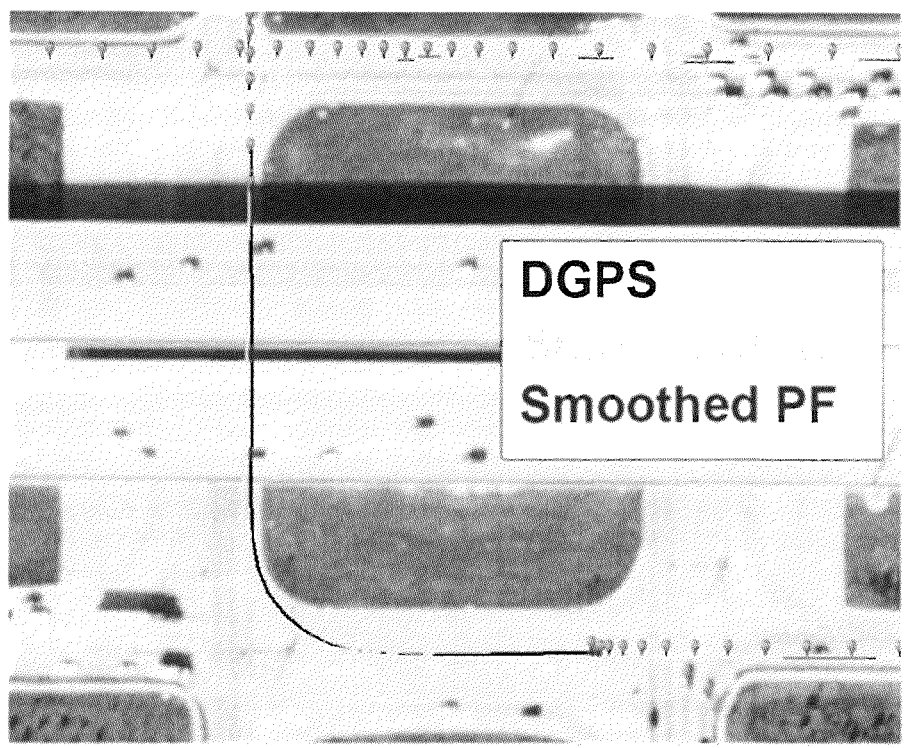
FIG. 55: An outage when passing under an overpass during the Houston trajectory of FIG. 52.

This trajectory occurred in Houston, Tex., USA (FIG. 52). The trajectory comprised a nearly open sky having some blockages. The reference solution in this trajectory used the NovAtel OEMV-3 receiver in Differential GPS (DGPS) using GrafNav software by NovAtel and was integrated to the high-end IMU using NovAtel's Inertial Explorer. This solution provided the reference to validate the proposed method and to examine the overall performance during the different conditions including some complete GPS blockages. The presented Mixture PF 3D "reduced number of inertial sensors with speed readings"/GPS solution used inertial sensors from the ADIS16405 IMU, and the NovAtel OEMV-3 GPS receiver. This receiver was used once in Single-Point GPS mode (SGPS) and it was also processed to obtain Differential GPS (DGPS). The trajectory was run twice once with SGPS and once with DGPS. When using the SGPS, the proposed solution had an RMS position error of 1.21 m, an RMS pitch error of 0.27°, an RMS roll error of 0.17°, and an RMS azimuth error of 0.41°. When using the DGPS the RMS position error dropped to 0.73 m. Three portions of this trajectory that contain GPS blockages are shown in FIG. 53, FIG. 54, and FIG. 55. FIG. 53 shows a GPS outage on a road covered by dense trees. FIG. 54 shows four blockages when moving around a building intentionally at very slow speed, a typical scenario that can happen in mapping applications. FIG. 55 illustrates a GPS outage when passing under an overpass at a slow speed.

Toronto Trajectory

Figure 56:
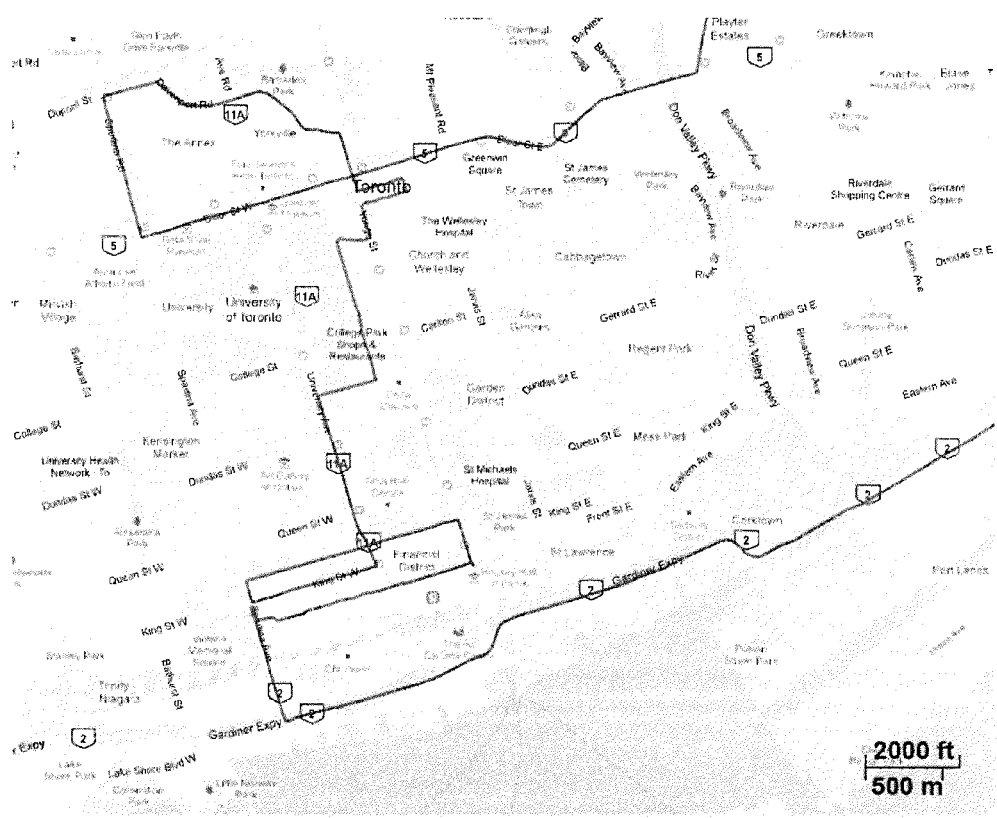
FIG. 56: Road Test Trajectory in Downtown Toronto, a slightly zoomed in portion of trajectory shown in FIG. 30.

Another road test trajectory was carried out in Toronto, Ontario, Canada, and is shown in FIG. 56. This road test was performed for nearly 128 minutes of continuous vehicle navigation and a distance of around 33.5 km was traveled. This trajectory is a downtown scenario with urban canyons in some parts and some underpasses. It had a lot of degraded GPS performance because of either severe signal reflection without a direct line of sight or complete blockage. The portions with degraded GPS performance encompass straight portions, turns, and frequent stops. In this trajectory, the inertial sensors used are from the Crossbow IMU300CC-100, the GPS receiver used in the results was the NovAtel OEMV-1G. The reference solution integrated the NovAtel OEM4 dual frequency GPS receiver with the high end Honeywell HG1700 IMU (the specification of this IMU are illustrated in Table 17) with backward smoothing using the Inertial Explorer software by NovAtel. This solution provided the reference to validate the proposed method and to examine the overall performance during the different conditions including degraded GPS performance as well as some complete GPS blockages.

The proposed Smoothed Mixture PF solution had an RMS position error of 5.78 m, an RMS pitch error of 0.29°, an RMS roll error of 0.26°, and an RMS azimuth error of 3.12°.

Figure 57:
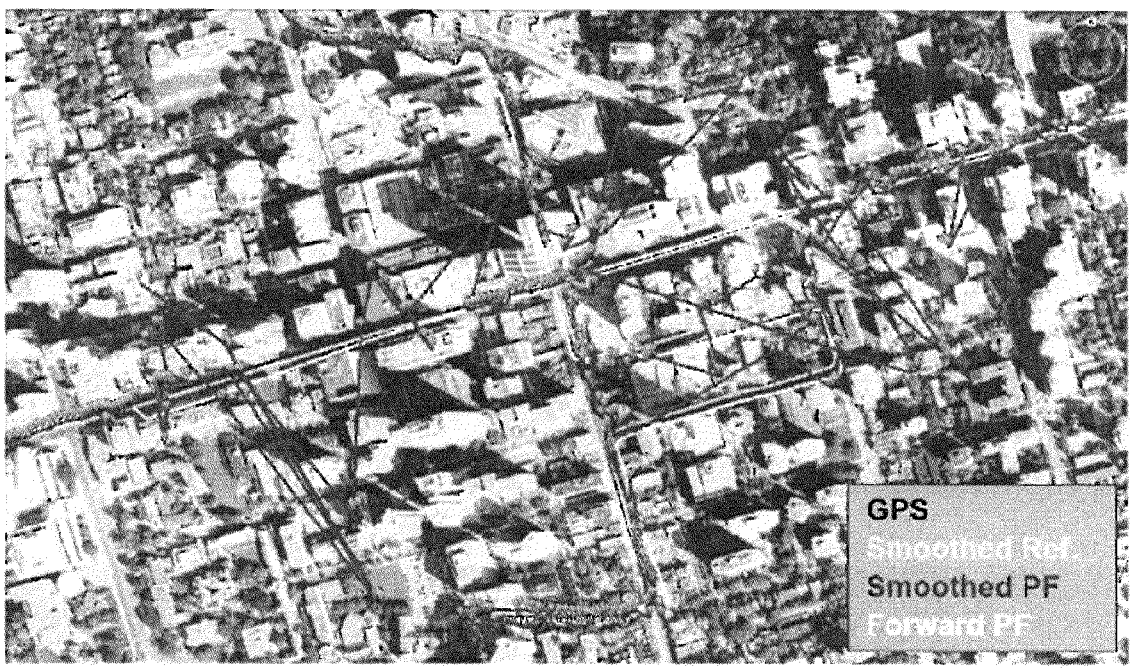
FIG. 57: Comparisons of the forward and backward proposed solutions, with GPS, and reference in a portion of downtown Toronto shown in FIG. 52 with severe GPS degradations and blockages.
Figure 58:
FIG. 58: Comparisons of the forward and backward solutions, with GPS, and reference in another portion of downtown Toronto shown in FIG. 52 with severe GPS degradations and blockages.
Figure 59:
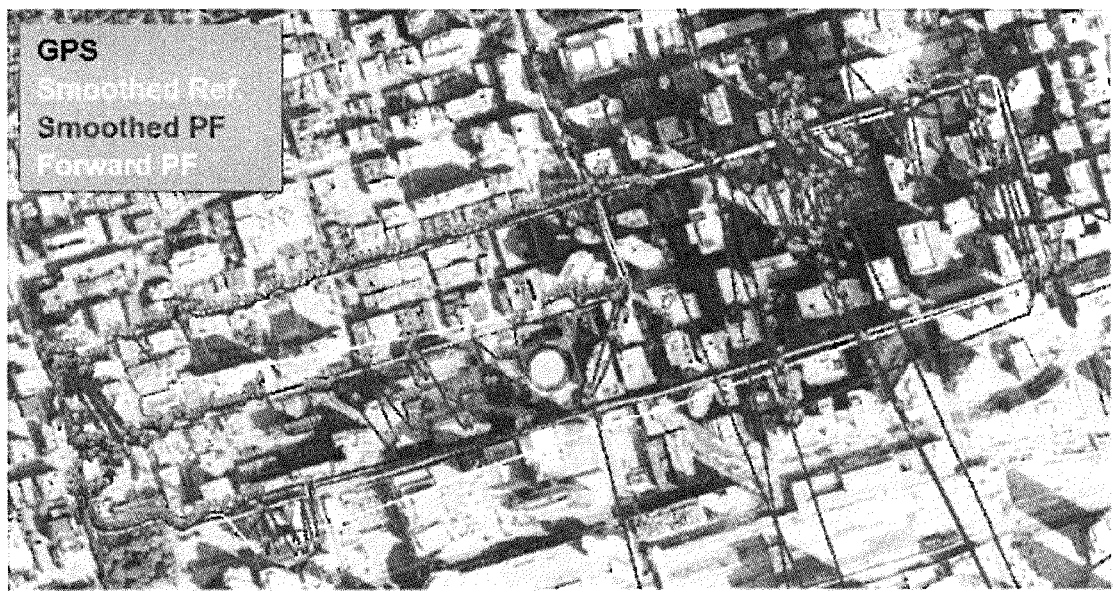
FIG. 59: Comparisons of the forward and backward solutions, with GPS, and reference in the portion of the downtown Toronto shown in FIG. 52 with the worst GPS degradations and blockages.

FIGS. 57, 58, 59 show the smoothed reference, GPS, the forward Mixture PF solution, and the backward smoothed Mixture PF solution during sections of this trajectory with urban canyons. The NovAtel OEMV-1G GPS receiver suffered from severe multipath effects and from some complete blockage during these urban canyons as demonstrated in these figures. The forward Mixture PF solution still shows a very competitive performance for a forward solution relying on such low-cost inertial sensors (with gyroscope biases of 2°/sec) and with such severely degraded GPS. The smoothed Mixture PF solution also demonstrates an improved performance considering the specifications and the very low cost of the sensors used.

Figure 60:
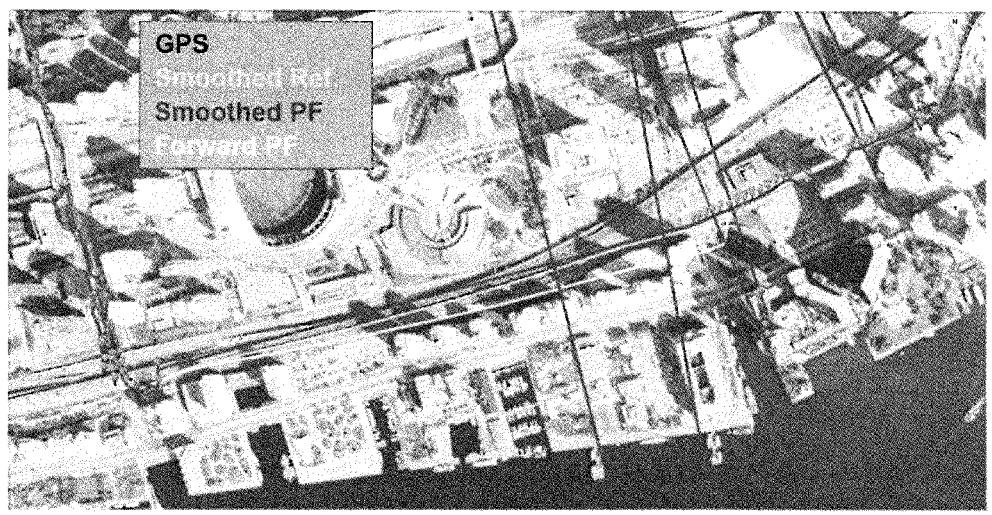
FIG. 60: Comparisons of the forward and backward solutions, with GPS, and reference in a complete blockage under Gardiner Expressway in Toronto trajectory shown in FIG. 52.
Figure 61:
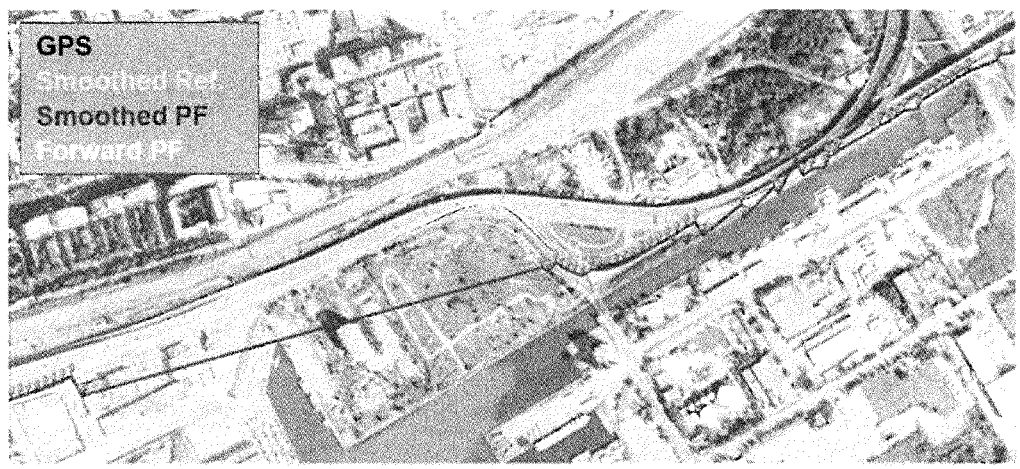
FIG. 61: Comparisons of the forward and backward solutions, with GPS, and reference in another complete blockage under Gardiner Expressway in Toronto trajectory shown in FIG. 52.

FIGS. 60 and 61 show the smoothed reference, GPS, the forward Mixture PF solution, and the backward smoothed Mixture PF solution during two big under-passes in two different portions under Gardiner Expressway, where the GPS signal suffered from a complete blockage. Again, the higher performance of the forward Mixture PF is demonstrated which can be used for real-time navigation applications. Furthermore the smoothed Mixture PF solution shows competitive performance.

The proposed Smoothed Mixture PF solution had an RMS position error of 5.78 m, while the forward Mixture PF solution had an error of 12.47 m. These results demonstrate the competitive performance of both the forward Mixture PF solution for real-time navigation and the backward smoothed Mixture PF solution for applications with post-processing given the quality and specifications of the sensors used.

Example 7

Alignment Routine

This routine is meant to calculate the misalignment of the frame of the sensor assembly with respect to the frame of the moving platform.

This example is presenting the case of using the 3D "reduced number of inertial sensors with speed readings"/GNSS integration. When the sensor assembly is tethered to the moving platform, one important misalignment component is during the mounting of the horizontal axes of the sensor assembly to be aligned with the horizontal axes of the moving platform. To detect misalignment in the pitch direction, the following technique is used.

If GNSS is available with adequate accuracy (as assessed by the technique described in Example 4), at time step k, an estimate of the pitch angle from the upward velocity component from GNSS and the overall platform forward speed (from the source of speed readings such as, for example, an odometer, or from the filter estimate such as from Example 1) is calculated as follows:

$$p_k^{GNSS} = \sin^{-1}\left(\frac{v_k^{u,GNSS}}{v_k^f}\right)$$

If GNSS is interrupted (i.e. temporarily unavailable or assessed and found inadequate) and a barometer is present, the height difference from the barometer together with the sampling time (of the barometer) $\Delta t$ can be used to get an estimate of the upward velocity, and consequently the pitch angle can be calculated as follows:

$$p_k^{Baro} = \sin^{-1}\left(\frac{v_k^{u,Baro}}{v_k^f}\right) = \sin^{-1}\left(\frac{\Delta height_k^{Baro}}{v_k^f \Delta t}\right)$$

If GNSS is interrupted (i.e. temporarily unavailable or assessed and found un-adequate) and a barometer is not used or not present, this routine will not run at this time step k.

The above calculated pitch angle is the pitch angle of the moving platform and does not suffer from the misalignment under discussion.

The pitch angle derived from the accelerometer and odometer (for example as calculated in Example 1) as per the following equations:

$$p_k = \sin^{-1}\left(\frac{(f_{k-1}^y - \delta f_{k-1}^y) - (a_{k-1}^{od} - \delta_{k-1}^{od})}{g}\right)$$

or $$p_k = \tan^{-1}\left(\frac{(f_{k-1}^y - \delta f_{k-1}^y) - (a_{k-1}^{od} - \delta a_{k-1}^{od})}{\sqrt{[(f_{k-1}^x - \delta f_{k-1}^x) + (v_{k-1}^{od} - \delta v_{k-1}^{od})(\omega_{k-1}^z - \delta \omega_{k-1}^z)]^2 + [(f_{k-1}^z - \delta f_{k-1}^z)]^2}}\right)$$

will be suffering from the misalignment in mounting the sensor assembly including the accelerometers. Thus the misalignment in pitch angle can be calculated as follows:

$$p_k^{misalign} = p_k^{GNSS} - p_k$$

or as:

$$p_k^{misalign} = p_k^{Baro} - p_k$$

It is to be noted that the above calculation can suffer from noise, thus the outcome of which should be averaged over an adequate number of time epochs to suppress noise and obtain a better estimate of the pitch angle misalignment.

Example 8

Benchmarking Results

An open sky trajectory in Calgary, Alberta, Canada was collected over a duration of 1.5 hours. The loosely coupled scheme to integrate the "reduced number of inertial sensors with speed readings" of Example 1 with a GPS receiver using Mixture PF is the one used herein. The GNSS degraded performance detection routine (of Example 4) was enabled when generating these results and as per Example 3, the long memory length AR model was used to model the stochastic drift of the gyroscope, and the technique for generating measurement update for this drift was used as well.

The GPS receiver used is the u-Blox LEA-5T, which is a low cost high sensitivity GPs receiver. The inertial sensors used are from the ADIS16405 IMU (Table 16). It is to be noted that the magnetometers built-in with this IMU were not used in these experiments. Furthermore, no barometer was used in these experiments. The reference solution uses a high end navigational grade IMU from Honeywell called CIMU, and a NovAtel OEM4 dual frequency GPS receiver, and they are integrated and backward smoothed using the Inertial Explorer Software by NovAtel.

Different randomly selected simulated GPS outages were intentionally introduced by removing GPS data during these portions. The outages durations used are 10 sec, 30 sec, 60 sec, 120 sec, 300 sec, 600 sec. For each one of these durations, the trajectory was run several times so as the number of outages for this same duration is more than 100 outages, the positioning results during these outages were compared to a higher end navigational grade navigation system used as the reference. The root mean square (RMS) error and the maximum error in both horizontal position and altitude are calculated. The results in Table 18 present the average of the RMS and maximum errors for the >100 outages of each duration.

TABLE 1

| | | RMS Error in 2D Horizontal Position (meter) | | | | |
|---|---|---|---|---|---|---|
| Outage No. | Outage Dur. (sec) | SIR PF RISS 3D | MPF RISS 3D | MPF RISS 2D | KF RISS 2D | KF OD IMU 3D |
| 1 | 30 | 12.46 | 5.60 | 5.66 | 10.32 | 28.80 |
| 2 | 80 | 19.01 | 8.03 | 11.13 | 14.85 | 41.08 |
| 3 | 80 | 12.20 | 10.78 | 11.42 | 24.20 | 50.95 |
| 4 | 80 | 17.67 | 10.75 | 12.93 | 25.16 | 28.59 |
| 5 | 60 | 8.64 | 9.91 | 10.11 | 24.61 | 29.57 |
| 6 | 90 | 9.93 | 8.75 | 9.11 | 24.69 | 17.38 |
| 7 | 70 | 9.85 | 6.12 | 5.75 | 20.65 | 13.45 |
| 8 | 120 | 6.82 | 8.25 | 8.34 | 6.47 | 13.66 |

TABLE 1-continued

| | | RMS Error in 2D Horizontal Position (meter) | | | | |
|---|---|---|---|---|---|---|
| Outage No. | Outage Dur. (sec) | SIR PF RISS 3D | MPF RISS 3D | MPF RISS 2D | KF RISS 2D | KF OD IMU 3D |
| 9 | 220 | 19.86 | 15.31 | 15.28 | 16.55 | 95.34 |
| Average | 92 | 12.94 | 9.28 | 9.97 | 18.61 | 35.42 |

TABLE 2

| | | Max. Error in 2D Horizontal Position (meter) | | | | |
|---|---|---|---|---|---|---|
| Outage No. | Outage Dur. (sec) | SIR PF RISS 3D | MPF RISS 3D | MPF RISS 2D | KF RISS 2D | KF OD IMU 3D |
| 1 | 30 | 15.26 | 8.30 | 8.47 | 17.61 | 49.67 |
| 2 | 80 | 23.92 | 15.98 | 19.58 | 20.41 | 66.59 |
| 3 | 80 | 22.20 | 20.81 | 22.36 | 49.48 | 82.88 |
| 4 | 80 | 24.54 | 17.80 | 21.76 | 69.27 | 36.12 |
| 5 | 60 | 12.39 | 13.82 | 14.19 | 42.17 | 42.06 |
| 6 | 90 | 13.42 | 12.96 | 13.59 | 37.09 | 21.12 |
| 7 | 70 | 19.19 | 13.86 | 14.35 | 47.21 | 19.08 |
| 8 | 120 | 13.17 | 15.29 | 15.31 | 11.14 | 23.62 |
| 9 | 220 | 40.33 | 33.41 | 34.23 | 50.80 | 201.64 |
| Average | 92 | 20.49 | 16.91 | 18.21 | 38.35 | 60.31 |

TABLE 3

| Outage No. | Outage Dur. (sec) | RMS Error in Altitude | | |
|---|---|---|---|---|
| | | SIR PF RISS 3D | MPF RISS 3D | KF OD IMU 3D |
| 1 | 30 | 2.38 | 1.12 | 1.57 |
| 2 | 80 | 4.57 | 1.44 | 30.59 |
| 3 | 80 | 1.03 | 1.00 | 23.04 |
| 4 | 80 | 2.43 | 0.63 | 9.91 |
| 5 | 60 | 2.62 | 1.52 | 31.67 |
| 6 | 90 | 0.71 | 0.68 | 18.27 |
| 7 | 70 | 3.00 | 1.03 | 11.10 |
| 8 | 120 | 0.39 | 0.53 | 7.47 |
| 9 | 220 | 1.17 | 2.39 | 4.75 |
| Average | 92 | 2.03 | 1.15 | 15.37 |

TABLE 4

| Outage No. | Outage Dur. (sec) | Max. Error in Altitude | | |
|---|---|---|---|---|
| | | SIR PF RISS 3D | MPF RISS 3D | KF OD IMU 3D |
| 1 | 30 | 3.78 | 2.38 | 2.37 |
| 2 | 80 | 7.42 | 3.55 | 53.33 |
| 3 | 80 | 1.92 | 2.34 | 46.94 |
| 4 | 80 | 3.52 | 1.91 | 13.57 |
| 5 | 60 | 3.40 | 2.23 | 51.61 |
| 6 | 90 | 1.26 | 1.07 | 25.61 |
| 7 | 70 | 4.23 | 2.23 | 16.18 |
| 8 | 120 | 0.81 | 1.10 | 8.75 |
| 9 | 220 | 2.56 | 4.17 | 7.66 |
| Average | 92 | 3.21 | 2.33 | 25.11 |

TABLE 5

| Outage No. | Outage Duration (sec) | Approx. Distance (meter) | RMS Error in Horizontal Position (meter) | | | |
|---|---|---|---|---|---|---|
| | | | PF VPR | KF VPR | KF V | KF |
| 1 | 120 | 839 | 14.55 | 6.85 | 9.09 | 18.13 |
| 2 | 120 | 1193 | 23.17 | 17.08 | 82.79 | 130.92 |
| 3 | 120 | 1952 | 6.43 | 13.60 | 148.01 | 184.53 |
| 4 | 120 | 2300 | 8.46 | 48.93 | 64.98 | 544.46 |
| 5 | 120 | 2119 | 15.00 | 25.00 | 27.11 | 298.56 |
| 6 | 120 | 2655 | 14.02 | 54.09 | 77.16 | 435.81 |
| 7 | 120 | 2353 | 4.95 | 56.91 | 73.57 | 165.44 |
| 8 | 120 | 1309 | 7.54 | 20.57 | 53.66 | 213.12 |
| 9 | 120 | 2777 | 5.97 | 4.73 | 180.27 | 184.80 |
| 10 | 120 | 2642 | 19.70 | 29.72 | 285.69 | 417.19 |
| Average | 120 | 2014 | 11.98 | 27.75 | 100.23 | 259.29 |

TABLE 6

| Outage No. | Outage Duration (sec) | Approx. Distance (meter) | Max. Error in Horizontal Position (meter) | | | |
|---|---|---|---|---|---|---|
| | | | PF VPR | KF VPR | KF V | KF |
| 1 | 120 | 839 | 21.37 | 10.19 | 12.87 | 54.20 |
| 2 | 120 | 1193 | 53.02 | 37.40 | 199.13 | 310.90 |
| 3 | 120 | 1952 | 11.95 | 26.86 | 272.96 | 444.70 |
| 4 | 120 | 2300 | 11.25 | 89.69 | 103.57 | 1293.20 |
| 5 | 120 | 2119 | 30.19 | 47.57 | 52.69 | 745.70 |
| 6 | 120 | 2655 | 33.40 | 104.93 | 138.55 | 1115.60 |
| 7 | 120 | 2353 | 8.76 | 98.19 | 97.20 | 396.30 |
| 8 | 120 | 1309 | 13.07 | 28.16 | 69.60 | 599.20 |
| 9 | 120 | 2777 | 9.68 | 11.77 | 321.87 | 487.10 |
| 10 | 120 | 2642 | 41.45 | 52.96 | 515.66 | 1011.80 |
| Average | 120 | 2014 | 23.42 | 50.77 | 178.41 | 645.87 |

TABLE 7

| Outage No. | Outage Duration (sec) | Approx. Distance (meter) | RMS Error in Altitude (meter) | | | |
|---|---|---|---|---|---|---|
| | | | PF VPR | KF VPR | KF V | KF |
| 1 | 120 | 839 | 1.13 | 2.54 | 0.55 | 7.93 |
| 2 | 120 | 1193 | 1.86 | 5.82 | 3.03 | 39.20 |
| 3 | 120 | 1952 | 2.53 | 25.22 | 37.63 | 95.28 |
| 4 | 120 | 2300 | 0.41 | 14.95 | 12.20 | 149.22 |
| 5 | 120 | 2119 | 1.23 | 4.83 | 10.41 | 116.04 |
| 6 | 120 | 2655 | 1.10 | 3.76 | 20.08 | 87.93 |
| 7 | 120 | 2353 | 1.76 | 12.13 | 22.92 | 115.79 |
| 8 | 120 | 1309 | 1.88 | 5.12 | 11.02 | 131.37 |
| 9 | 120 | 2777 | 0.81 | 5.11 | 8.83 | 104.52 |
| 10 | 120 | 2642 | 4.15 | 4.37 | 8.05 | 65.48 |
| Average | 120 | 2014 | 1.69 | 8.38 | 13.47 | 91.28 |

TABLE 8

| Outage No. | Outage Duration (sec) | Approx. Distance (meter) | Max. Error in Altitude (meter) | | | |
|---|---|---|---|---|---|---|
| | | | PF VPR | KF VPR | KF V | KF |
| 1 | 120 | 839 | 1.93 | 3.09 | 1.18 | 16.41 |
| 2 | 120 | 1193 | 3.34 | 13.19 | 6.38 | 88.18 |
| 3 | 120 | 1952 | 4.69 | 42.88 | 57.84 | 215.68 |
| 4 | 120 | 2300 | 1.11 | 22.09 | 15.81 | 332.01 |
| 5 | 120 | 2119 | 4.71 | 10.28 | 16.17 | 244.97 |
| 6 | 120 | 2655 | 2.52 | 6.82 | 31.02 | 197.75 |
| 7 | 120 | 2353 | 3.41 | 18.88 | 45.46 | 257.03 |
| 8 | 120 | 1309 | 3.56 | 8.93 | 17.79 | 276.47 |
| 9 | 120 | 2777 | 2.17 | 8.14 | 12.73 | 225.84 |
| 10 | 120 | 2642 | 6.99 | 6.32 | 16.77 | 138.26 |
| Average | 120 | 2014 | 3.44 | 14.06 | 22.11 | 199.26 |

TABLE 9

| Outage No. | Avg. Speed (Km/hr) | App. Dist. (m) | PF PCI (m) | PF AR (m) | PF GM (m) | PF WGN (m) | KF GM (m) | KF GM No Gyro Updt (m) |
|---|---|---|---|---|---|---|---|---|
| 1 | 54 | 892 | 3.08 | 3.52 | 4.64 | 3.21 | 18.72 | 6.05 |
| 2 | 93 | 1549 | 5.20 | 6.12 | 5.50 | 4.69 | 9.55 | 15.58 |
| 3 | 110 | 1831 | 4.45 | 3.58 | 15.38 | 3.24 | 28.71 | 17.20 |
| 4 | 117 | 1952 | 5.51 | 5.24 | 6.10 | 15.84 | 13.57 | 55.34 |
| 5 | 117 | 1957 | 2.68 | 2.78 | 5.16 | 5.64 | 9.39 | 9.31 |
| 6 | 107 | 1792 | 1.71 | 3.00 | 6.28 | 4.52 | 7.37 | 18.67 |
| 7 | 117 | 1956 | 4.06 | 4.72 | 5.86 | 5.03 | 9.75 | 23.37 |
| 8 | 118 | 1974 | 5.59 | 3.80 | 6.65 | 12.45 | 10.31 | 102.25 |
| 9 | 118 | 1963 | 7.76 | 7.29 | 4.77 | 6.50 | 24.24 | 20.76 |
| 10 | 118 | 1970 | 2.67 | 3.26 | 6.32 | 15.32 | 6.15 | 11.14 |
| 11 | 114 | 1903 | 5.36 | 4.14 | 8.51 | 12.64 | 16.56 | 40.74 |
| 12 | 114 | 1892 | 3.30 | 3.97 | 4.72 | 13.43 | 15.57 | 75.49 |
| Average | 108 | 1803 | 4.28 | 4.28 | 6.66 | 8.54 | 14.16 | 32.99 |

TABLE 10

| Outage No. | Avg. Speed (Km/hr) | App. Dist. (m) | PF PCI (m) | PF AR (m) | PF GM (m) | PF WGN (m) | KF GM (m) | KF GM No Gyro Updt (m) |
|---|---|---|---|---|---|---|---|---|
| 1 | 54 | 892 | 4.16 | 4.92 | 3.91 | 4.53 | 33.52 | 9.88 |
| 2 | 93 | 1549 | 8.69 | 10.54 | 10.76 | 6.95 | 20.18 | 24.57 |
| 3 | 110 | 1831 | 6.17 | 5.03 | 20.47 | 7.40 | 47.82 | 24.32 |
| 4 | 117 | 1952 | 9.62 | 8.83 | 20.21 | 32.63 | 21.13 | 140.00 |
| 5 | 117 | 1957 | 4.61 | 5.07 | 9.00 | 12.63 | 19.37 | 15.54 |
| 6 | 107 | 1792 | 2.23 | 4.19 | 7.40 | 10.39 | 15.29 | 34.92 |
| 7 | 117 | 1956 | 6.35 | 7.47 | 15.45 | 12.88 | 21.96 | 40.84 |
| 8 | 118 | 1974 | 10.73 | 6.91 | 16.88 | 25.04 | 13.56 | 215.37 |
| 9 | 118 | 1963 | 11.70 | 11.16 | 10.92 | 16.41 | 47.06 | 40.96 |
| 10 | 118 | 1970 | 4.01 | 5.01 | 15.66 | 36.35 | 13.97 | 21.61 |
| 11 | 114 | 1903 | 9.48 | 7.83 | 18.03 | 28.59 | 21.54 | 86.42 |
| 12 | 114 | 1892 | 4.75 | 6.06 | 5.77 | 28.46 | 19.75 | 156.70 |
| Average | 108 | 1803 | 6.88 | 6.92 | 12.87 | 18.52 | 24.60 | 67.59 |

TABLE 11

| Outage No. | Avg. Speed (Km/hr) | App. Dist. (m) | PF PCI (m) | PF AR (m) | PF GM (m) | PF WGN (m) | KF GM (m) | KF GM No Gyro Updt (m) |
|---|---|---|---|---|---|---|---|---|
| 1 | 52 | 2587 | 13.34 | 9.16 | 9.29 | 6.14 | 55.79 | 58.59 |
| 2 | 100 | 5009 | 25.20 | 27.80 | 45.67 | 21.75 | 65.65 | 71.97 |
| 3 | 93 | 4658 | 12.35 | 10.95 | 31.67 | 39.34 | 55.90 | 169.40 |
| 4 | 117 | 5863 | 9.53 | 12.44 | 49.35 | 97.50 | 21.79 | 523.79 |
| 5 | 118 | 5888 | 14.79 | 7.73 | 45.56 | 41.40 | 47.87 | 253.55 |
| 6 | 111 | 5546 | 12.92 | 12.43 | 34.20 | 46.54 | 60.19 | 106.69 |
| 7 | 115 | 5752 | 11.29 | 9.42 | 64.76 | 74.54 | 83.19 | 73.76 |
| 8 | 118 | 5919 | 8.57 | 9.17 | 54.78 | 93.75 | 73.90 | 238.36 |
| 9 | 118 | 5902 | 12.21 | 11.95 | 96.34 | 108.53 | 131.39 | 499.34 |
| 10 | 118 | 5907 | 19.03 | 31.36 | 89.60 | 121.89 | 101.50 | 110.87 |
| 11 | 115 | 5775 | 9.95 | 20.71 | 81.79 | 127.20 | 61.90 | 103.51 |
| 12 | 108 | 5396 | 14.10 | 13.13 | 50.03 | 110.36 | 50.49 | 76.80 |
| Average | 107 | 5350 | 13.61 | 14.69 | 54.42 | 74.08 | 67.46 | 190.55 |

TABLE 12

| Outage No. | Avg. Speed (Km/hr) | App. Dist. (m) | PF PCI (m) | PF AR (m) | PF GM (m) | PF WGN (m) | KF GM (m) | KF GM No Gyro Updt (m) |
|---|---|---|---|---|---|---|---|---|
| 1 | 52 | 2587 | 24.48 | 16.89 | 15.34 | 9.67 | 87.69 | 200.33 |
| 2 | 100 | 5009 | 51.97 | 59.04 | 92.06 | 47.26 | 128.65 | 123.05 |
| 3 | 93 | 4658 | 20.07 | 17.54 | 40.87 | 77.49 | 74.96 | 413.34 |
| 4 | 117 | 5863 | 19.96 | 30.77 | 116.87 | 202.80 | 52.48 | 962.64 |
| 5 | 118 | 5888 | 36.53 | 16.35 | 93.36 | 82.58 | 99.13 | 492.46 |
| 6 | 111 | 5546 | 27.53 | 26.03 | 77.43 | 99.83 | 128.98 | 230.51 |
| 7 | 115 | 5752 | 15.72 | 13.50 | 147.57 | 164.15 | 180.40 | 132.51 |
| 8 | 118 | 5919 | 15.40 | 15.02 | 145.63 | 220.75 | 183.40 | 426.48 |
| 9 | 118 | 5902 | 27.14 | 25.17 | 229.60 | 252.54 | 276.62 | 967.63 |
| 10 | 118 | 5907 | 34.20 | 59.54 | 208.81 | 269.03 | 238.22 | 254.30 |
| 11 | 115 | 5775 | 15.58 | 34.93 | 204.34 | 287.99 | 165.90 | 235.85 |
| 12 | 108 | 5396 | 34.63 | 29.54 | 127.96 | 239.47 | 131.80 | 171.81 |
| Average | 107 | 5350 | 26.93 | 28.69 | 124.99 | 162.80 | 145.69 | 384.24 |

TABLE 13

| | Maximum Position Error (m) | | | | | | | |
|---|---|---|---|---|---|---|---|---|
| Outage No. | PF 3 Sat | KF 3 Sat | PF 2 Sat | KF 2 Sat | PF 1 Sat | KF 1 Sat | PF 0 Sat | KF 0 Sat |
| 1 | 9.41 | 6.61 | 9.73 | 6.43 | 19.72 | 25.46 | 20.58 | 25.24 |
| 2 | 5.92 | 11.77 | 12.18 | 22.96 | 12.83 | 25.89 | 11.90 | 25.22 |
| 3 | 5.14 | 18.10 | 5.79 | 22.23 | 8.55 | 25.76 | 6.05 | 28.21 |
| 4 | 5.01 | 8.60 | 5.25 | 32.20 | 19.41 | 38.72 | 14.23 | 36.76 |
| 5 | 10.04 | 13.75 | 13.07 | 19.42 | 17.82 | 56.30 | 15.50 | 57.53 |
| 6 | 5.67 | 9.14 | 6.74 | 12.27 | 6.57 | 22.29 | 4.75 | 22.05 |
| 7 | 4.91 | 9.39 | 10.31 | 10.24 | 18.49 | 33.40 | 18.45 | 33.59 |
| 8 | 11.44 | 12.83 | 13.96 | 13.81 | 11.51 | 14.90 | 11.60 | 14.89 |
| 9 | 9.99 | 31.53 | 13.53 | 33.85 | 12.60 | 44.87 | 15.22 | 47.84 |
| 10 | 12.93 | 9.73 | 12.77 | 14.97 | 13.63 | 31.42 | 14.75 | 27.72 |
| Average | 8.04 | 13.15 | 10.33 | 18.84 | 14.11 | 31.90 | 13.30 | 31.91 |

TABLE 14

| Outage No. | Outage Dur. (sec) | Approx. Dist. (m) | PF RMS Pos error (m) | PF Max Pos error (m) |
|---|---|---|---|---|
| 1 | 408 | 1514.60 | 18.22 | 33.18 |
| 2 | 241 | 973.60 | 15.12 | 33.74 |
| 3 | 125 | 652.70 | 29.97 | 63.22 |
| 4 | 115 | 659.40 | 13.74 | 23.82 |
| 5 | 422 | 473.40 | 13.31 | 27.38 |
| 6 | 173 | 433.80 | 5.70 | 11.74 |
| 7 | 190 | 289.00 | 8.12 | 12.73 |
| 8 | 103 | 152.60 | 6.88 | 16.92 |
| Average | 222 | 643.64 | 13.88 | 27.84 |

TABLE 15

| Specifications | IMU 300CC-100 |
|---|---|
| Update Rate | >100 Hz |
| Gyroscope | |
| Range | ±100 deg/s |
| Bias | <±2.0 deg/s |
| Scale Factor | <1% |
| Angle Random Walk | <2.25 deg/$\sqrt{hr}$ |
| Accelerometer | |
| Range | ±2 g |
| Bias | <±30 mg |
| Scale Factor | <1% |
| Velocity Random Walk | <0.15 m/s/$\sqrt{hr}$ |
| Linearity | <1% |

TABLE 16

| Specifications | ADIS16405 |
|---|---|
| Gyroscope | |
| Range | ±300 deg/s |
| Initial Bias error | ±3 deg/s |
| In run Bias stability | 0.007 deg/s |
| Sensitivity temperature coefficient | ±40 ppm/° C. |
| Angle Random Walk | 2 deg/$\sqrt{hr}$ |
| Nonlinearity | 0.1% of FS |
| Axis Misalignment | ±0.05 deg |
| Accelerometer | |
| Range | ±18 g |
| Initial Bias error | ±50 mg |
| In-run Bias stability | 0.2 mg |
| Sensitivity temperature coefficient | ±50 ppm/° C. |
| Velocity Random Walk | 0.2 m/s/$\sqrt{hr}$ |
| Nonlinearity | 0.1% of FS |
| Axis Misalignment | 0.2 deg |

TABLE 17

| Specifications | HG1700 |
|---|---|
| Update Rate | 100 Hz |
| Gyroscope | |
| Range | ±1000 deg/s |
| Bias | 1.0 deg/hr |
| Scale Factor | 150 ppm |
| Angle Random Walk | 0.125 deg/$\sqrt{hr}$ |
| Accelerometer | |
| Range | ±50 g |
| Bias | 1.0 mg |
| Scale Factor | 300 ppm |
| Linearity | 500 ppm |

TABLE 18

| GNSS Outage Duration (seconds) | Avg. Distance Travelled (meters) | Horizontal Position Error RMS (meters) | Vertical Position Error RMS (meters) |
|---|---|---|---|
| 10 s | 131 | 1.70 | 0.57 |
| 30 s | 330 | 4.61 | 1.00 |
| 60 s (1 min.) | 814 | 9.63 | 1.66 |
| 120 s (2 mins.) | 1817 | 17.74 | 2.65 |
| 300 s (5 mins.) | 4015 | 41.12 | 5.26 |
| 600 s (10 mins.) | 8245 | 105.24 | 9.07 |

What is claimed is:

1. A navigation module, for use with a moving platform, the module comprising:
    a receiver for receiving absolute navigational information from an external source, and producing an output of navigational information indicative thereof,
    an assembly of self-contained sensors capable of obtaining readings relating to navigational information and producing an output indicative thereof,
    a source of speed information capable of obtaining speed readings and producing an output indicative thereof, wherein the speed information is substantially uninterrupted,
    at least one processor, coupled to receive the information from the receiver, sensor assembly and source of speed information, and operative to integrate the information to produce a navigation solution,
    wherein the navigation solution uses the speed information to decouple the motion of the platform from the sensor assembly output, wherein the at least one processor is further programmed to use an algorithm capable of modeling advanced models of stochastic errors in the sensor assembly.

2. The navigation module in claim 1, wherein the absolute receiver for receiving absolute navigational information is a GNSS receiver.

3. The navigation module in claim 2, wherein the GNSS information is degraded.

4. The navigation module in claim 2, wherein the GNSS receiver is a Global Positioning System receiver.

5. The navigation module in claim 1, wherein the sensor assembly comprises at least two accelerometers and one gyroscope.

6. The navigation module in claim 1, wherein the source of speed information is an odometer.

7. The navigation module in claim 1, wherein the means for obtaining speed information has a wired connection to the module.

8. The navigation module in claim 1, wherein the means for obtaining speed information is wirelessly connected to the module.

9. The navigation module in claim 1, wherein the navigation solution is determined via an algorithm selected from a loosely coupled or a tightly coupled integration scheme.

10. The navigation module in claim 1, wherein the at least one processor is programmed to use a state estimation technique.

11. The navigation module in claim 10, wherein the state estimation technique uses a system and measurement model.

12. The navigation module in claim 10, wherein the state estimation technique is non-linear.

13. The navigation module in claim 12, wherein the state estimation technique is a Particle Filter.

14. The navigation module in claim 13, wherein the state estimation technique is a Mixture Particle Filter.

15. The navigation module in claim 14, wherein the Mixture Particle Filter uses a system and measurement model.

16. The use of the module in claim 1, wherein the moving platform is a vehicle.

17. The use of the module in claim 16 wherein the vehicle is a land-based vehicle.

18. The use of the module in claim 17 wherein the vehicle is wheel-based or track-based.

19. The navigation module in claim 1, wherein the at least one processor is further programmed such that the advanced models of stochastic errors in the sensor assembly are non-linear or linear models with increased memory length.

20. The navigation module in claim 19, wherein the at least one processor is programmed to provide additional measurement updates for the stochastic errors in the sensor assembly.

21. The navigation module in any one of claims 9 or 20, wherein the at least one processor is further programmed to automatically assess the GNSS information and detect degraded performance.

22. The navigation module in claim 21, wherein the at least one processor is further programmed to perform a backward smoothed solution subsequent to the navigation solution and blend the two solutions to provide an enhanced solution.

23. The navigation module in claim 21, wherein the at least one processor is further programmed to calculate misalignment between the sensor assembly and the platform.

24. The navigation module in claim 23, wherein the at least one processor is further programmed to perform a backward smoothed solution subsequent to the navigation solution and blend the two solutions to provide an enhanced solution.

25. The navigation module in claim 21, wherein the at least one processor is further programmed to automatically switch between a loosely coupled integration scheme and a tightly coupled integration scheme.

26. The navigation module of claim 25, wherein the at least one processor, in the tightly coupled integration scheme, is further operative to automatically assess the measurements from each GNSS satellite visible to the receiver and detect degraded measurements.

27. The navigation module of claim 26, wherein the at least one processor is further programmed to perform a backward smoothed solution subsequent to the navigation solution and blend the two solutions to provide an enhanced solution.

28. The navigation module in claim 26, wherein the at least one processor is further programmed to calculate misalignment between the sensor assembly and the platform.

29. The navigation module of claim 28, wherein the at least one processor is further programmed to perform a backward smoothed solution subsequent to the navigation solution and blend the two solutions to provide an enhanced solution.

30. The navigation module in any one of claims 9 or 20, wherein the at least one processor, in the tightly coupled integration scheme, is further operative to automatically assess the measurements from each GNSS satellite visible to the receiver and detect degraded measurements.

31. The navigation module in claim 30 wherein the at least one processor is further programmed to perform a backward smoothed solution subsequent to the navigation solution and blend the two solutions to provide an enhanced solution.

32. The navigation module in claim 30, wherein the at least one processor is further programmed to calculate misalignment between the sensor assembly and the platform.

33. The navigation module in claim 32, wherein the at least one processor is further programmed to perform a backward smoothed solution subsequent to the navigation solution and blend the two solutions to provide an enhanced solution.

34. The navigation module in any one of claims 9 or 20, wherein the at least one processor is further programmed to calculate misalignment between the sensor assembly and the platform.

35. The navigation module in claim 34, wherein the at least one processor is further programmed to perform a backward smoothed solution subsequent to the navigation solution and blend the two solutions to provide an enhanced solution.

36. The navigation module in any one of claims 9 or 20, wherein the at least one processor is further programmed to perform a backward smoothed solution subsequent to the navigation solution and blend the two solutions to provide an enhanced solution.

37. A method of producing an integrated navigation solution relating to a moving platform, the method comprising:
   receiving absolute navigational information at a module from an external source and producing output readings indicative thereof;
   obtaining navigational information using self-contained sensors in the module and producing output readings indicative thereof;
   obtaining speed information at the module and producing output readings indicative thereof, wherein the speed information is substantially uninterrupted;
   providing at least one processor for processing and filtering the absolute and self-contained navigational and speed information to produce the navigation solution,
   wherein the at least one processor utilizes the speed readings to decouple the motion of the moving platform from the information from the sensors, wherein the at least one processor is further programmed to use an algorithm capable of modeling advanced models of stochastic errors in the sensor assembly.

38. A navigation module, for use with a moving platform, the module comprising:
   a receiver for receiving absolute navigational information from an external source, and producing an output of navigational information indicative thereof,
   an assembly of self-contained sensors capable of obtaining readings relating to navigational information and producing an output indicative thereof,
   a source of speed information capable of obtaining speed readings and producing an output indicative thereof, wherein the speed information can be interrupted,
   at least one processor, coupled to receive the information from the receiver, sensor assembly and source of speed information, and operative to integrate the information to produce a navigation solution,
   wherein the navigation solution uses the speed information to decouple the motion of the platform from the sensor assembly output.

39. The navigation module in claim 38, wherein the absolute receiver for receiving absolute navigational information is a GNSS receiver.

40. The navigation module in claim 39, wherein the GNSS receiver is a Global Positioning System receiver.

41. The navigation module in claim 39, wherein the GNSS information is degraded.

42. The navigation module in claim 38, wherein the sensor assembly comprises three accelerometers and three gyroscopes.

43. The navigation module in claim 38, wherein the at least one processor is programmed to use a state estimation technique.

44. The navigation module in claim 43, wherein the state estimation technique uses a system and measurement model.

45. The navigation module in claim 43, wherein the state estimation technique is non-linear.

46. The navigation module in claim 45, wherein the state estimation technique is a Particle Filter.

47. The navigation module in claim 46, wherein the state estimation technique is a Mixture Particle Filter.

48. The navigation module in claim 47, wherein the Mixture Particle Filter uses a system and measurement model.

49. The navigation module in claim 38, wherein the means for obtaining speed information has a wired connection to the module.

50. The navigation module in claim 38, wherein the means for obtaining speed information is wirelessly connected to the module.

51. The use of the module in claim 38, wherein the moving platform is a vehicle.

52. The use of the module in claim 51, wherein the vehicle is a land-based vehicle.

53. The use of the module in claim 51, wherein the vehicle is wheel-based or track-based.

54. The navigation module in claim 38, wherein the navigation solution is determined via an algorithm selected from a loosely coupled or a tightly coupled integration scheme.

55. The navigation module in claim 54, wherein the at least one processor is further programmed to use an algorithm capable of modeling advanced models of stochastic errors in the sensor assembly.

56. The navigation module in claim 55, wherein the at least one processor is further programmed such that the advanced models of stochastic errors in the sensor assembly are non-linear or linear models with increased memory length.

57. The navigation module in claim 56, wherein the at least one processor is programmed to provide additional measurement updates for the stochastic errors in the sensor assembly.

58. The navigation module in any one of claims 54 or 57, wherein the at least one processor is further programmed to perform a backward smoothed solution subsequent to the navigation solution and blend the two solutions to provide an enhanced solution.

59. The navigation module in any one of claims 54 or 57, wherein the at least one processor is further programmed to calculate misalignment between the sensor assembly and the platform.

60. The navigation module in claim 59, wherein the at least one processor is further programmed to perform a backward smoothed solution subsequent to the navigation solution and blend the two solutions to provide an enhanced solution.

61. The navigation module in any one of claims 54 or 57, wherein the at least one processor, in the tightly coupled integration scheme, is further operative to automatically assess the measurements from each GNSS satellite visible to the receiver and detect degraded measurements.

62. The navigation module in claim 61, wherein the at least one processor is further programmed to perform a backward smoothed solution subsequent to the navigation solution and blend the two solutions to provide an enhanced solution.

63. The navigation module in claim 61, wherein the at least one processor is further programmed to calculate misalignment between the sensor assembly and the platform.

64. The navigation module in claim 63, wherein the at least one processor is further programmed to perform a backward smoothed solution subsequent to the navigation solution and blend the two solutions to provide an enhanced solution.

65. The navigation module in any one of claims 54 or 57, wherein the at least one processor is further programmed to automatically assess the GNSS information and detect degraded performance.

66. The navigation module in claim 65, wherein the at least one processor is further programmed to calculate misalignment between the sensor assembly and the platform.

67. The navigation module in claim 66, wherein the at least one processor is further programmed to perform a backward smoothed solution subsequent to the navigation solution and blend the two solutions to provide an enhanced solution.

68. The navigation module in claim 65, wherein the at least one processor is further programmed to perform a backward smoothed solution subsequent to the navigation solution and blend the two solutions to provide an enhanced solution.

69. The navigation module in claim 65, wherein the at least one processor is further programmed by a routine to automatically switch between a loosely coupled integration scheme and a tightly coupled integration scheme.

70. The navigation module of claim 69, wherein at least one processor, in the tightly coupled scheme, is further operative to automatically assess the measurements from each GNSS satellite visible to the receiver and detect degraded measurements.

71. The navigation module of claim 70, wherein the at least one processor is further programmed to perform a backward smoothed solution subsequent to the navigation solution and blend the two solutions to provide an enhanced solution.

72. The navigation module of claim 70, wherein the at least one processor is further programmed to calculate misalignment between the sensor assembly and the platform.

73. The navigation module of claim 72, wherein the at least one processor is further programmed to perform a backward smoothed solution subsequent to the navigation solution and blend the two solutions to provide an enhanced solution.

74. A method of producing an integrated navigation solution relating to a moving platform, the method comprising:

receiving absolute navigational information at a module from an external source and producing output readings indicative thereof;

obtaining navigational information using self-contained sensors in the module and producing output readings indicative thereof;

obtaining speed information at the module and producing output readings indicative thereof, wherein the speed information can be interrupted; and providing at least one processor for processing and filtering the absolute and self-contained navigational and speed information to produce the navigation solution, wherein the at least one processor utilizes the speed readings to decouple the motion of the moving platform from the information from the sensors.

* * * * *